(12) United States Patent
Minamino et al.

(10) Patent No.: US 7,296,005 B2
(45) Date of Patent: Nov. 13, 2007

(54) METHOD AND APPARATUS FOR LEARNING DATA, METHOD AND APPARATUS FOR RECOGNIZING DATA, METHOD AND APPARATUS FOR GENERATING DATA, AND COMPUTER PROGRAM

(75) Inventors: Katsuki Minamino, Tokyo (JP); Kazumi Aoyama, Saitama (JP); Hideki Shimomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/294,696

(22) Filed: Dec. 5, 2005

(65) Prior Publication Data

US 2006/0184471 A1    Aug. 17, 2006

(30) Foreign Application Priority Data

Dec. 6, 2004    (JP)    ............................. 2004-353382

(51) Int. Cl.
*G06F 15/00*    (2006.01)
(52) U.S. Cl. ............................. 706/15; 706/25; 706/26; 706/45; 706/46
(58) Field of Classification Search ................ 704/222; 706/26, 45, 46
See application file for complete search history.

(56) References Cited

U.S. PATENT DOCUMENTS 5,307,444 A * 4/1994 Tsuboka ...................... 706/20
5,724,487 A * 3/1998 Streit ........................... 706/25
5,870,729 A * 2/1999 Yoda ............................ 706/26
6,449,591 B1 * 9/2002 Kondo et al. ................ 704/222

OTHER PUBLICATIONS

Somervuo P: "Competing hidden markov models on the self organizing map" Neural Networks, 2000. IJCNN 2000, Proceedings of the IEEE-INNS-ENNS International Joint Conference on Jul. 24-27, 2000, Piscataway, NJ, USA,IEEE, vol. 3, Jul. 24, 2000, pp. 169-174, XP010506719 ISBN: 0-7695-0619-4.
Kang M K et al: "A Study in the Stimulated Annealing of Self Organized Map Algorithm for Korean Phoneme Recognition" ICSLP 94 : 1994 International Conference on Spoken Language Processing. Yokohama, Japan, Sep. 18-22, 1994, International Conference on Spoken Language Processing. (ICSLP), Yokohama : ASJ, JP, vol. vol. 2, Sep. 18, 1994, pp. 471-474, XP000855288.
Kurimo M et al.: "Application of Self-Organizing Maps and LVQ in Training Continuous Density Hidden Markov Models for Phonemes" Proceedings of the International Conference on Spoken Language Processing (ICSLP). BANFF, Oct. 12-16, 1992, Edmonton, University of Alberta, CA, vol. vol. 1, Oct. 12, 1992, pp. 543-546, XP000850146.

(Continued)

*Primary Examiner*—Pierre Vital
*Assistant Examiner*—Ann J Chempakaseril
(74) *Attorney, Agent, or Firm*—Frommer Lawrence & Haug LLP; William S. Frommer; Thomas F. Presson

(57) ABSTRACT

A learning apparatus for learning time series data, includes a learning unit for updating, in a self-organizing manner based on an observed value of the time series data, a time series pattern storage network including a plurality of nodes, each node having a time series pattern model representing a time series pattern of the time series data.

18 Claims, 32 Drawing Sheets

OTHER PUBLICATIONS

Rigoll G: "Information theory principles for the design of self-organizing maps in combination with hidden Markov modeling for continuous speech recognition" International Joint Conference on Neural Networks, Jun. 17, 1990, pp. 569-574, XP010007043 San Diego, USA.

Somervuo P J: "Online algorithm for the self-organizing map of symbol strings" Neural Networks, Elsevier Science Publishers, Barking, GB, vol. 17, No. 8-9, Oct. 2004, pp. 1231-1239, XP004650395 ISSN: 0893-6080.

* cited by examiner

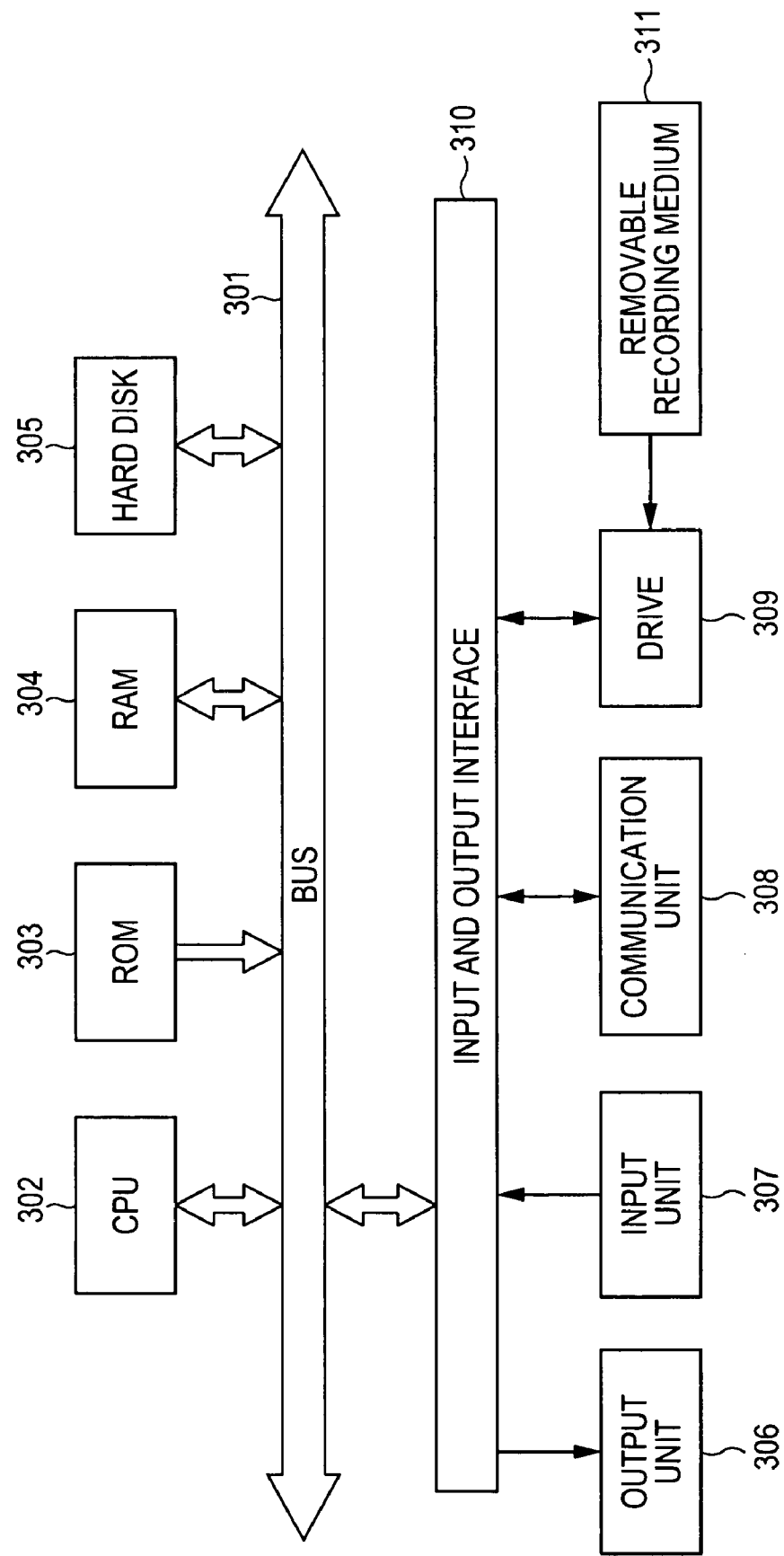

METHOD AND APPARATUS FOR LEARNING DATA, METHOD AND APPARATUS FOR RECOGNIZING DATA, METHOD AND APPARATUS FOR GENERATING DATA, AND COMPUTER PROGRAM

CROSS REFERENCES TO RELATED APPLICATIONS

The present invention contains subject matter related to Japanese Patent Application JP 2004-353382 filed in the Japanese Patent Office on Dec. 6, 2004, the entire contents of which are incorporated herein by reference.

BACKGROUND OF THE INVENTION

1. Field of the Invention

The present invention relates to a learning method and apparatus, a recognition method and apparatus, a generating method and apparatus, and a computer program and, in particular to a learning method and apparatus, a recognition method and apparatus, a generating method and apparatus, and a computer program for learning time series data, such as a voice, in an unsupervised learning fashion, and recognizing and generating time series data using the learning results.

2. Description of the Related Art

Techniques recognizing a pattern by learning are generally called pattern recognition. The learning techniques by pattern recognition are divided into supervised learning and unsupervised learning.

In the supervised learning, information concerning class to which learning data of each pattern belongs to is provided. Such information is called correct-answer label. The learning data belonging to a given pattern is learned on a per pattern basis. Numerous learning methods including template matching, neural network, and hidden Markov model (HMM), have been proposed.

FIG. 1 illustrates known a supervised learning process.

In the supervised learning, learning data for use in learning is prepared according to assumed category (class), such as phoneme category, phonological category, or word category. To learn voice data of pronunciations of "A", "B", and "C", a great deal of voice data of pronunciations of "A", "B", and "C" is prepared.

A model used in learning (model learning data of each category) is prepared on a per category basis. The model is defined by parameters. For example, to learn voice data, an HMM is used as a model. The HMM is defined by a state transition probability of transitioning from one state to another state (including an original state) or an output probability density representing the probability density of an observed value output from the HMM.

In the supervised learning, the learning of each category (class) is performed using learning data of that category alone. As shown in FIG. 1, a model of category "A" is learned using learning data of "A" only, and a model of category "B" is learned using learning data of "B" only. Likewise, a model of category "C" is learned using learning data of category "C" only.

In the supervised learning, the learning of the model of a category needs to be performed using the learning data of that category. The learning data is prepared on a category by category basis, and the learning data of that category is provided for learning of the model of that category. The model is thus obtained on a per category basis. More specifically, in the supervised learning, a template (model of a class (category) represented by a correct-answer label) is obtained on a per class basis.

During recognition, a correct-answer label of a template (having the maximum likelihood) most appropriately matching data to be recognized is output.

The unsupervised learning is performed with no correct-answer label provided to the learning data of each pattern. For example, learning methods using template matching and neural net are available in the unsupervised learning. The unsupervised learning is thus substantially different from the supervised learning in that no correct-answer label is provided.

The pattern recognition is considered as a quantization of signal space in which data (signal) to be recognized in the pattern recognition is observed. If the data to be recognized is a vector, the pattern recognition is referred to as a vector quantization.

In the vector quantization learning, a representative vector corresponding to class (referred to as a centroid vector) is arranged in the signal space where the data to be recognized is observed.

K-means clustering method is available as one of typical unsupervised learning vector quantization techniques. In the K-means clustering method, the centroid vector is placed appropriately in the initial state of the process. A vector as the learning data is assigned to the centroid vector closest in distance thereto, and the centroid vector is updated with a mean vector of the learning data assigned to the centroid vector. This process is iterated.

Batch learning is also known. In the batch learning, a large number of learning data units is stored and all learning data units are used. The K-mean clustering method is classified as batch learning. In online learning, as opposed to the batch learning, learning is performed using learning data each time the learning data is observed, and parameters are updated bit by bit. The parameters include a component of the centroid vector and a output probability density function defining HMM.

Self-organization map (SOM), proposed by T. Kohonen, is well defined as the online learning. In the SOM learning, the weight of connection between an input layer and an output layer is updated (corrected) bit by bit.

In the SOM, the output layer has a plurality of nodes, and each node of the output layer is provided with a connection weight representing the degree of connection with the input layer. If the connection weight serves as a vector, the vector quantization learning can be performed.

More specifically, a node having the shortest distance between the vector as the connection weight and the vector as the learning data is determined as a winner node from among the nodes of the output layer of the SOM. Updating of the vector is performed so that the vector as the connection weight of the winner node becomes close to the vector as the learning data. The connection weight of a node in the vicinity of the winner node is also updated so that the connection weight becomes a bit closer to the learning data. As learning process is in progress, nodes are arranged in the output layer so that nodes having similar vectors as connection weights are close to each other while nodes not similar to each other are far apart from each other. A map corresponding to a pattern contained in the learning data is thus organized. As learning is in progress, a map corresponding to the learning data containing similar nodes (namely, nodes having similar vectors as connection weights) in close vicinity is produced. This process is referred to as self-organization.

The vector of the connection weight obtained as a result of learning is considered as a centroid vector arranged in the signal space. In the K-mean clustering technique, only a vector closest in distance to the learning data is updated, and the method of updating in that way is referred to as winner-take-all (WTA). In contrast, in the SOM learning, not only the node closest to the learning data (winner node) but also the node in the vicinity of the winner node is updated in connection weight. The method of updating is referred to as soft-max adaptation (SMA). The learning results of the WTA learning tends to be subject to localized solution while the SMA learning improves the problem of being subject to localized solution.

Besides the SOM learning, neural gas algorithm is well known as the SMA technique. In the neural gas algorithm, the output layer used in the SOM learning is not used, and closeness is defined by a ranking based on distance to the learning data. Parameters are is on-line learned in a manner similar to the SOM learning.

The classification of learning described above is described H. Aso, H. Murata, and N. Murata in the book entitled "pattern ninshiki to gakushu no toukeigaku (Pattern Recognition and Statistics of Learning)" published by Iwanami Shoten. The SOM learning is described in a paper entitled "Self-Organizing Feature Maps" authored by T. Kohonen, Springer-Verlag Tokyo. The neural gas algorithm is described by T. M. Martinez, S. G. Berkovich, and K. J. Schulten in the paper entitled "Neural-Gas", Network for Vector Quantization and its Application to Time-Series Prediction, IEEE Trans. Neural Networks, VOL. 4, No. 4, pp. 558-569, 1999.

The above SOM and neural gas algorithm provides unsupervised learning applicable to a vector as a static signal pattern, namely, data having a fixed length. The SOM and the neural gas algorithm cannot be directly applied to time series data such as voice data because voice data is variable in length and dynamic in signal pattern.

In one proposed technique, a higher dimensional vector is defined by connecting consecutive vector series, and time series vectors as time series data are thus handled as a static signal pattern. Such a technique cannot be directly applied to variable-length time series data, such as voice data.

Techniques of using a recurrent neural network with a feedback circuit attached thereto have been proposed as a method of learning time series data in a self-organizing manner (Japanese Unexamined Patent Application Publications Nos. 4-156610 and 6-231106). A back propagation method widely used in the learning of parameters in the recurrent neural network causes a dramatic increase in the amount of calculation with an increase in the size of the recurrent neural network, and as a result, time required for learning is also substantially prolonged. Applying a single recurrent neural network to the learning of a variety of patterns of time series data, such as voice data, is not an effective way of learning.

An HMM technique is available as one of widely available techniques for pattern recognition of time series data, such as recognizing voice data in voice recognition (as disclosed by Laurence Rabiner, and Biing-Hwang Juang in the book entitled "Fundamentals of Speech Recognition" NTT Advanced Technologies).

HMM is one of state transition probability models having state transitions. As previously discussed, HMM is defined by a state transition probability and an output probability density function at each state. In the HMM technique, statistical characteristics of time series data to be learned are modeled. Mixture of normal distributions is used as the output probability density function defining HMM. Baum-Welch algorithm is widely used to estimate parameters of HMM (the parameters are the state transition probability and the output probability density function).

The HMM technique finds applications in a wide range from isolated word recognition, already put to practical use, to large vocabulary recognition. The HMM learning is typically supervised learning, and as shown in FIG. 1, learning data with a correct-answer label attached thereto is used in learning. The HMM learning for recognizing a word is performed using learning data corresponding to that word (voice data obtained as a result of pronouncement of that word).

The HMM learning is supervised learning, and performing the HMM learning on learning data having no correct-answer label attached thereto is difficult, i.e., unsupervised HMM learning is difficult.

Japanese Unexamined Patent Application Publication No. 2002-311988 discloses an HMM learning technique to minimize the number of categories to maximize an amount of mutual information of voice and video, derived from voice data having no correct-answer label attached thereto and corresponding video data. In accordance with this technique, HMM learning cannot be performed if video corresponding to the voice data is not provided. In strict sense, the disclosed technique is not considered as unsupervised learning.

Another technique is disclosed by S. Yoshizawa, A. Baba, K. Matsunami, Y. Mera, M. Yamada, and K. Shikano in the proceeding entitled "Unsupervised Learning of Phonological Model Using Sufficient Statistics and Distance to Speaker" Technical Report of IEICE (Institute of Electronics, Information and Communication Engineers) SP2000-89, pp. 83-88, 2000.

SUMMARY OF THE INVENTION

As described above, unsupervised learning of static pattern, such as SOM and neural gas algorithm, and supervised learning of dynamic time series data, such as HMM, have been proposed. In either case, unsupervised learning of dynamic time series data cannot be performed. Theoretically, the recurrent neural network can perform unsupervised learning of dynamic time series data, but in practice, a recurrent neural network of a large scale is required. The amount of calculation and time required for learning become excessively large.

It is thus desirable to perform unsupervised learning of time series data and recognize and generate time series data using the learning results.

In accordance with one embodiment of the present invention, a learning apparatus for learning time series data, includes a learning unit for updating, in a self-organizing manner based on an observed value of the time series data, a time series pattern storage network including a plurality of nodes, each node having a time series pattern model representing a time series pattern of the time series data.

In accordance with another embodiment of the present invention, a learning method of learning time series data, includes a step of updating, in a self-organizing manner based on an observed value of the time series data, a time series pattern storage network including a plurality of nodes, each node having a time series pattern model representing a time series pattern of the time series data.

In accordance with still another embodiment of the present invention, a computer program for causing a computer to learn time series data, includes program code for performing a step of updating, in a self-organizing manner based on an observed value of the time series data, a time series pattern storage network including a plurality of nodes, each node having a time series pattern model representing a time series pattern of the time series data.

In accordance with a further embodiment of the present invention, a recognition apparatus for recognizing an observed value of time series data, includes a winner node determining unit for determining, as a winner node, the node most appropriately matching the observed value of the time series data, in a time series pattern storage network composed of a plurality of nodes, each node having a time series pattern model representing a time series pattern of the time series data, and an output unit for outputting information representing the winner node as a result of recognition of the observed value of the time series data.

In accordance with a further embodiment of the present invention, a recognition method of recognizing an observed value of time series data, includes steps of determining, as a winner node, the node most appropriately matching the observed value of the time series data, in a time series pattern storage network composed of a plurality of nodes, each node having a time series pattern model representing a time series pattern of the time series data, and outputting information representing the winner node as a result of recognition of the observed value of the time series data.

In accordance with a further embodiment of the present invention, a computer program for causing a computer to recognize an observed value of time series data, includes program code for performing steps of determining, as a winner node, the node most appropriately matching the observed value of the time series data, in a time series pattern storage network composed of a plurality of nodes, each node having a time series pattern model representing a time series pattern of the time series data, and outputting information representing the winner node as a result of recognition of the observed value of the time series data.

In accordance with a further embodiment of the present invention, a generating apparatus for generating time series data, includes a node determining unit for determining a node represented by a signal input from the outside world, in a time series pattern storage network composed of a plurality of nodes, each node having a time series pattern model representing a time series pattern of the time series data, and a generating unit for generating the time series data based on the time series pattern model of the node determined by the node determining unit.

In accordance with a further embodiment of the present invention, a method of generating time series data, includes steps of determining a node represented by a signal input from the outside world, in a time series pattern storage network composed of a plurality of nodes, each node having a time series pattern model representing a time series pattern of the time series data, and generating the time series data based on the time series pattern model of the node determined in the node determining step.

In accordance with a further embodiment of the present invention, a computer program for causing a computer to generate time series data, includes program code for performing steps of determining a node represented by a signal input from the outside world, in a time series pattern storage network composed of a plurality of nodes, each node having a time series pattern model representing a time series pattern of the time series data, and generating the time series data based on the time series pattern model of the node determined in the node determining step.

In accordance with a further embodiment of the present invention, a learning apparatus for learning time series data, includes a learning unit for updating in a self-organizing manner a first time series pattern storage network based on an observed value of input data as the time series data input to a predetermined unit to be controlled, in a connection network while updating, in a self-organizing manner, a second time series pattern storage network based on an observed value of output data which the unit to be controlled outputs in response to the input data, the connection network being composed of interconnected nodes of the first and second time series pattern storage networks, each of the first and second time series pattern storage networks composed of a plurality of nodes, each node having a time series pattern model representing a time series pattern of the time series data, and an updating unit for updating a connection relationship between a first node and a second node. The first node is a node matching the observed value of the input data from among the nodes of the first time series pattern storage network, and the second node is a node matching the observed value of the output data responsive to the input data, from among the nodes of the second time series pattern storage network.

In accordance with a further embodiment of the present invention, a learning method of learning time series data, includes steps of updating in a self-organizing manner a first time series pattern storage network based on an observed value of input data as the time series data input to a predetermined unit to be controlled, in a connection network while updating, in a self-organizing manner, a second time series pattern storage network based on an observed value of output data which the unit to be controlled outputs in response to the input data, the connection network being composed of interconnected nodes of the first and second time series pattern storage networks, each of the first and second time series pattern storage networks composed of a plurality of nodes, each node having a time series pattern model representing a time series pattern of the time series data, and updating a connection relationship between a first node and a second node. The first node is a node matching the observed value of the input data from among the nodes of the first time series pattern storage network, and the second node is a node matching the observed value of the output data responsive to the input data, from among the nodes of the second time series pattern storage network.

In accordance with a further embodiment of the present invention, a computer program for causing a computer to learn time series data, includes program code for performing steps of updating in a self-organizing manner a first time series pattern storage network based on an observed value of input data as the time series data input to a predetermined unit to be controlled, in a connection network while updating in a self-organizing manner a second time series pattern storage network based on an observed value of output data which the unit to be controlled outputs in response to the input data, the connection network being composed of interconnected nodes of the first and second time series pattern storage networks, each of the first and second time series pattern storage networks composed of a plurality of nodes, each node having a time series pattern model representing a time series pattern of the time series data, and updating a connection relationship between a first node and a second node. The first node is a node matching the observed value of the input data from among the nodes of the first time series pattern storage network and the second node is a node matching the observed value of the output data responsive to the input data, from among the nodes of the second time series pattern storage network.

In accordance with a further embodiment of the present invention, a generating apparatus for generating, in response to time series data, other time series data, includes a winner node determining unit for determining, as a winner node, the node most appropriately matching the time series data, in a first time series pattern storage network in a connection network, the connection network being composed of interconnected nodes of the first and second time series pattern storage networks, each of the first and second time series pattern storage networks composed of a plurality of nodes, each node having a time series pattern model representing a time series pattern of the time series data, a generation node determining unit for determining, as a generation node for generating the other time series data, a node, in the second time series pattern storage network, having a high degree of connection to the winner node, and a generating unit for generating the other time series data based on the time series pattern storage network of the generation node.

In accordance with a further embodiment of the present invention, a method of generating, in response to time series data, other time series data, includes steps of determining, as a winner node, the node most appropriately matching the time series data, in a first time series pattern storage network in a connection network, the connection network being composed of interconnected nodes of the first and second time series pattern storage networks, each of the first and second time series pattern storage networks composed of a plurality of nodes, each node having a time series pattern model representing a time series pattern of the time series data, determining, as a generation node for generating the other time series data, a node, in the second time series pattern storage network, having a high degree of connection to the winner node, and generating the other time series data based on the time series pattern storage network of the generation node.

In accordance with a further embodiment of the present invention, a computer program for causing a computer to generate, in response to time series data, other time series data, includes program code for performing steps of determining, as a winner node, the node most appropriately matching the time series data, in a first time series pattern storage network in a connection network, the connection network being composed of interconnected nodes of the first and second time series pattern storage networks, each of the first and second time series pattern storage networks composed of a plurality of nodes, each node having a time series pattern model representing a time series pattern of the time series data, determining, as a generation node for generating the other time series data, a node, in the second time series pattern storage network, having a high degree of connection to the winner node, and generating the other time series data based on the time series pattern storage network of the generation node.

In accordance with embodiments of the present invention, the time series pattern storage network including a plurality of nodes, each node having a time series pattern model representing a time series pattern of the time series data is updated in a self-organizing manner based on the observed value of the time series data.

In accordance with embodiments of the present invention, determined as the winner node is the node most appropriately matching the observed value of the time series data in a time series pattern storage network composed of a plurality of nodes, each node having a time series pattern model representing a time series pattern of the time series data. Information representing the winner node is output as a result of recognition of the observed value of the time series data.

In accordance with embodiments of the present invention, the node represented by a signal input from the outside world is determined in the time series pattern storage network composed of a plurality of nodes, each node having a time series pattern model representing a time series pattern of the time series data, and the time series data is generated based on the time series pattern model of the node determined by the node determining unit.

In accordance with embodiments of the present invention, the first time series pattern storage network in the connection network is updated in a self-organizing manner based on the observed value of input data as the time series data input to the predetermined unit to be controlled, and the second time series pattern storage network is updated in a self-organizing manner, based on the observed value of output data which the unit to be controlled outputs in response to the input data. The connection network is composed of interconnected nodes of the first and second time series pattern storage networks, each of the first and second time series pattern storage networks composed of a plurality of nodes, each node having a time series pattern model representing a time series pattern of the time series data. The connection relationship between the first node and the second node is updated. The first node is the node matching the observed value of the input data from among the nodes of the first time series pattern storage network and the second node is the node matching the observed value of the output data responsive to the input data, from among the nodes of the second time series pattern storage network.

In accordance with embodiments of the present invention, the winner node is determined as the node most appropriately matching the time series data in the first time series pattern storage network in the connection network. The connection network is composed of interconnected nodes of the first and second time series pattern storage networks, each of the first and second time series pattern storage networks composed of a plurality of nodes, each node having a time series pattern model representing a time series pattern of the time series data, and the node, in the second time series pattern storage network, having a high degree of connection to the winner node is determined as the generation node for generating the other time series data.

In accordance with embodiments of the present invention, the unsupervised learning of the time series data and the recognition and the generation of the time series data using the learning results are easily achieved.

BRIEF DESCRIPTION OF THE DRAWINGS

FIG. 32 is a block diagram illustrating a computer in accordance with one embodiment of the present invention.

DESCRIPTION OF THE PREFERRED EMBODIMENTS

Figure 1:
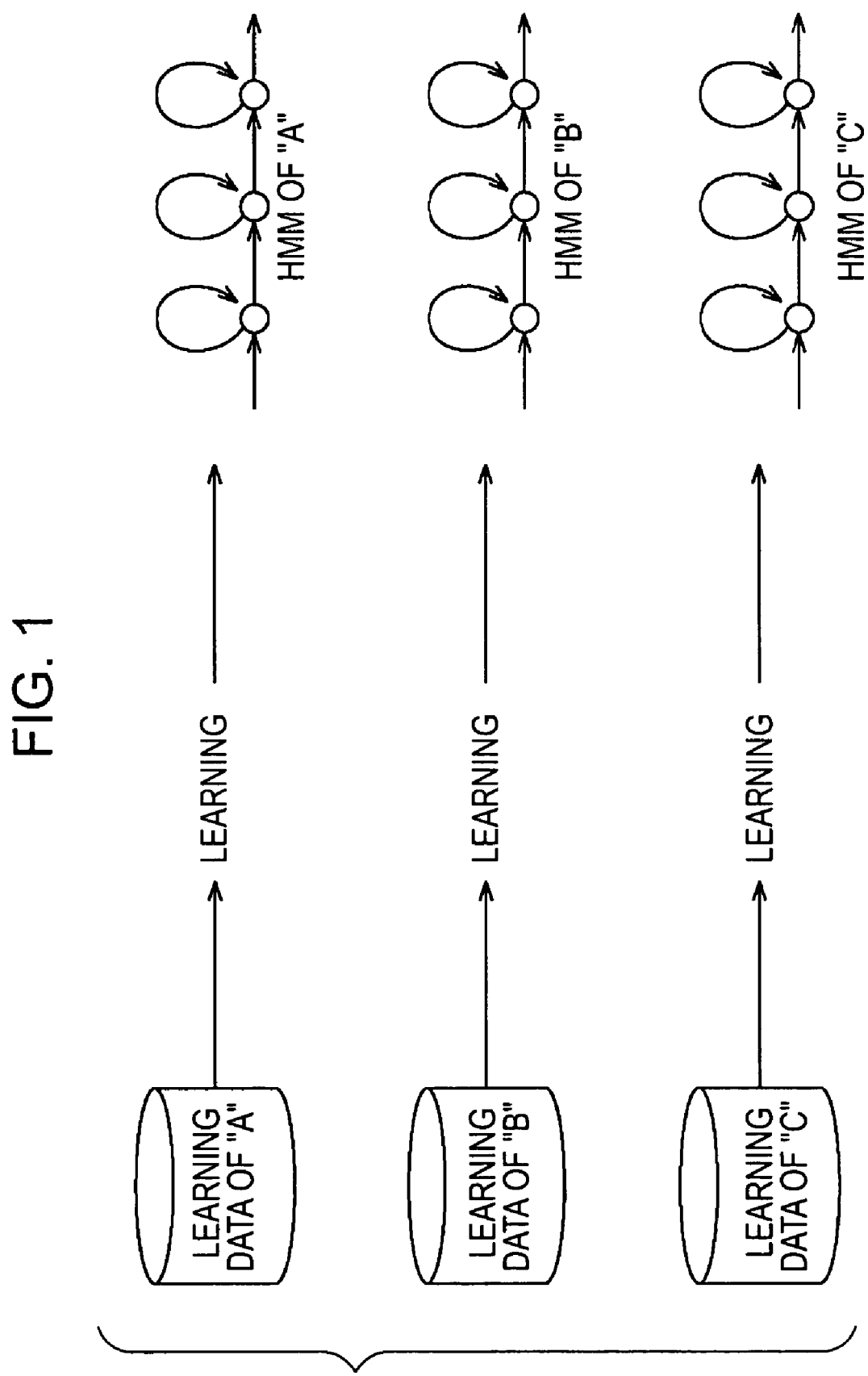
FIG. 1 illustrates known examples of supervised learning.

Before describing an embodiment of the present invention, the correspondence between the features of the claims and the specific elements disclosed in an embodiment of the present invention is discussed below. This description is intended to assure that an embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

A learning apparatus (for example, a data processing apparatus of FIG. 2) of one embodiment of the present invention for learning time series data, includes a learning section (for example, a learning section 4 of FIG. 2) for updating, in a self-organizing manner based on an observed value of the time series data, a time series pattern storage network including a plurality of nodes, each node having a time series pattern model representing a time series pattern of the time series data.

The learning section includes a winner node determining unit (for example, a winner node determiner 42 of FIG. 8) for determining, as a winner node, the node most appropriately matching the observed value of the time series data, from among the plurality of nodes forming the time series pattern storage network, and a model updating unit (for example, a model learning unit 45 of FIG. 8) for updating the time series pattern model of the winner node in accordance with the observed value of the time series data.

The learning section further includes a weight determining unit (for example, a weight determiner 43 of FIG. 8) for determining a weight of the node, the weight representing the degree of influence of the observed value of the time series data on the time series pattern model when the time series pattern model of the node is updated, wherein the model updating unit updates the time series pattern model of the winner node and the time series pattern model of the node other than the winner node, based on the observed value of the time series data and the weight.

The learning apparatus further includes a learning data storage unit (for example, a learning data storage unit 22 of FIG. 4) for storing learning data for use in learning the time series pattern model of the node, wherein the learning section includes a learning data updating unit (for example, a learning data updating unit 44 of FIG. 8) for mixing the learning data already stored in the learning data storage unit with the observed value of the time series data and updating the storage content of the learning data storage unit with the mixing results as new learning data. The model updating unit updates the time series pattern model by learning the time series pattern model of the node based on the new learning data.

In the learning apparatus, the learning section further includes a weight determining unit (for example, the weight determiner 43 of FIG. 8) for determining a weight of the node, the weight representing the degree of influence of the observed value of the time series data on the time series pattern model when the time series pattern model of the node is updated. The learning data updating unit mixes the learning data of the node, already stored in the learning data storage unit, with the observed value of the time series data in accordance with the weight of the node, and updates the storage content of the learning data storage unit with the mixing results as new learning data.

In accordance with one embodiment of the present invention, a learning method of learning time series data, includes a learning step (for example, steps of S3 through S7 of FIG. 11) of updating, in a self-organizing manner based on an observed value of the time series data, a time series pattern storage network including a plurality of nodes, each node having a time series pattern model representing a time series pattern of the time series data.

In accordance with another embodiment of the present invention, a computer program for causing a computer to learn time series data, includes program code for performing a learning step (for example, steps of S3 through S7 of FIG.

11) of updating, in a self-organizing manner based on an observed value of the time series data, a time series pattern storage network including a plurality of nodes, each node having a time series pattern model representing a time series pattern of the time series data.

In accordance with still another embodiment of the present invention, a recognition apparatus (for example, a data processing apparatus of FIG. 2) for recognizing an observed value of time series data, includes a winner node determining unit (for example, a winner node determiner 52 of FIG. 13) for determining, as a winner node, the node most appropriately matching the observed value of the time series data, in a time series pattern storage network composed of a plurality of nodes, each node having a time series pattern model representing a time series pattern of the time series data, and an output unit (for example, an output unit 53 of FIG. 13) for outputting information representing the winner node as a result of recognition of the observed value of the time series data.

Figure 14:
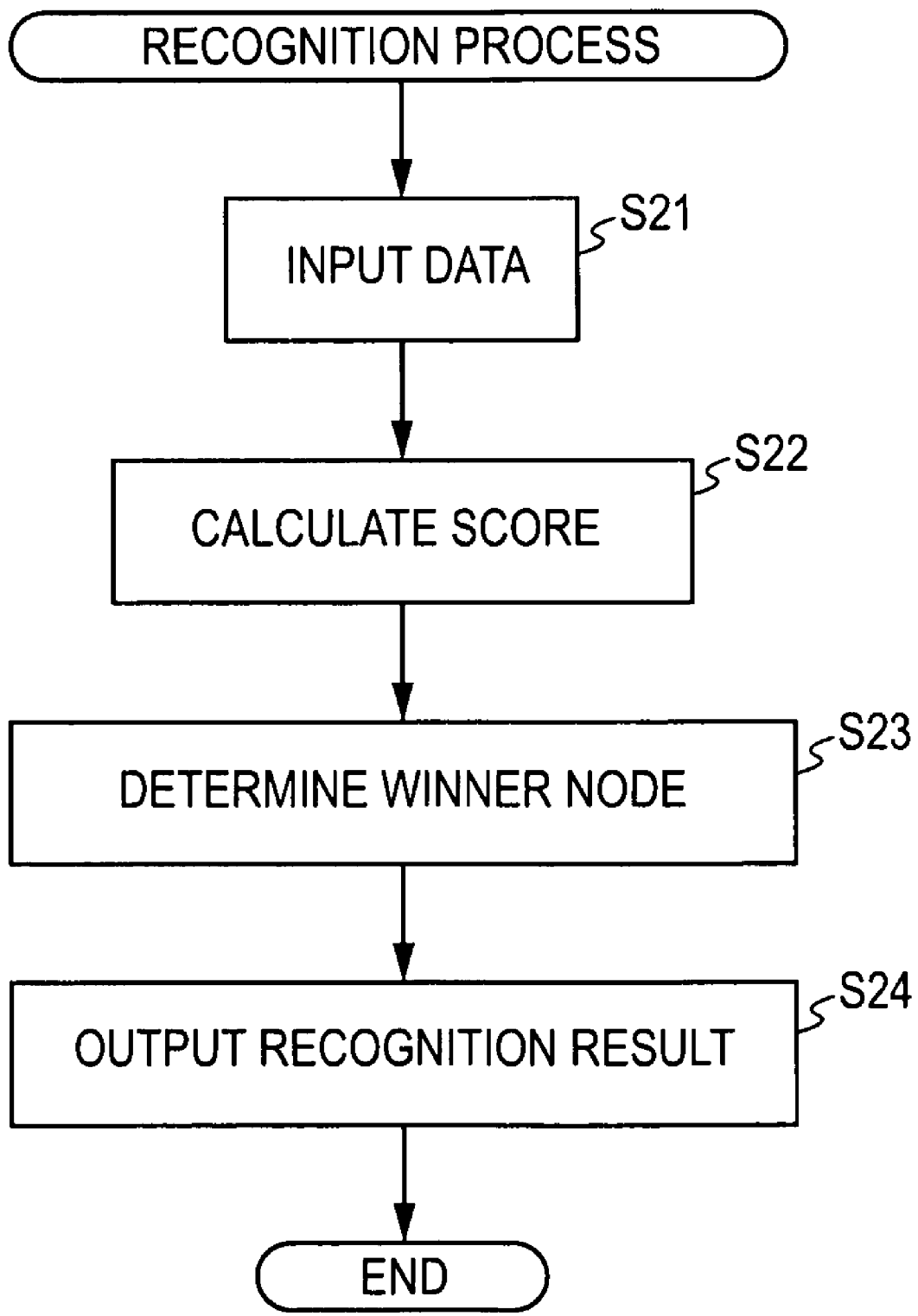
FIG. 14 is a flowchart of a recognition process.

In accordance with a further embodiment of the present invention, a recognition method of recognizing an observed value of time series data, includes steps of determining, as a winner node, the node most appropriately matching the observed value of the time series data, in a time series pattern storage network composed of a plurality of nodes, each node having a time series pattern model representing a time series pattern of the time series data (for example, in step S23 of FIG. 14), and outputting information representing the winner node as a result of recognition of the observed value of the time series data (for example, in step S24 of FIG. 14).

In accordance with a still further embodiment of the present invention, a computer program for causing a computer to recognize an observed value of time series data, includes program code for performing steps of determining, as a winner node, the node most appropriately matching the observed value of the time series data, in a time series pattern storage network composed of a plurality of nodes, each node having a time series pattern model representing a time series pattern of the time series data (for example, in step S23 of FIG. 14) and outputting information representing the winner node as a result of recognition of the observed value of the time series data (for example, in step S24 of FIG. 14).

In accordance with a further embodiment of the present invention, a generating apparatus (for example, the data processing apparatus of FIG. 2) for generating time series data, includes a node determining unit (for example, a generation node determiner 61 of FIG. 15) for determining a node represented by a signal input from the outside world, in a time series pattern storage network composed of a plurality of nodes, each node having a time series pattern model representing a time series pattern of the time series data, and a generating unit (for example, a time series generator 62 of FIG. 15) for generating the time series data based on the time series pattern model of the node determined by the node determining unit.

Figure 16:
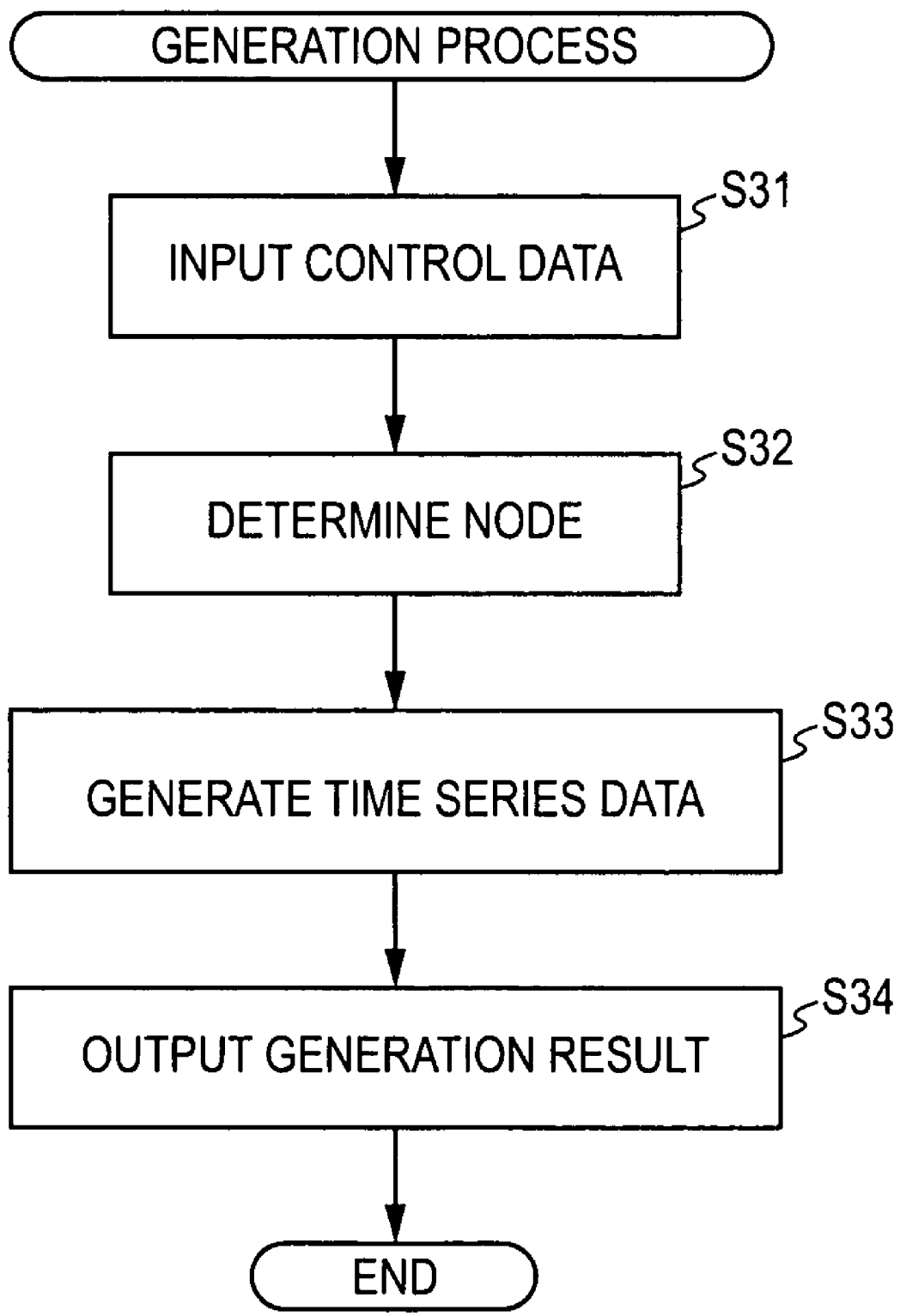
FIG. 16 is a flowchart of a generation process.

In accordance with a further embodiment of the present invention, a method of generating time series data, includes steps of determining a node represented by a signal input from the outside world, in a time series pattern storage network composed of a plurality of nodes, each node having a time series pattern model representing a time series pattern of the time series data (for example, in step S32 of FIG. 16) and generating the time series data based on the time series pattern model of the node determined in the node determining step (for example, in step S33 of FIG. 16).

In accordance with a further embodiment of the present invention, a computer program for causing a computer to generate time series data, includes program code for performing steps of determining a node represented by a signal input from the outside world, in a time series pattern storage network composed of a plurality of nodes, each node having a time series pattern model representing a time series pattern of the time series data (for example, in step S32 of FIG. 16) and generating the time series data based on the time series pattern model of the node determined in the node determining step (for example, in step S33).

Figure 28:
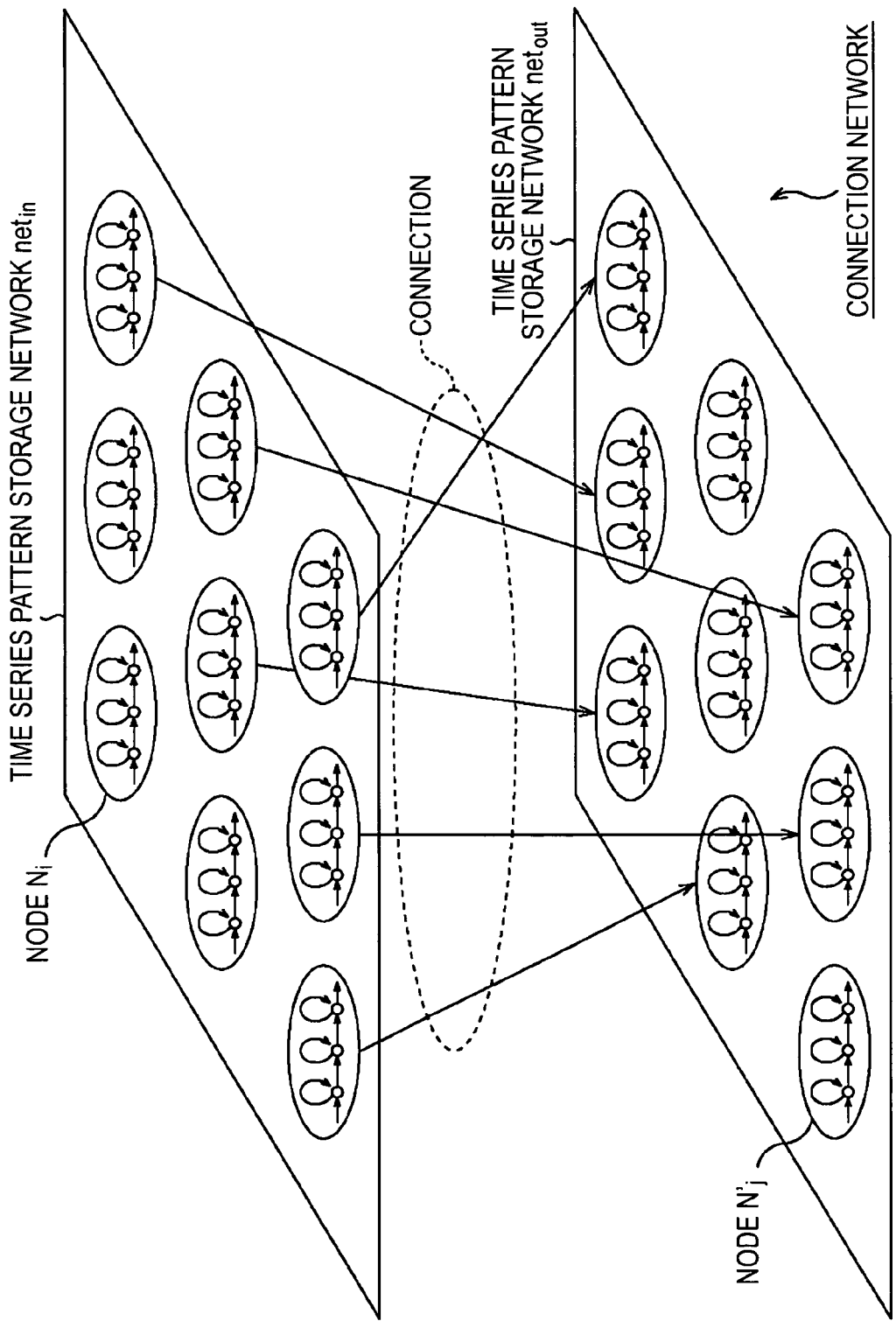
FIG. 28 illustrates the configuration of connection network.

A learning apparatus for learning time series data, includes a learning unit (for example, a learning processor 221 of FIG. 29) for updating in a self-organizing manner a first time series pattern storage network (for example, one of a time sequence pattern storage network $net_{in}$ and a time sequence pattern storage network $net_{out}$ of FIG. 28) based on an observed value of input data as the time series data input to a predetermined unit to be controlled, in a connection network while updating, in a self-organizing manner, a second time series pattern storage network (for example, the other of the time sequence pattern storage network $net_{in}$ and the time sequence pattern storage network $net_{out}$ of FIG. 28) based on an observed value of output data which the unit to be controlled outputs in response to the input data, the connection network being composed of interconnected nodes of the first and second time series pattern storage networks, each of the first and second time series pattern storage networks composed of a plurality of nodes, each node having a time series pattern model representing a time series pattern of the time series data, and an updating unit (for example, a connection weight updating unit 222 of FIG. 29) for updating a connection relationship between a first node and a second node, wherein the first node is a node matching the observed value of the input data from among the nodes of the first time series pattern storage network and wherein the second node is a node matching the observed value of the output data responsive to the input data, from among the nodes of the second time series pattern storage network.

Figure 30:
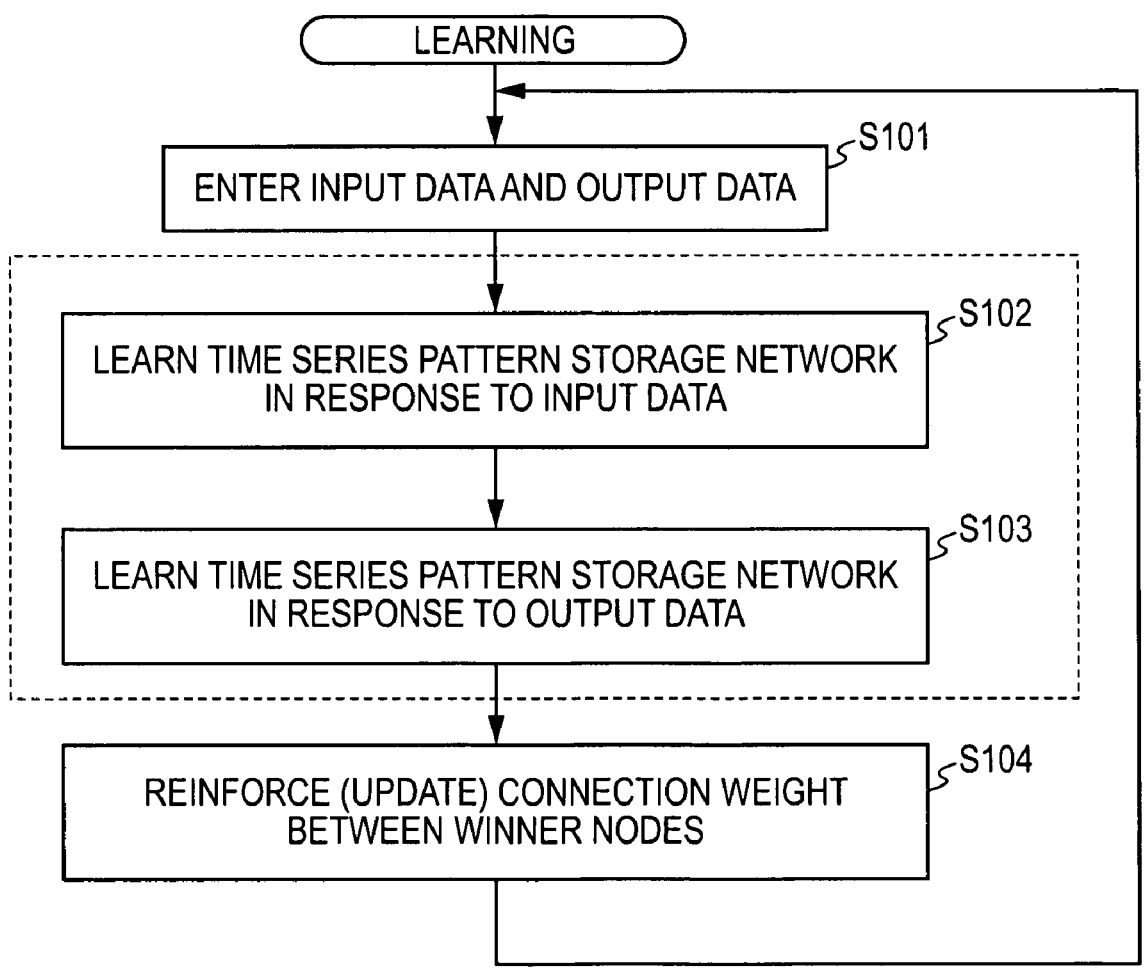
FIG. 30 is a flowchart illustrating the learning of the connection network.

In accordance with a further embodiment of the present invention, a learning method of learning time series data, includes steps of updating in a self-organizing manner a first time series pattern storage network (for example, one of a time sequence pattern storage network $net_{in}$ and a time sequence pattern storage network $net_{out}$ of FIG. 28) based on an observed value of input data as the time series data input to a predetermined unit to be controlled, in a connection network while updating, in a self-organizing manner, a second time series pattern storage network (for example, the other of the time sequence pattern storage network $net_{in}$ and the time sequence pattern storage network $net_{out}$ of FIG. 28) based on an observed value of output data which the unit to be controlled outputs in response to the input data, the connection network being composed of interconnected nodes of the first and second time series pattern storage networks, each of the first and second time series pattern storage networks composed of a plurality of nodes, each node having a time series pattern model representing a time series pattern of the time series data (for example, in steps S102 and S103 of FIG. 30), and updating a connection relationship between a first node and a second node (for example, in step S104 of FIG. 30). The first node is a node matching the observed value of the input data from among the nodes of the first time series pattern storage network and the second node is a node matching the observed value of the output data responsive to the input data, from among the nodes of the second time series pattern storage network.

In accordance with a further embodiment of the present invention, a computer program for causing a computer to learn time series data, includes program code for performing steps of updating in a self-organizing manner a first time series pattern storage network (for example, one of a time sequence pattern storage network $net_{in}$ and a time sequence pattern storage network $net_{out}$ of FIG. 28) based on an observed value of input data as the time series data input to a predetermined unit to be controlled, in a connection network while updating, in a self-organizing manner, a second time series pattern storage network (for example, the other of the time sequence pattern storage network $net_{in}$ and the time sequence pattern storage network $net_{out}$ of FIG. 28) based on an observed value of output data which the unit to be controlled outputs in response to the input data, the connection network being composed of interconnected nodes of the first and second time series pattern storage networks, each of the first and second time series pattern storage networks composed of a plurality of nodes, each node having a time series pattern model representing a time series pattern of the time series data (for example, in steps S102 and S103 of FIG. 30), and updating a connection relationship between a first node and a second node (for example, in step S104 of FIG. 30). The first node is a node matching the observed value of the input data from among the nodes of the first time series pattern storage network and the second node is a node matching the observed value of the output data responsive to the input data, from among the nodes of the second time series pattern storage network.

In accordance with a further embodiment of the present invention, a generating apparatus (for example, a data processing apparatus of FIG. 29) for generating, in response to time series data, other time series data, includes a winner node determining unit (for example, a winner node determiner 232 of FIG. 29) for determining, as a winner node, the node most appropriately matching the time series data, in a first time series pattern storage network (for example, one of a time sequence pattern storage network $net_{in}$ and a time sequence pattern storage network $net_{out}$ of FIG. 28) in a connection network, the connection network being composed of interconnected nodes of the first time series pattern storage network and a second time series pattern storage network (for example, the other of the time sequence pattern storage network $net_{in}$ and the time sequence pattern storage network $net_{out}$ of FIG. 28), each of the first and second time series pattern storage networks composed of a plurality of nodes, each node having a time series pattern model representing a time series pattern of the time series data, a generation node determining unit (for example, a generation node determiner 233 of FIG. 29) for determining, as a generation node for generating the other time series data, a node, in the second time series pattern storage network, having a high degree of connection to the winner node, and a generating unit (for example, a time series generator 234 of FIG. 29) for generating the other time series data based on the time series pattern storage network of the generation node.

Figure 31:
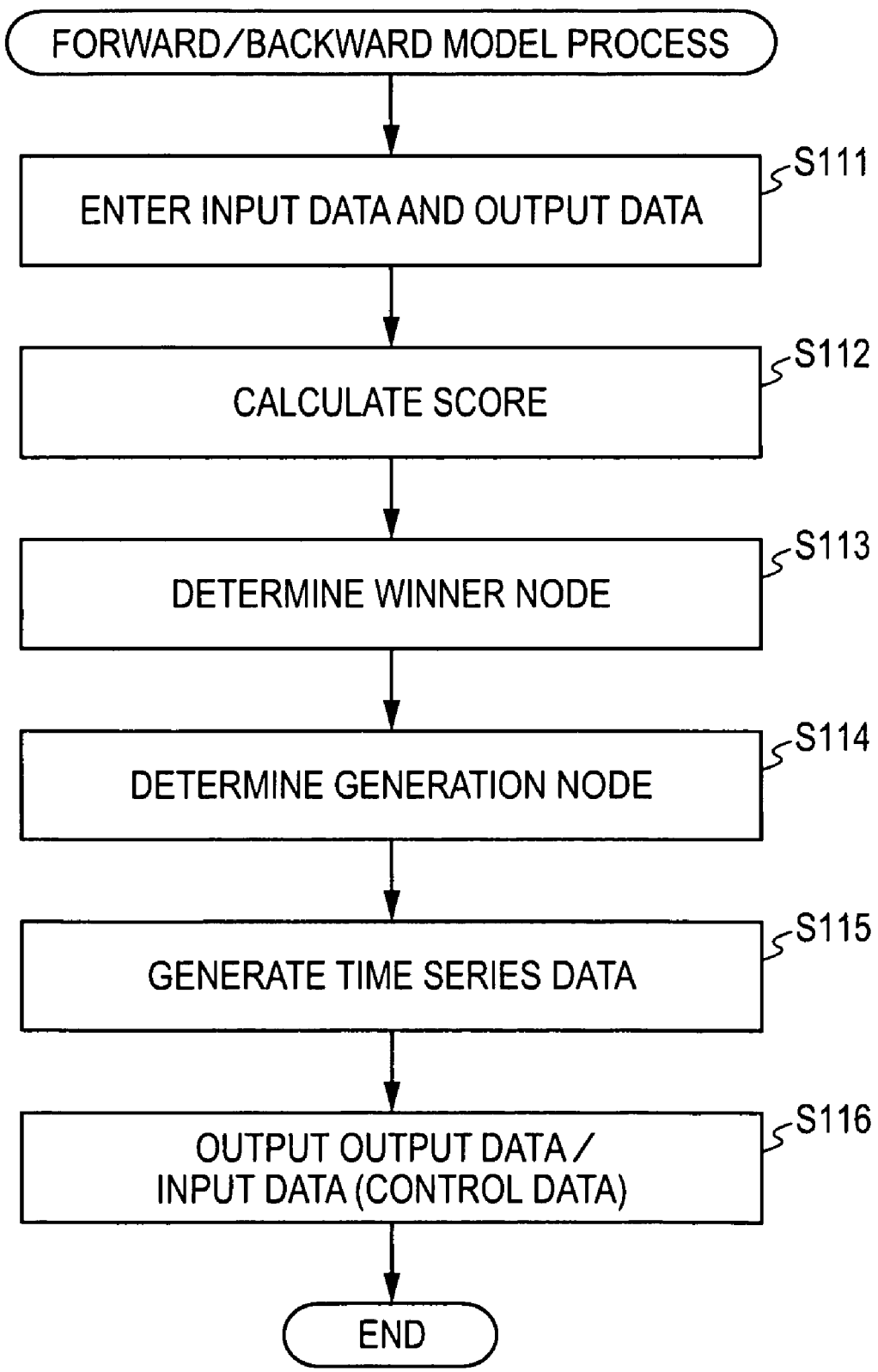
FIG. 31 is a flowchart of a process of estimating output data or control data using the connection network.

In accordance with a further embodiment of the present invention, a method of generating, in response to time series data, other time series data, includes steps of determining, as a winner node, the node most appropriately matching the time series data, in a first time series pattern storage network (for example, one of the time sequence pattern storage network $net_{in}$ and the time sequence pattern storage network $net_{out}$ of FIG. 28) in a connection network, the connection network being composed of interconnected nodes of the first time series pattern storage network and a second time series pattern storage network (for example, the other of the time sequence pattern storage network $net_{in}$ and the time sequence pattern storage network $net_{out}$ of FIG. 28), each of the first and second time series pattern storage networks composed of a plurality of nodes, each node having a time series pattern model representing a time series pattern of the time series data (for example, in step S113 of FIG. 31), determining, as a generation node for generating the other time series data, a node, in the second time series pattern storage network, having a high degree of connection to the winner node (for example, in step 114 of FIG. 31), and generating the other time series data based on the time series pattern storage network of the generation node (for example, in step S115 of FIG. 31).

In accordance with a further embodiment of the present invention, a computer program for causing a computer to generate, in response to time series data, other time series data, includes program code for performing steps of determining, as a winner node, the node most appropriately matching the time series data, in a first time series pattern storage network (for example, one of the time sequence pattern storage network $net_{in}$ and the time sequence pattern storage network $net_{out}$ of FIG. 28) in a connection network, the connection network being composed of interconnected nodes of the first time series pattern storage network and a second time series pattern storage network (for example, the other of the time sequence pattern storage network $net_{in}$ and the time sequence pattern storage network $net_{out}$ of FIG. 28), each of the first and second time series pattern storage networks composed of a plurality of nodes, each node having a time series pattern model representing a time series pattern of the time series data (for example, in step S113 of FIG. 31), determining, as a generation node for generating the other time series data, a node, in the second time series pattern storage network, having a high degree of connection to the winner node (for example, in step S114 of FIG. 31), and generating the other time series data based on the time series pattern storage network of the generation node (for example, in step S115 of FIG. 31).

The embodiments of the present invention are described below with reference to the drawings.

Figure 2:
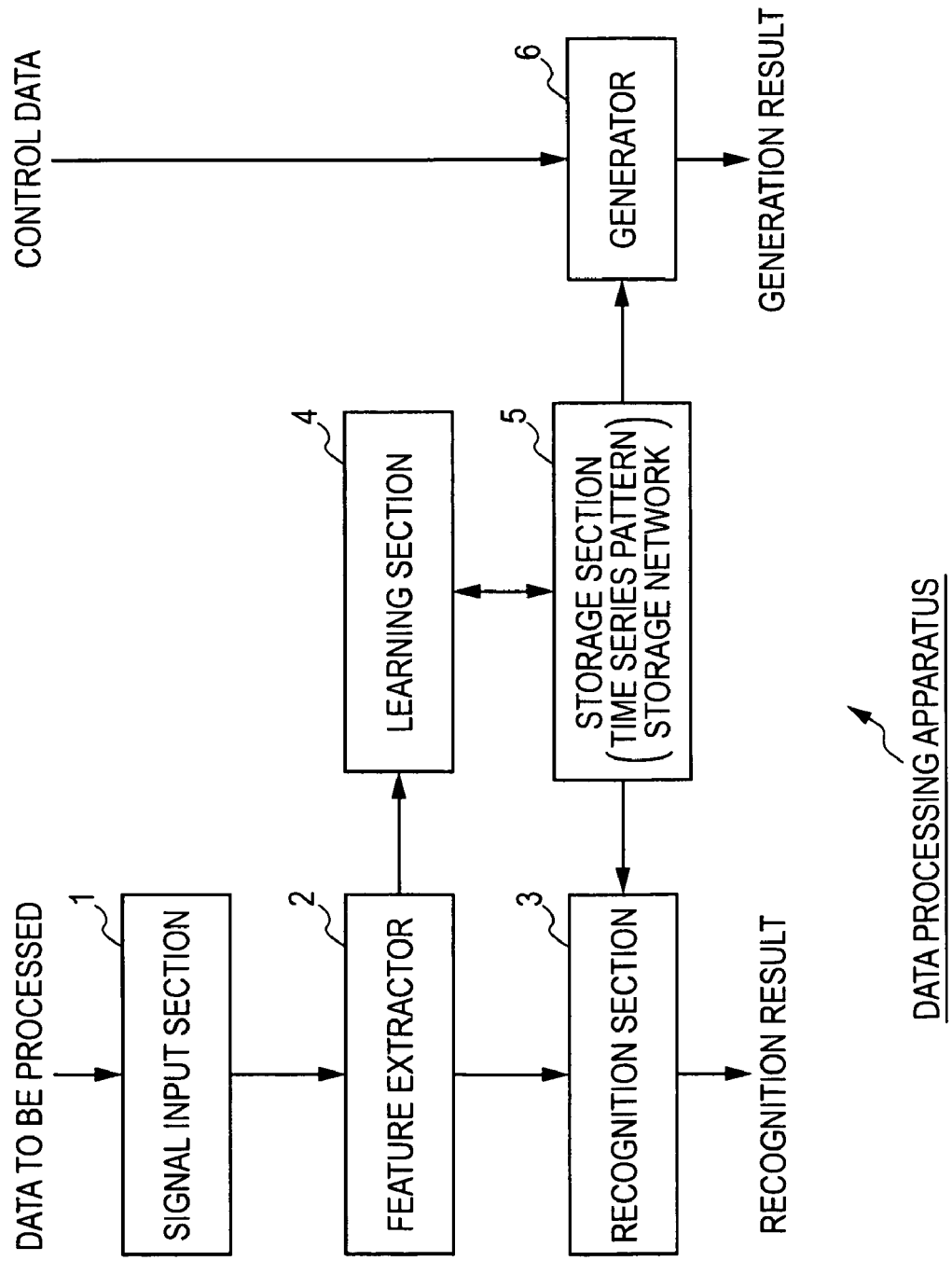
FIG. 2 is a block diagram illustrating a data processing apparatus in accordance with a first embodiment of the present invention.

FIG. 2 is a block diagram of a data processing apparatus in accordance with a first embodiment of the present invention.

A signal input section 1 receives data to be learned in a learning process and recognized in a recognition process (the data hereinafter is also referred to as data to be processed). The data to be processed includes a sound, an image, luminance of a light emitting diode (LED), and an observed value of an angle of rotation or an angular velocity of a motor (i.e., a signal observed from the outside world). The data to be processed may also include data output from an input device of a system incorporating the data processing apparatus of FIG. 2 (i.e., input data), and data provided to an output device of the system (i.e., output data).

The data processing apparatus of FIG. 2 can be incorporated in robots including biped robots. If a biped robot performs a process in response to a change in an environmental situation, the signal input section 1 may include a sensor for sensing the change in the environmental situation. More specifically, the signal input section 1 may include a microphone and a camera.

If the signal input section 1 is composed of a microphone, the biped robot (a system incorporating the data processing apparatus) receives sounds generated in the outside (including all sounds such human voices, sounds of crying of animals, and other naturally generated sounds), and audio data corresponding to the input sounds is supplied to a feature extractor 2. If the signal input section 1 is composed of a camera, the camera receives light entering from the outside world, as the input data to the biped robot, and video data corresponding to the input light is supplied to the feature extractor 2.

If the biped robot has four limbs that can be manipulated by a motor of an actuator, the signal input section 1 may include a measuring device measuring the angle of rotation or a rotational speed of the motor (a sensor sensing the angle of rotation or the rotational speed). The motor driving the limbs of the biped robot rotates in response to not only a drive signal as an electrical signal but also an external force applied to the four limbs. The measuring device can measure any of the angle of rotation and the rotation speed caused in response to any of the two input signals applied to the biped robot.

If the signal input section 1 includes the measuring device, a signal representing one of the angle of rotation and the rotational speed of the motor is input to and measured by the measuring device, and the measuring result is supplied to the feature extractor 2.

The data input to the signal input section 1 can be steady-state data invariable with time (steady-state signal) or nonsteady-state data variable with time (nonsteady-state signal).

It is assumed in the following discussion that the signal input section 1 receives a sound as one of time series data, and that voice data of a voiced sound period is supplied from the signal input section 1 to the feature extractor 2. The detection method of the voice sound period is not limited to any particular one. It is not a requirement that the voice data supplied from the signal input section 1 to the feature extractor 2 have the length of the voiced sound period. The voice data can be delimited by a proper length. More specifically, the voice data supplied from the signal input section 1 to the feature extractor 2 can have the length of a phoneme unit, a phonological unit, a word, a sentence, or the length of one punctuation mark to the next punctuation mark.

The data supplied from the signal input section 1 to the feature extractor 2 is not limited to voice data, and the audio period is not limited to any particular one. More specifically, the data to be supplied from the signal input section 1 to the feature extractor 2 may be delimited by a proper length using any appropriate method. The audio period of the data supplied from the signal input section 1 to the feature extractor 2 may or may not be invariable in length.

The feature extractor 2 extracts a feature from the voice data as time series data from the signal input section 1, and supplies the feature of the time series data obtained as a result to each of a recognition section 3 and a learning section 4. The feature extractor 2 performs a frequency analysis process on the voice data from the signal input section 1 at constant time intervals, thereby extracting a feature such as a Mel frequency cepstrum coefficient (MFCC). The feature extractor 2 then supplies time series data of MFCC to each of the recognition section 3 and the learning section 4. The time series data supplied from the feature extractor 2 to each of the recognition section 3 and the learning section 4 is a value that has been observed from the outside world.

The recognition section 3 recognizes the time series data supplied from the feature extractor 2 based on a time series pattern storage network, to be discussed later, stored in the storage section 5, and outputs the recognition result.

The learning section 4 updates, in a self-organizing manner, the time series pattern storage network stored in a storage section 5 in accordance with (the observed value of) the time series data supplied from the feature extractor 2. The learning section 4 updates a parameter of the time series pattern storage network stored in the storage section 5 in accordance with the time series data supplied from the feature extractor 2. Occasionally, the updating of the parameter is also referred to as learning.

When repeatedly supplied with time series data having no correct-answer label attached thereto, the learning section 4 executes unsupervised learning to acquire, in a self-organizing manner, a pattern unique to the time series data (a time series pattern). The storage section 5 thus stores efficiently a typical time series pattern in the time series pattern storage network. More specifically, the time series data supplied from the feature extractor 2 to each of the recognition section 3 and the learning section 4 is classified into several time series patterns, and the learning section 4 performs a learning process to store a typical time series pattern of the time series data in the time series pattern storage network.

The storage section 5 stores the time series pattern storage network, and the parameters of the time series pattern storage network are updated by the learning section 4 as appropriate.

The generator 6 is supplied with control data. The control data supplied to the generator 6 represents any of time series patterns (node label to be discussed later) stored in the time series pattern storage network in the storage section 5. In accordance with the time series pattern storage network of the storage section 5, the generator 6 generates and outputs time series data of a time series pattern represented by the control data.

Figure 3:
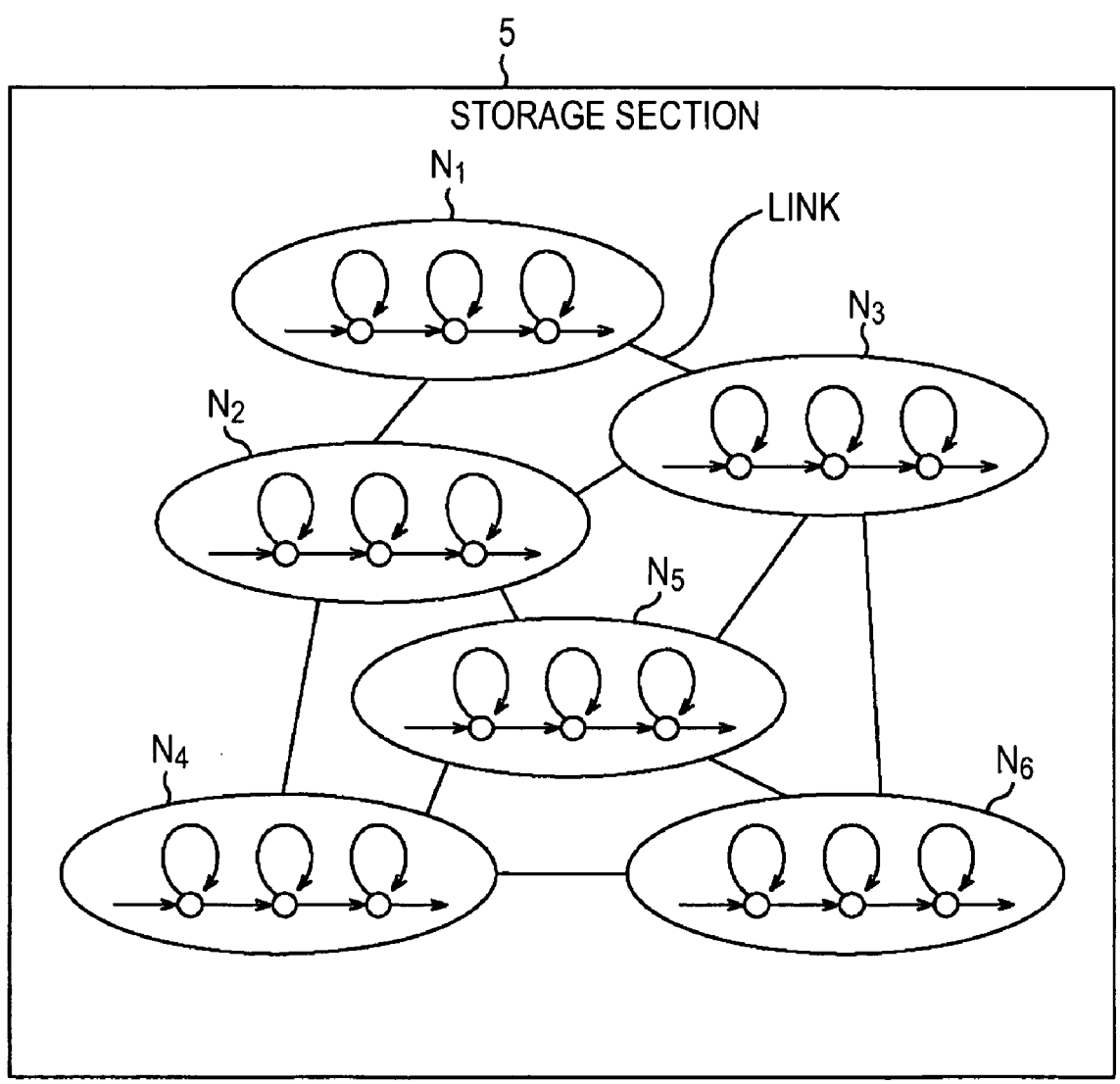
FIG. 3 illustrates a first configuration of time series pattern storage network.

FIG. 3 illustrates a time series pattern storage network stored in the storage section 5 of FIG. 2.

The time series pattern storage network is composed of a plurality of nodes, each node holding a time series pattern model representing a time series pattern of the time series data. The whole network stores the time series patterns (for classification) of the number equal to the number of nodes.

As shown in FIG. 3, the time series pattern storage network includes six nodes $N_1$ through $N_6$.

Node $N_i$ (i=1, 2, . . . , 6 in FIG. 3) forming the time series pattern storage network holds a time sequence pattern model representing a time series pattern of the time series data. Node $N_i$ has a connection relation with another node $N_j$ (j=1, 2, . . . , 6 in FIG. 3). The connection relation is also referred to as a link. As shown in FIG. 3, for example, node $N_3$ has a direct connection with each of nodes $N_1$, $N_2$, $N_5$, and $N_6$. Each of nodes $N_5$ and $N_6$ has an indirect connection relation with node $N_1$ via node $N_3$. The connection relation between two nodes $N_i$ and $N_j$ means the shortest connection relation between the two nodes $N_i$ and $N_j$.

The learning section 4 (see FIG. 2) learns the time series pattern storage network based on the time series data supplied from the feature extractor 2 as learning data. The type of category and the number of categories of the learning data are not known. The time series pattern storage network is substantially different from supervised learning discussed with reference to FIG. 1. The learning data for use in learning the time series pattern storage network has no correct-answer label attached thereto. For this reason, the supervised learning discussed with reference to FIG. 1 cannot apply to the learning of the time series pattern storage network.

The supervised learning cannot apply to the learning of the time series pattern storage network and the type of each category and the number of categories of the learning data is unknown. The time series pattern storage network is learned in a self-organizing manner so that the feature (time series pattern) of the learning data is appropriately represented by the nodes of the time series pattern storage network.

The learning of the time series pattern storage network is of the type of unsupervised learning. In the learning of the time series pattern storage network, any given single node does not necessarily correspond to one category. More specifically, learning may be performed in the time series pattern storage network with one node corresponding to one category, or with one node corresponding to a plurality of categories. Even if the learning data is not clearly categorized, learning is performed using the time series pattern storage network.

Figure 4:
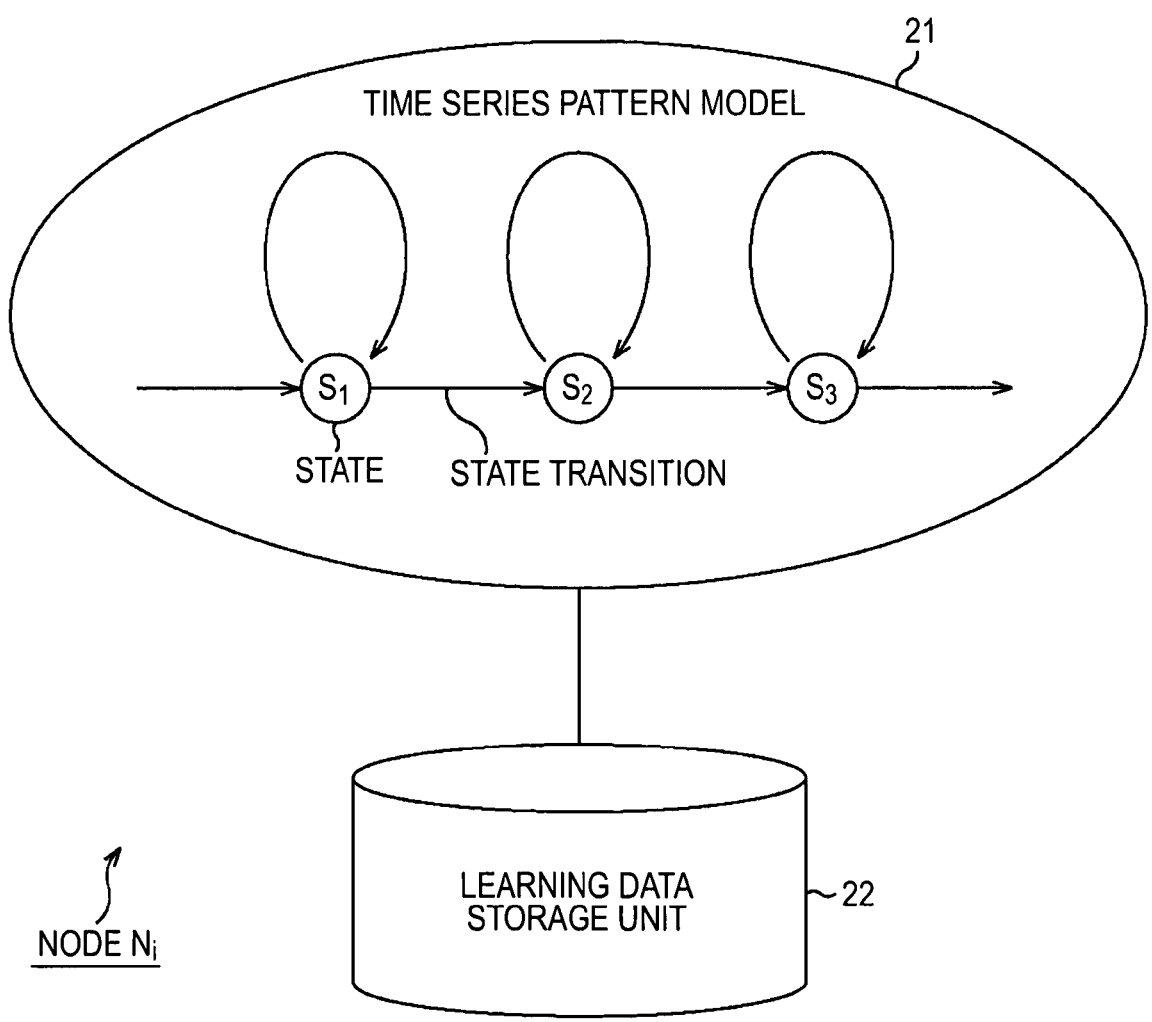
FIG. 4 illustrates the structure of a node.

FIG. 4 illustrates the structure of a node $N_i$ of the time series pattern storage network.

The node Ni is composed of a time series pattern model 21 representing a time series pattern of the time series data and a learning data storage unit 22 storing the learning data of the time series pattern model 21.

As shown in FIG. 4, HMM (continuous HMM) as a state probability transition model is employed for the time series pattern model 21. As shown in FIG. 4, HMM includes three left-to-right states $S_1$, $S_2$, and $S_3$, each having own loop and a state transition to a next state (right adjacent state). Each circle enclosing each of $S_1$ through $S_3$ in the time series pattern model 21 of FIG. 4 represents a state, and each arrow-headed line or loop represents a state transition. HMM as the time series pattern model 21 is not limited to one of left-to-right type and three-state type.

If the time series pattern model 21 is HMM of FIG. 4, the HMM as the time series pattern model 21 is defined by state transition probability and output probability density function (in the case of discrete HMM, a probability that a discrete symbol as a scalar quantity is output).

The state transition probability of HMM is a probability of state transition and is provided to each state transition indicated by an arrow-headed line as shown in FIG. 4. The output probability density function represents a probability density of a value observed from HMM. A normal-distribution mixture is usually used for the output probability density function. The parameters of HMM (the state transition probability and the output probability density function) are learned (estimated) using Baum-Welch technique.

In the node $N_i$, statistic characteristics of the learning data stored in the learning data storage unit 22, namely, the time series pattern of the learning data stored in the learning data storage unit 22, is learned, and the time series pattern model 21 is thus associated with the learning data stored in the learning data storage unit 22.

The learning of the time series pattern storage network, namely, the learning of the time series pattern model 21 in the node $N_i$ is performed in online learning. The online learning is performed each time the time series data (of one period) is supplied from the feature extractor 2 to the learning section 4. The parameters of the time series pattern storage network, namely, the parameters of the time series pattern model 21 of the node $N_i$ (the state transition probability and the output probability density function as described above if the time series pattern model 21 is HMM) are updated bit by bit each time the data (of one period) to be processed is supplied from the signal input section 1 to the feature extractor 2.

As will be discussed later, the learning section 4 receives, from the feature extractor 2, new time series data responsive to the feature of new time series data that is supplied from the signal input section 1 to the feature extractor 2. As the learning of the time series pattern storage network is in progress, the learning data stored in the learning data storage unit 22 is updated with new time series data supplied from the feature extractor 2 to the learning section 4 and thus changes bit by bit. The learning of the time series pattern model 21 is performed based on the learning data changing bit by bit. The parameters of the time series pattern model 21 are also changing bit by bit.

Figure 5:
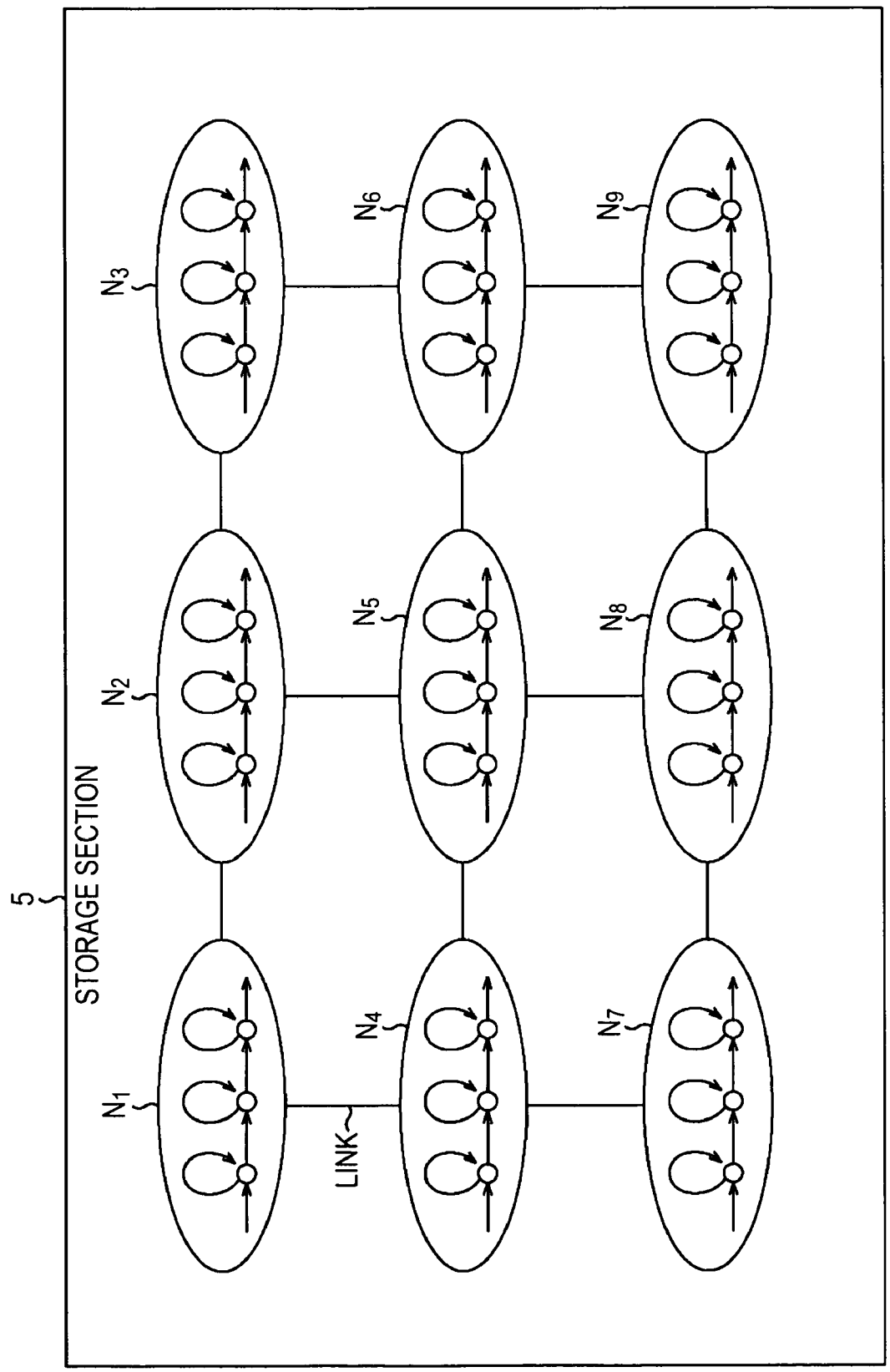
FIG. 5 illustrates a second configuration of time series pattern storage network.

FIG. 5 diagrammatically illustrates another time series pattern storage network stored in the storage section 5 of FIG. 2.

The time series pattern storage network of FIG. 5 is composed of nine nodes $N_1$ through $N_9$, which are two-dimensionally arranged. More specifically, the nine nodes $N_1$ through $N_9$ are arranged in a matrix of three rows and three columns in a two-dimensional plane.

As shown in FIG. 5, nodes mutually adjacent to each other in row and nodes mutually adjacent to each other in column, out of two-dimensionally arranged nine nodes $N_1$ through $N_9$, are linked (in connection relation). By linking, the nodes forming the time series pattern storage network are considered as having a two-dimensionally arrangement structure in space.

The distance between any two nodes present in a given space is defined based on the spatial node arrangement structure provided by the link in the time series pattern storage network. The distance between the two nodes is used as an inter-pattern distance of the time series patterns (similarity between time series patterns) represented by the time series pattern model 21 of each of the two nodes.

The inter-pattern distance of the time series patterns represented by the distance between the two nodes is thus based on a connection relation (link) of the two nodes.

The number of links forming the shortest path between the two nodes can be used for the distance of the two nodes. A node having a direct link to a node of interest (a node vertically or horizontally adjacent to the node of interest in FIG. 5) has the closet distance to the node of interest. As for a node traced beyond the node having the direct link to the node of interest, the more the number of links, the farther the distance to the node of interest becomes.

The link given to the node is not limited to the ones shown in FIGS. 3 and 5. The links of FIGS. 3 and 5 provide a two-dimensional arrangement structure to the node. Link can provide a one-dimensional arrangement structure or a three-dimensional arrangement structure. Link is not necessarily provided to the node.

Figure 6:
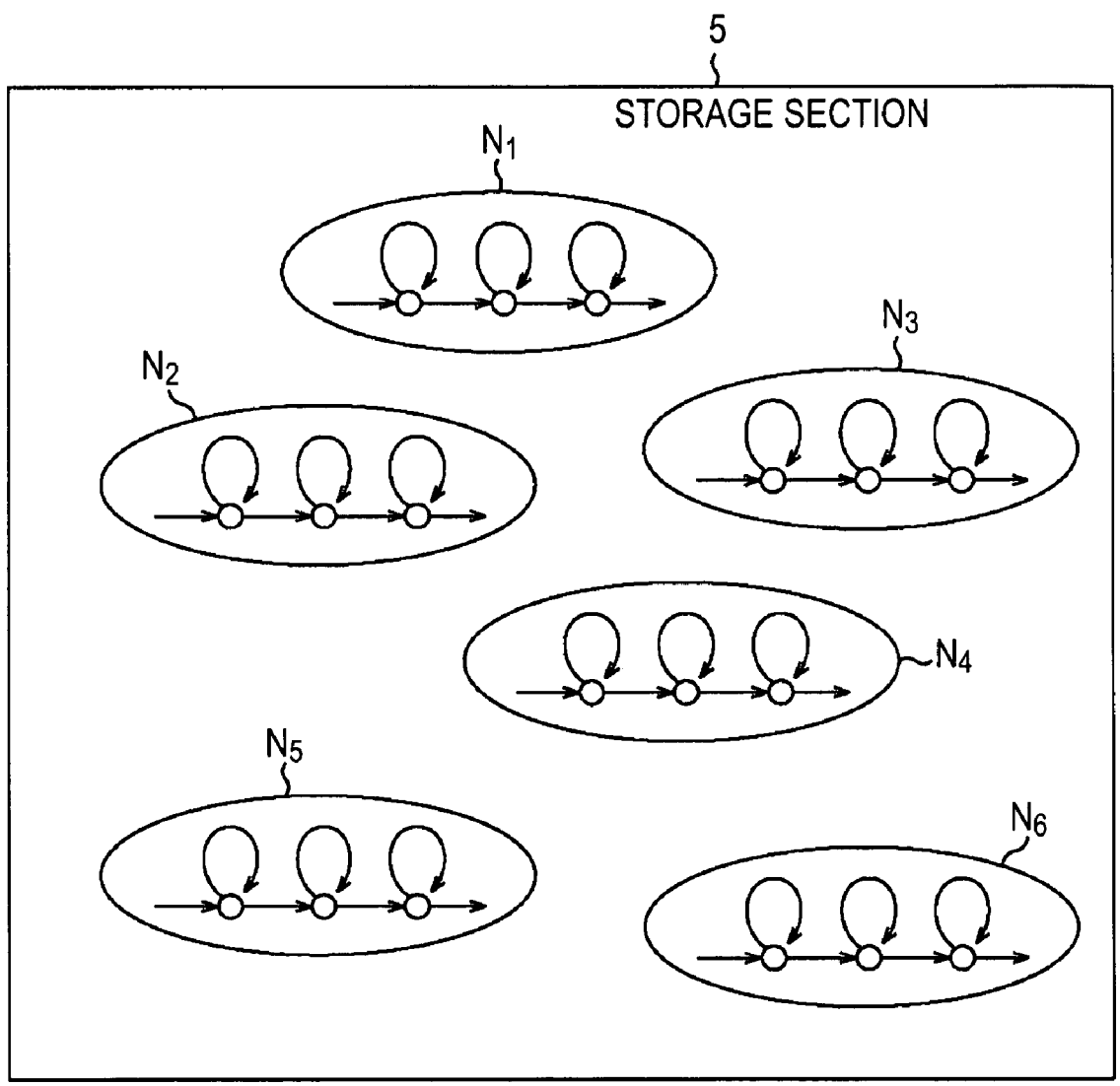
FIG. 6 illustrates a third configuration of time series pattern storage network.

FIG. 6 illustrates another time series pattern storage network stored in the storage section 5 of FIG. 2.

As shown in FIG. 6, the time series pattern storage network is composed of six nodes $N_1$ through $N_6$ in the same way as in FIG. 3, but none of the six nodes $N_1$ through $N_6$ has link. The six nodes $N_1$ through $N_6$ forming the time series pattern storage network of FIG. 6 has no spatial arrangement structure given by link. The nodes having no spatial arrangement structure are considered as being free from any spatial restrictions associated with arrangement structure.

If any two nodes have no link, no distance in space between the two nodes can be defined. The inter-pattern distance based on the connection relation (link) cannot be used as the inter-pattern distance of the time series patterns represented by the time series pattern model 21 of each of the two nodes. In that case, an order based on the degree of match of a node to the observed value of the time series data (hereinafter referred to as match order as appropriate) is used as the inter-pattern distance.

If the time series data is given, the similarity of a time series pattern expressed by a node with that time series data can be determined as the degree of match of the node. The node most appropriately matching given time series data, from among nodes forming the time series pattern storage network, is handled as a winner node. A value of the match order of any node can be used as the inter-pattern distance of the time series pattern, represented by the node in the time series pattern storage network, with respect to the winner node.

More specifically, the match order of a node, as a winner node, from among the nodes forming the time series pattern storage network is first. The inter-pattern distance of the time series patterns between the node (namely the winner node) and the winner node is determined by subtracting 1 from the match order, becoming zero.

The inter-pattern distance between the winner node and a second node in the match order, from among the nodes forming the time series pattern storage network, is determined by subtracting 1 from the match order, thereby becoming 1. Similarly, the value that is obtained by subtracting 1 from the match order of the node is considered as the inter-pattern distance between the winner node and another node.

The inter-pattern distance represented by the value corresponding to the match order determined based on the degree of match of the node to the given time series data is thus considered as an inter-pattern distance.

Figure 7:
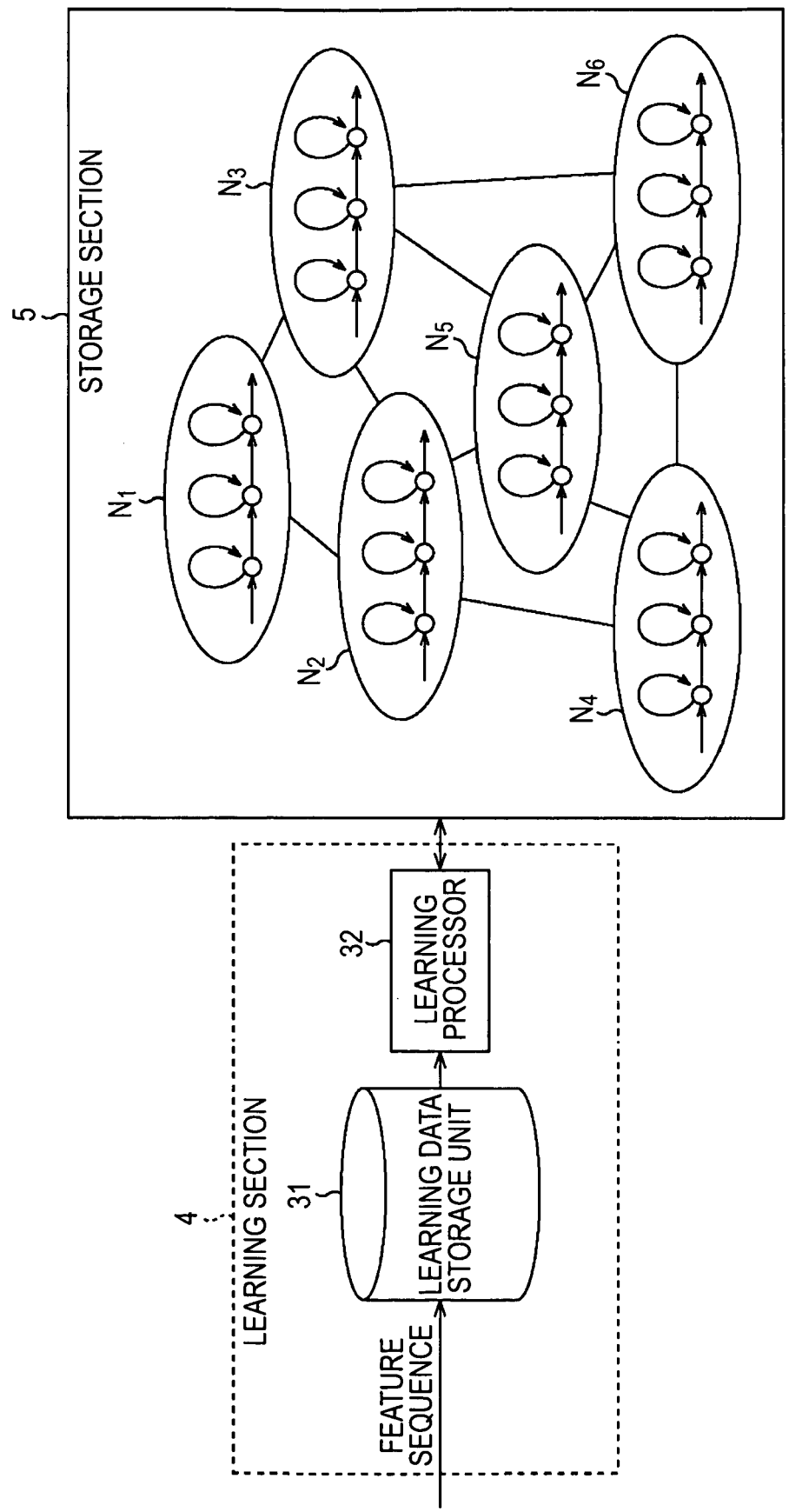
FIG. 7 is a block diagram of a learning section.

FIG. 7 illustrates the structure of the learning section 4 of FIG. 2.

The learning section 4 includes a learning data storage unit 31 and a learning processor 32.

The learning data storage unit 31 is supplied with a series of features as new time series data of one period by the feature extractor 2. The learning data storage unit 31 temporarily stores the new time series data supplied from the feature extractor 2 (until a process of the learning processor 32 based on the new time series data is completed).

The learning processor 32 updates, in a self-organizing manner, the time series pattern storage network stored in the storage section 5 in accordance with the observed value of the new time series data stored in the learning data storage unit 31.

Figure 8:
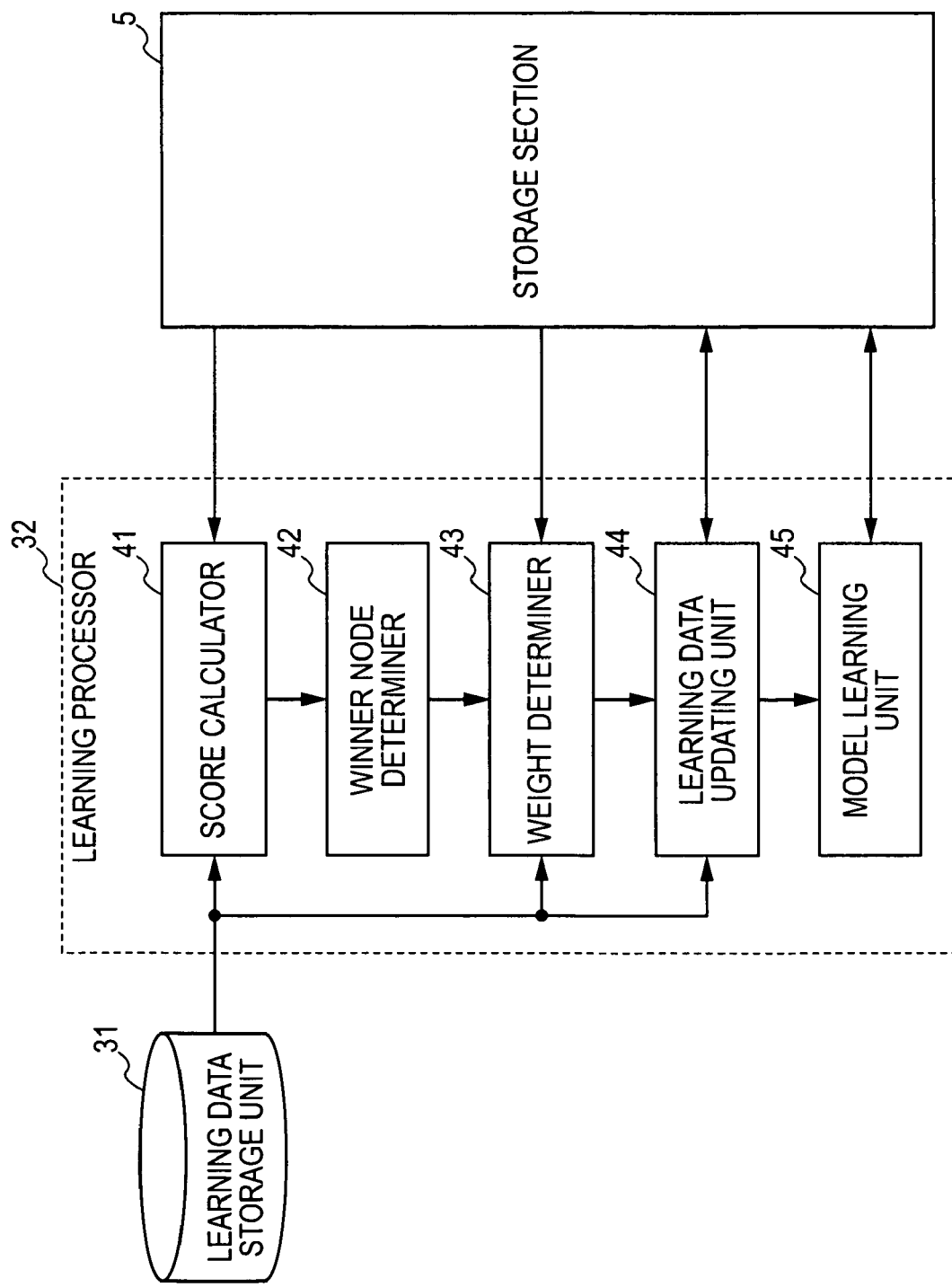
FIG. 8 is a block diagram of a learning processor.

FIG. 8 illustrates the structure of the learning processor 32 of FIG. 7.

A score calculator 41 determines, as a score, the degree of match of each of the nodes forming the time series pattern storage network stored in the storage section 5, the degree of match indicating how well the node matches the observed value of the time series data stored in the learning data storage unit 31, and supplies a winner node determiner 42 with the resulting score. If the time series pattern model 21 of the node is HMM of FIG. 4, the score calculator 41 determines the likelihood of observation of the time series data stored in the learning data storage unit 31, from the HMM as the learning data storage unit 31 of the node, and supplies the winner node determiner 42 with the resulting likelihood as the score of the node.

The winner node determiner 42 determines the node most appropriately matching the time series data stored in the learning data storage unit 31 in the time series pattern storage network stored in the storage section 5, and determines that node as a winner node.

More specifically, the winner node determiner 42 determines, as a winner node, the node having the highest score from the score calculator 41, from among the nodes forming the time series pattern storage network stored in the storage section 5. The winner node determiner 42 supplies a weight determiner 43 with information representing the winner node.

Each node forming the time series pattern storage network is tagged with a node label identifying the node. The node label is thus used as information identifying the winner node and the other nodes. The node label identifies each node itself, and is unrelated to a correct-answer label identifying which is correct.

The weight determiner 43 determines an updating weight of each of the nodes forming the time series pattern storage network stored in the storage section 5, based on the winner node identified by the node label supplied by the winner node determiner 42, and supplies a learning data updating unit 44 with the updating weight.

More specifically, the weight determiner 43 determines the updating weights of the nodes (including the winner node) forming the time series pattern storage network stored in the storage section 5, based on the node and the node's inter-pattern distance to the winner node, and supplies the learning data updating unit 44 with the updating weights.

The time series pattern model 21 (FIG. 4) of the node is updated using the new time series data stored in the learning data storage unit 31 (FIG. 7). The updating weight of the node represents the degree of influence of the new time series data on the time series pattern model 21 when the time series pattern model 21 of the node is updated. If the updating weight of the node is zero, the time series pattern model 21 of the node is not influenced by the new time series data, in other words, is not updated.

The inter-pattern distance is used when the weight determiner 43 determines the updating weight of each node forming the time series pattern storage network stored in the storage section 5. If the nodes of the time series pattern storage network has the links as shown in FIGS. 3 and 5, the inter-pattern distance to be adopted is based on the connection relation between the node and the winner node. If the nodes of the time series pattern storage network are not linked as shown in FIG. 6, the inter-pattern distance to be adopted is based on the degree of match of the node to the time series data stored in the learning data storage unit 31 (FIG. 7).

The weight determiner 43 references the time series pattern storage network stored in the storage section 5, determines the inter-pattern distance based on the connection relation between each of the nodes forming the time series pattern storage network and the winner node represented by the node label from the winner node determiner 42, and then determines the updating weight of each node of the time series pattern storage network based on the inter-pattern distance.

Alternatively, the weight determiner 43 references the time series pattern storage network stored in the storage section 5, and determines the score of each of the nodes of the time series pattern storage network, like the score determined by the score calculator 41, as the degree of match of the node to the time series data stored in the learning data storage unit 31. The weight determiner 43 further determines the value corresponding to the match order based on the score of each of the nodes of the time series pattern storage network, as the inter-pattern distance based on the degree of match of the node matching new time series data. The weight determiner 43 determines the updating weight of each node of the time series pattern storage network.

The score of the node can be determined by the weight determiner 43. Alternatively, the score of the node can be transferred from the score calculator 41 to the weight determiner 43.

The learning data updating unit 44 updates the learning data stored in the learning data storage unit 22 (FIG. 4) of each node of the time series pattern storage network stored in the storage section 5.

The learning data updating unit 44 mixes the learning data already stored in the learning data storage unit 22 of each node with the time series data stored in the learning data storage unit 31 in accordance with the updating weight of the corresponding node supplied from the weight determiner 43 and causes the learning data storage unit 22 to store the mixing result as new learning data. The storage content of the learning data storage unit 22 is thus updated.

The learning data updating unit 44 updates the learning data stored in the learning data storage unit 22 (FIG. 4) in accordance with the updating weight, and notifies the model learning unit 45 of the end of updating.

Upon receiving the end notice from the learning data updating unit 44, the model learning unit 45 learns the time series pattern model 21 of each node in the storage network in the time series pattern, using the learning data stored in the learning data storage unit 22 (FIG. 4) subsequent to the updating process of the learning data updating unit 44. The model learning unit 45 thus updates the time series pattern model 21.

The model learning unit 45 performs the updating process of the time series pattern model 21 of the node based on (a portion of) the learning data stored in the learning data storage unit 22 (FIG. 4) of the node, and the new time series data stored in the learning data storage unit 31. Since the storage content of the learning data storage unit 22 is already updated, the updating of the time series pattern model 21 by the model learning unit 45 can be considered as being performed based on the updating weight.

Figure 9:
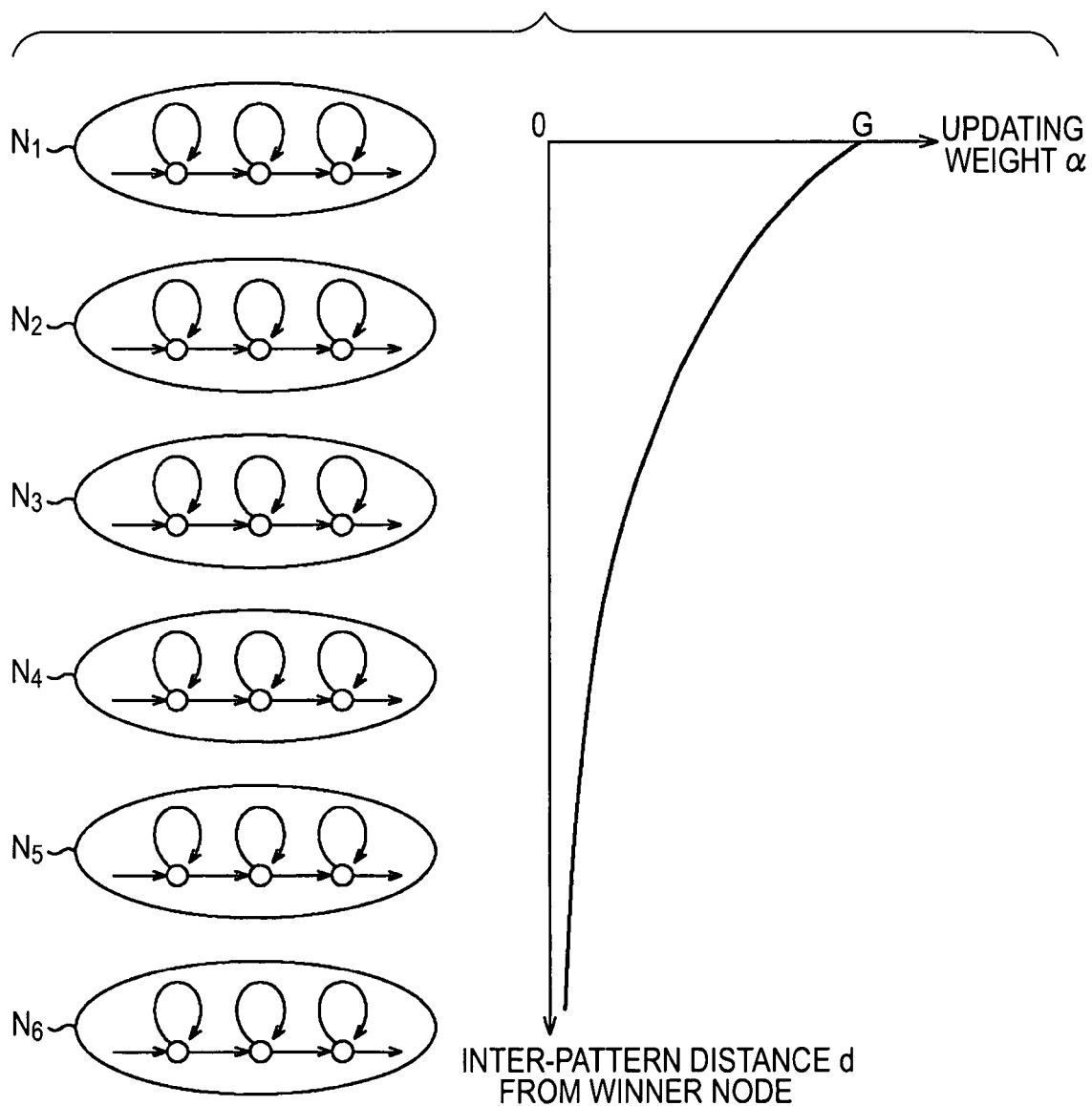
FIG. 9 illustrates a determination method of determining an updating weight.

FIG. 9 illustrates a determination method performed by the weight determiner 43 of FIG. 8 in the determination of the updating weight.

The weight determiner 43 determines the updating weight of the node in accordance with a distance/weight curve of FIG. 9. The distance/weight curve represents the relationship that an updating weight α decreases as an inter-pattern distance d to the winner node increases. In accordance with the distance/weight curve, the closer the inter-pattern distance d to the winner node, the larger the updating weight α results, and the farther the inter-pattern distance d to the winner node, the smaller the updating weight α results.

In the distance/weight curve of FIG. 9B, the abscissa represents the updating weight α in a direction from left to right, and the ordinate represents the inter-pattern distance d in a direction from up to down.

As shown in FIG. 9, the inter-pattern distance based on the connection relation of the node, namely, the distance to the winner node is adopted as the inter-pattern distance d. Along the ordinate, the six nodes $N_1$ through $N_6$ forming the time series pattern storage network are arranged at positions corresponding to the distance of each node $N_i$ to the winner node.

The six nodes $N_1$ through $N_6$ forming the time series pattern storage network are arranged in the order of distance from near to far to the winner node as shown in FIG. 9B. From among the six nodes $N_1$ through $N_6$ forming the time series pattern storage network, a node closest in distance to the winner node, namely, the node $N_1$ having distance zero to the winner node, is the winner node.

If the time series pattern storage network has a two-dimensional arrangement structure of FIG. 5, and if the winner node is the node $N_6$, the distance between the winner node and the node $N_6$ is closest, namely, zero, and the inter-pattern distance d between the node $N_6$ and the winner node $N_6$ is also zero. The distance between the winner node $N_6$ and each of the nodes $N_3$, $N_5$, and $N_9$ is second closest, namely, 1, and the inter-pattern distance d between the winner node $N_6$ and each of the nodes $N_3$, $N_5$, and $N_9$ is also 1. The distance between the winner node $N_6$ and each of nodes $N_2$, $N_4$, and $N_8$ is third closest, namely, 2, and the inter-pattern distance d of each of nodes $N_2$, $N_4$, and $N_8$ to the winner node $N_6$ is also 2. The distance between the winner node $N_6$ and each of node $N_1$ and $N_7$ is the farthest (fourth closest), namely, 3, and the inter-pattern distance d of each of node $N_1$ and $N_7$ and the winner node $N_6$ is also 3.

In the time series pattern storage network having no link as shown in FIG. 6, the inter-pattern distance based on the degree of match of the node matching the new time series data, namely, the value corresponding to the match order based on the degree of match of the node to the new time series data is determined as the inter-pattern distance d between that node and the winner node. In this case, the inter-pattern distance d between the node having the highest score (namely, the winner node) and the winner node is zero, and the inter-pattern distance d between the node having the second highest score and the winner node is 1. Similarly, the inter-pattern distance d between the node having the k-th highest score and the winner node is k−1.

The method of determining the inter-pattern distance d between each node and the winner node in the time series pattern storage network is similar to the method of determining distance in SOM and the neural gas algorithm.

The distance/weight curve of FIG. 9B, representing the relationship between the updating weight α and the inter-pattern distance d, is expressed in equation (1):

$$\alpha = G\gamma^{d/\Delta} \qquad (1)$$

where G is a constant representing the updating weight of the winner node, γ represents an attenuation coefficient falling within a range of 0<γ<1, and Δ is a variable for adjusting the updating weight α of a node in the vicinity of the winner node (the node having the close inter-pattern distance d to the winner node) when SMA is employed as the update method of updating the time series pattern storage network.

The inter-pattern distance d of the node as the winner node is zero, and the inter-pattern distances d of other nodes are 1, 2, . . . in accordance with the distance to the winner node or the match order. If G=8, γ=0.5, and Δ=1 in equation (1), the updating weight α of the node serving as the winner node is 8 (=G). As the distance to the winner node or the match order increases, the updating weight α of the node decreases as 4, 2, 1, . . .

If the variable Δ in equation (1) is large, the rate of change of the updating weight α with respect the inter-pattern distance d becomes mild. Conversely, if the attenuation coefficient Δ is small, the rate of change of the updating weight α with respect to the inter-pattern distance d becomes sharp.

If the variable Δ is adjusted to be closer from 1 to zero bit by bit, the rate of change of the updating weight α with respect to the inter-pattern distance d becomes sharp, and the larger the inter-pattern distance d, the smaller the updating weight $\alpha$. If the variable $\Delta$ is close to zero, the updating weight $\alpha$ of the nodes other than the winner node becomes almost zero. In this case, the results are almost equivalent to the results provided by the WTA as the updating process of the time series pattern storage network.

If SMA is used as the updating process of updating the time series pattern storage network, the updating weight $\alpha$ of a node in the vicinity of the winner node is adjusted by adjusting the variable $\Delta$.

The variable $\Delta$ is set to be large at the time of the start of the updating (learning) of the time series pattern storage network. With time elapsing, in other words, with the number of updates increasing, the variable $\Delta$ is set to be small. When the updating of the time series pattern storage network starts, the updating weight $\alpha$ of each node of the time series pattern storage network is determined in accordance with the distance/weight curve having a mild rate of change of the updating weight $\alpha$ to the inter-pattern distance d. With the updating (learning) in progress, the updating weight $\alpha$ of each node of the time series pattern storage network is determined in accordance with the distance/weight curve having a sharp rate of change of the updating weight $\alpha$ to the inter-pattern distance d.

Regardless of the process of the learning, the updating of the winner node is strongly influenced by the effect of the new time series data stored in the learning data storage unit 31 of FIG. 8. The updating of the nodes other than the winner node, namely, the nodes falling within a relatively wide area (i.e., from a node having a small inter-pattern distance d to the winner node to a node having a modestly large inter-pattern distance d to the winner node) are influenced by the effect of the new time series pattern storage network. With the learning of the nodes other than the winner node in progress, only the nodes falling within a range becoming gradually narrower are influenced by the effect of the new time series pattern storage network.

As described above, the weight determiner 43 of FIG. 8 determines the updating weight $\alpha$ of each of the time series pattern storage network and the learning data updating unit 44 updates the learning data stored in the learning data storage unit 22 of each node in accordance with the updating weight $\alpha$ of the node.

The updating method of updating the learning data stored in the learning data storage unit 22 of the node is described below with reference to FIG. 10.

The learning data storage unit 22 of the node $N_i$ has already stored the learning data, and the time series pattern model 21 of the node $N_i$ has undergone the learning process using the learning data stored in the learning data storage unit 22.

As previously discussed, the learning data updating unit 44 mixes, in accordance with the updating weight $\alpha$ of the node $N_i$ from the weight determiner 43, the learning data already stored in the learning data storage unit 22 of the node $N_i$ (hereinafter referred to as old time series data as appropriate) and new time series data stored in the learning data storage unit 31 (FIG. 8), and causes the learning data storage unit 22 to store the mixing results as new learning data. The storage content of the learning data storage unit 22 is thus updated to the new learning data.

More specifically, the learning data updating unit 44 generates the new learning data by adding, to the old learning data, the new time series data. The addition of the new time series data to the old learning data is performed at a ratio determined by the updating weight $\alpha$ of the node $N_i$.

If the new time series data is added to the old learning data at a ratio of 1:0, the resulting new learning data obtained as a result contains only the new time series data. If the new time series data is added to the old learning data at a ratio of 0:1, the resulting learning data obtained as a result contains only the old learning data. The updating of the time series pattern model 21 (FIG. 4) of the node $N_i$ is performed using the new learning data. By changing a mixture ratio of the new time series data to the old learning data, the degree of influence (strength) of the new time series data on the time series pattern model 21 during updating is varied.

The updating weight $\alpha$ of the node $N_i$ is adopted as a ratio of the new time series data to the old learning data at the node $N_i$. The larger the updating weight $\alpha$, the larger the ratio of the new time series data gets (with a smaller ratio of the old learning data).

More specifically, the learning data storage unit 22 of the node $N_i$ stores a predetermined number of pieces of time series data (learning data). If the predetermined number is H, the learning of the time series pattern model 21 of the node $N_i$ is always learned using H pieces of learning data (time series data).

If the learning data storage unit 22 stores H pieces of learning data, the number of pieces of new learning data obtained as a result of the mixing of the new time series data and the old learning data also needs to be H. Available as a method of mixing the new time series data with the old learning data at a ratio corresponding to the updating weight $\alpha$ of the node $N_i$ is that the new time series data and the old learning data are mixed at a ratio of $\alpha:(H-\alpha)$.

Figure 10:
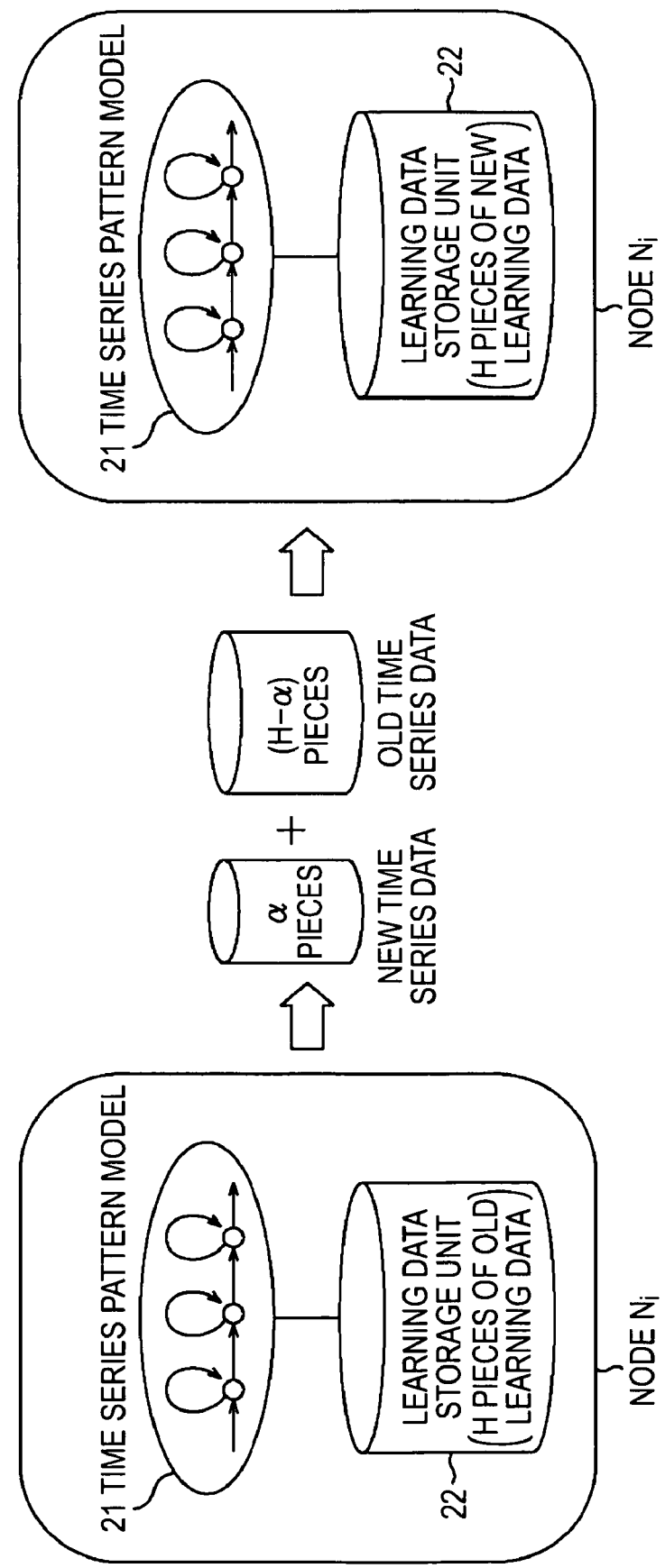
FIG. 10 illustrates an updating method of updating learning data stored in a learning data storage unit.

FIG. 10 shows a specific method of mixing the new time series data with the old learning data at a ratio of $\alpha:(H-\alpha)$. As shown, H pieces of learning data are obtained by adding $\alpha$ pieces of time series data to $(H-\alpha)$ pieces of old learning data out of H pieces of old learning data.

If the H pieces of time series data stored in the learning data storage unit 22 is 100 with the updating weight $\alpha$ of the node $N_i$ being 8, the storage content of the learning data storage unit 22 is updated to 100 pieces of new learning data by adding 8 pieces of new time series data to 92 pieces of old learning data out of the 100 pieces of old learning data.

The $\alpha$ pieces of time series data may be added to $(H-\alpha)$ pieces of old learning data out of the H pieces of old learning data by waiting until the $\alpha$ pieces of new time series data has been obtained. However, this method does not permit the storage content of the learning data storage unit 22 to be updated each time one new piece of time series data is obtained.

Each time one piece of time series data is obtained, the storage content of the learning data storage unit 22 is updated by adding $\alpha$ pieces of the new time series data to the $(H-\alpha)$ pieces of old time series data. More specifically, the one piece of new time series data is copied to form $\alpha$ pieces of new time series data, and the $\alpha$ pieces of new time series data are added to the $(H-\alpha)$ pieces of old learning data that are obtained by eliminating $\alpha$ pieces out of H pieces of old learning data in oldest first manner. In this way, each time one new piece of time series data is obtained, the storage content of the learning data storage unit 22 is updated.

The learning data storage unit 22 continuously stores only H pieces of new time series data as the learning data thereof by updating the storage content thereof in this way. The ratio of the new time series data in the learning data is adjusted by the updating weight $\alpha$ alone.

The learning process of the data processing apparatus of FIG. 2 for learning the time series pattern storage network is described below with reference to a flowchart of FIG. 11.

In step S1, the learning processor 32 in the learning section 4 (FIG. 8) initializes the parameters of the time series pattern storage network stored in the storage section 5, namely, the parameters of HMM as the time series pattern model 21 (FIG. 4) of each node of the time series pattern storage network. In this initialization process, appropriate initial values are imparted to the parameters of HMM (the state transition probability and the output probability density function). The initialization process will be described later in more detail with reference to FIG. 12.

In step S2, upon receiving one piece of data to be processed, namely, voice data of one audio period, the signal input section 1 supplies the received data to the feature extractor 2. The feature extractor 2 extracts a feature from the received data, and supplies time series data of the feature (new one piece of time series data) to the learning section 4.

The learning section 4 (FIG. 7) causes the learning data storage unit 31 to temporarily store the new time series data from the feature extractor 2, and then updates (learns), in a self-organizing manner, the time series pattern storage network, stored in the storage section 5 in steps S3 through S7, based on the observed value of the time series data stored in the learning data storage unit 31.

In step S3, the score calculator 41 of the learning processor 32 (FIG. 8) in the learning section 4 reads the new time series data stored in the learning data storage unit 31, and determines a score of each node of the time series pattern storage network stored in the storage section 5, the score representing the degree of match of the node to the new time series data.

More specifically, if the time series pattern model 21 of FIG. 4 of the node is HMM, a logarithmic likelihood at which the new time series data is observed is determined as the score from HMM. The logarithmic likelihood is calculated using Viterbi algorithm, for example.

The score calculator 41 calculates the score of the new time series data of each of the time series pattern storage network, and supplies the score of each node to the winner node determiner 42.

In step S4, the winner node determiner 42 acquires the score having the highest score from the score calculator 41, from among the nodes forming the time series pattern storage network, and determines that node as a winner node. The winner node determiner 42 supplies the weight determiner 43 with a node label as information representing the winner node.

In step S5, the weight determiner 43 determines the updating weight of each node of the time series pattern storage network with respect to the winner node, as a reference, represented by the node label from the winner node determiner 42.

As previously discussed with reference to FIG. 9, the weight determiner 43 determines the updating weight $\alpha$ of each node of the time series pattern storage network in accordance with the distance/weight curve expressed by equation (1). With the distance/weight curve, the rate of change of the updating weight $\alpha$ to the inter-pattern distance d becomes sharp with the updating (learning) of the time series pattern storage network in progress. The updating weight $\alpha$ is then supplied to the learning data updating unit 44.

In step S6, the learning data updating unit 44 updates the learning data, stored in the learning data storage unit 22 of FIG. 4 of each node of the time series pattern storage network, in accordance with the updating weight of that node from the weight determiner 43. As previously discussed with reference to FIG. 10, the learning data updating unit 44 mixes the new time series data stored in the learning data storage unit 31 with the old learning data stored in the learning data storage unit 22 of the node at a ratio of $\alpha:(H-\alpha)$ corresponding to the updating weight $\alpha$ of that node. The learning data updating unit 44 thus obtains H pieces of new learning data, and updates the storage content of the learning data storage unit 22 in accordance with the H pieces of new learning data.

Upon updating the storage content of the learning data storage units 22 (FIG. 4) of all nodes forming the time series pattern storage network, the learning data updating unit 44 notifies the model learning unit 45 of the end of updating.

Upon receiving the update end notice from the learning data updating unit 44, the model learning unit 45 updates the parameters of the time series pattern storage network in step S7.

The model learning unit 45 learns the time series pattern model 21 using the new learning data stored in the learning data storage unit 22 of each node of the time series pattern storage network subsequent to the updating process of the learning data updating unit 44. The model learning unit 45 thus updates the time series pattern model 21.

More specifically, if the time series pattern model 21 of the node is HMM, HMM learning is performed using the new learning data stored in the learning data storage unit 22 of the node. In this learning process, the current state transition probability and output probability density function of HMM are set to initial values, and a new state transition probability and a new output probability density function are respectively determined using the new learning data through the Baum-Welch technique. The state transition probability and output probability density function of HMM are updated with the new state transition probability and output probability density function.

Processing returns from step S7 to step S2. The data processing apparatus waits until next data to be processed is input to the signal input section 1. When the next data is input, the data processing apparatus iterates the above-described process.

Figure 11:
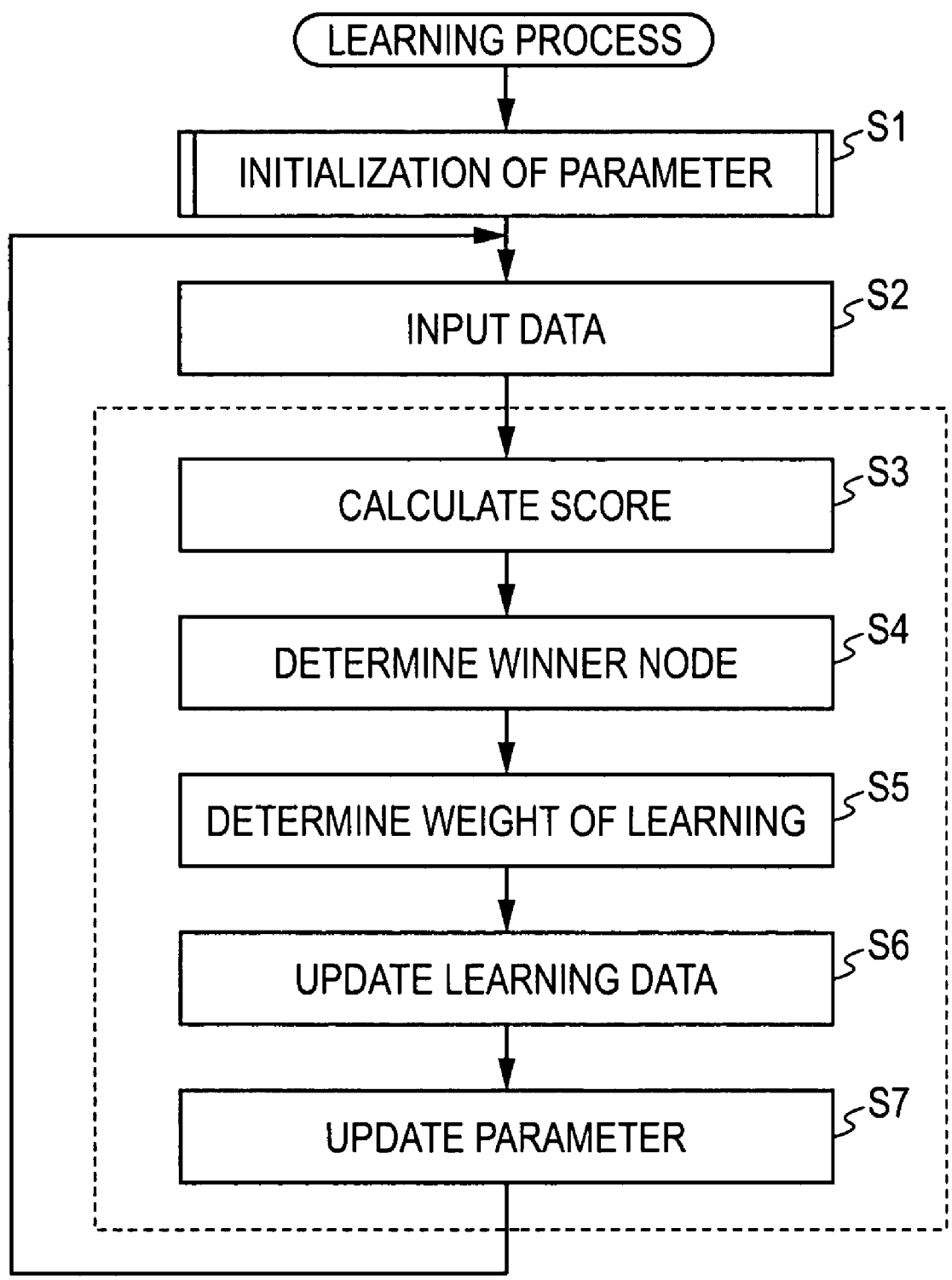
FIG. 11 is a flowchart illustrating a learning process.
Figure 12:
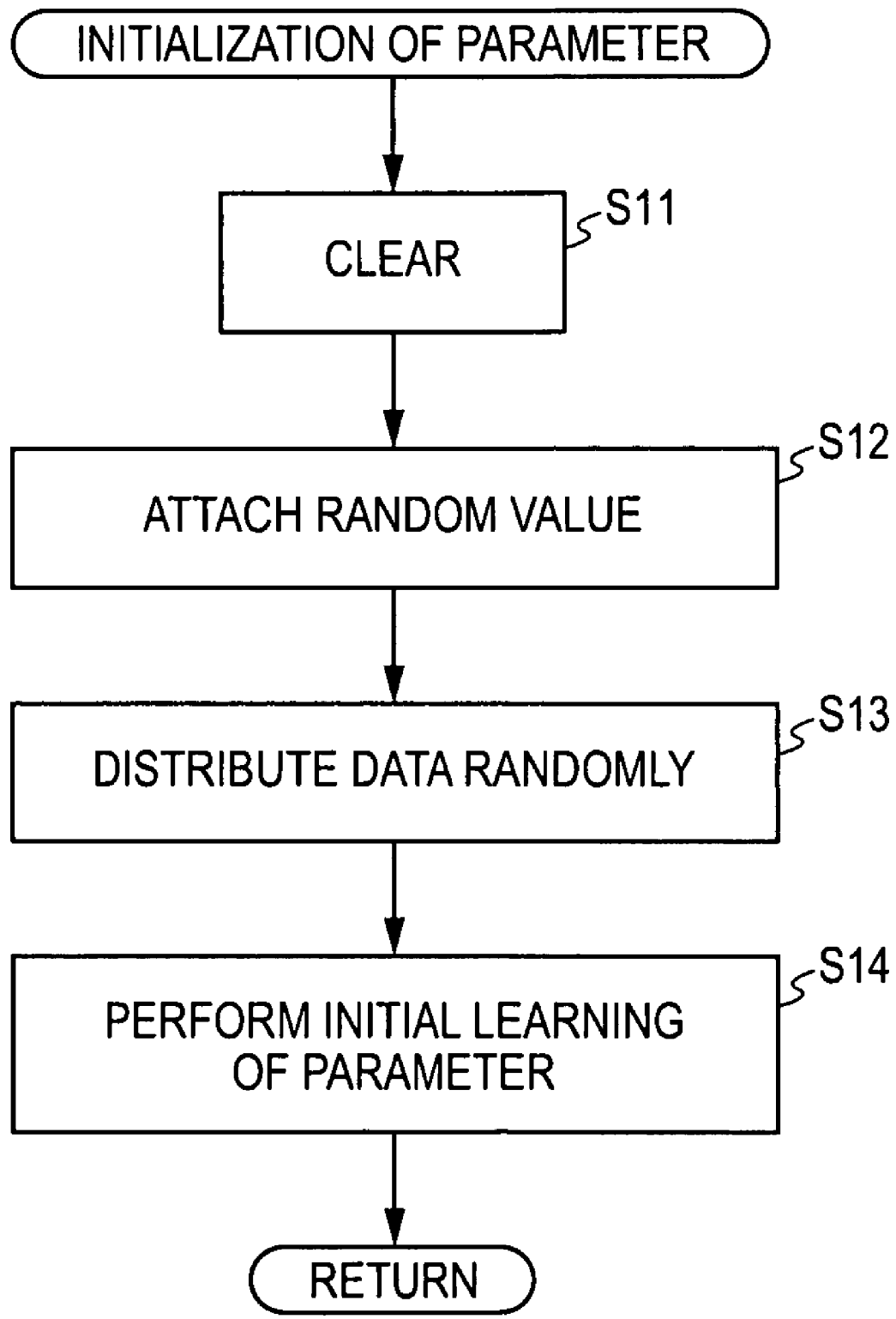
FIG. 12 is a flowchart illustrating an initialization process.

The initialization step performed in step S1 in the learning process of FIG. 11 is described below with reference to a flowchart of FIG. 12. In the initialization step, the parameters of the time series pattern storage network (the parameters of the time series pattern model 21 of the node of the time series pattern storage network) are initialized.

In step S11, the learning data updating unit 44 in the learning processor 32 of FIG. 8 clears the learning data storage unit 22 (FIG. 4) of each node of the time series pattern storage network stored in the storage section 5 so that no learning data (time series data) is present in the learning data storage unit 22.

In step S12, the model learning unit 45 in the learning processor 32 (FIG. 8) sets a random number as a parameter of the time series pattern storage network.

If the time series pattern model 21 (FIG. 4) of each node of the time series pattern storage network is HMM, the parameters of HMM are the state transition probability and the output probability density function. In step S12, random values are set as the state transition probability and the output probability density function (or one of mean vector and covariance matrix defining the output probability density function).

The voice data of one audio period as a single piece of data to be processed is input to the signal input section 1. As previously discussed with reference to FIG. 11, when the learning data storage unit 31 in the learning section 4 (FIG. 6) stores a single piece of new time series data (time series data of feature) corresponding to the data to be processed, the learning data updating unit 44 selects, in a random fashion, at least one node from the nodes forming the time series pattern storage network in step S13, and distributes, to that node, new time series data stored in the learning data storage unit 31.

In step S13, at least one node is selected in a random fashion from the nodes forming the time series pattern storage network, and the new time series data stored in the learning data storage unit 31 is then stored in (added to) the learning data storage unit 22 (FIG. 4) of the node as the learning data.

The distribution of new time series data in step S13 is iterated each time the learning data storage unit 31 in the learning section 4 (FIG. 7) stores the new time series data. If H pieces of learning data are stored in the learning data storage units 22 (FIG. 4) of all nodes forming the time series pattern storage network (or if the learning data storage unit 31 stores learning data sufficient to perform HMM learning), the model learning unit 45 performs the learning process on HMM as the time series pattern model 21 of each node of the time series pattern storage network, using the learning data stored in the learning data storage unit 22 of the node. In the learning process, a new state transition probability and a new output probability density function are determined using the Baum-Welch technique with the random values set as the initial values of the state transition probability and the output probability density function of HMM in step S12. The initial values of the state transition probability and the output probability density function of HMM are updated with the new state transition probability and the new output probability density function.

In the initialization process, required learning data is stored in the learning data storage unit 22 of each of all nodes forming the time series pattern storage network, and the initial values of the parameters of HMM are determined in the learning process using the learning data.

When a single piece of new time series data is obtained in the learning process of FIG. 11, a winner node is determined in response to the new time series data from among the nodes forming the time series pattern storage network (step S4). The updating weight of each node forming the time series pattern storage network is determined with respect to the winner node (step S5). Based on the updating weight, the parameters of the time series pattern model 21 (FIG. 4) of each node of the time series pattern storage network are then determined.

Updating of the parameters of the node of the time series pattern storage network is performed once for one piece of new time series data in the learning process of FIG. 11. Similarly, each time new time series data is obtained, the updating of the parameters of each node is iterated. The learning process is thus performed in a self-organizing manner.

When sufficient learning is performed, the time series pattern model 21 of the node of the time series pattern storage network learns (acquires) a certain time series pattern. The number of (types) of time series patterns learned in the entire time series pattern storage network equals the number of nodes contained in the time series pattern storage network. For example, if the number of nodes contained in the time series pattern storage network is 100, 100 types of time series patterns are learned. Based on the time series pattern, the recognition section 3 (FIG. 2) performs a recognition process on the time series data (data to be processed). The generator 6 (FIG. 2) performs a generation process to generate the time series data.

In the learning process of FIG. 11, the new time series data stored in the learning data storage unit 31 is mixed with the old learning data stored in the learning data storage unit 22 of the node at a ratio of $\alpha$:(H$-\alpha$) corresponding to the updating weight $\alpha$ of that node. H pieces of new learning data are thus obtained. The learning of the time series pattern model 21 of the node is thus performed using H pieces of new learning data. The parameters of the time series pattern model 21 of the node are thus updated. Besides the above-described updating method of the parameters of the node, any other method can be used as long as the method permits new time series data to be reflected in the parameters of the node in response to the updating weight $\alpha$.

It is important to update the parameters of the node bit by bit each time new time series data is given, and to adjust the level of influence of the new time series data on the learning of the node in response to the updating weight of the node.

In the learning process of the node, it is important to appropriately adjust, with time (with the number of updates of the parameters of the node), the updating weight, namely, the level of influence of the new time series data on the parameters of the node through the learning of the node using the new time series data. In accordance with this embodiment, the updating weight $\alpha$ is adjusted in response to the variable $\Delta$ in equation (1). With the learning process in progress, the nodes subject to the influence of the new time series data are gradually adjusted from nodes falling within a wide range with respect to the winner node (i.e., a large number of nodes) to nodes falling within a narrow range (i.e., a small number of nodes). As long as this adjustment is achieved, any method of learning the node (updating the parameters of the node) can be used.

The method of updating only the parameters of the time series pattern model 21 of the winner node corresponds to WTA, and the method of updating the parameters of the time series pattern models 21 of the nodes other than the winner node corresponds to SMA. In the learning process of FIG. 11, the parameters of each node are updated through SMA. Updating of the parameters of each node using WTA can be possible.

When new time series data is provided in the learning process of FIG. 11, online learning of the node is performed using the new time series data. Batch learning can also be adopted as the node learning method. In the batch learning method, learning is performed using new time series data only after a substantial number of pieces of time series data have been obtained.

Figure 13:
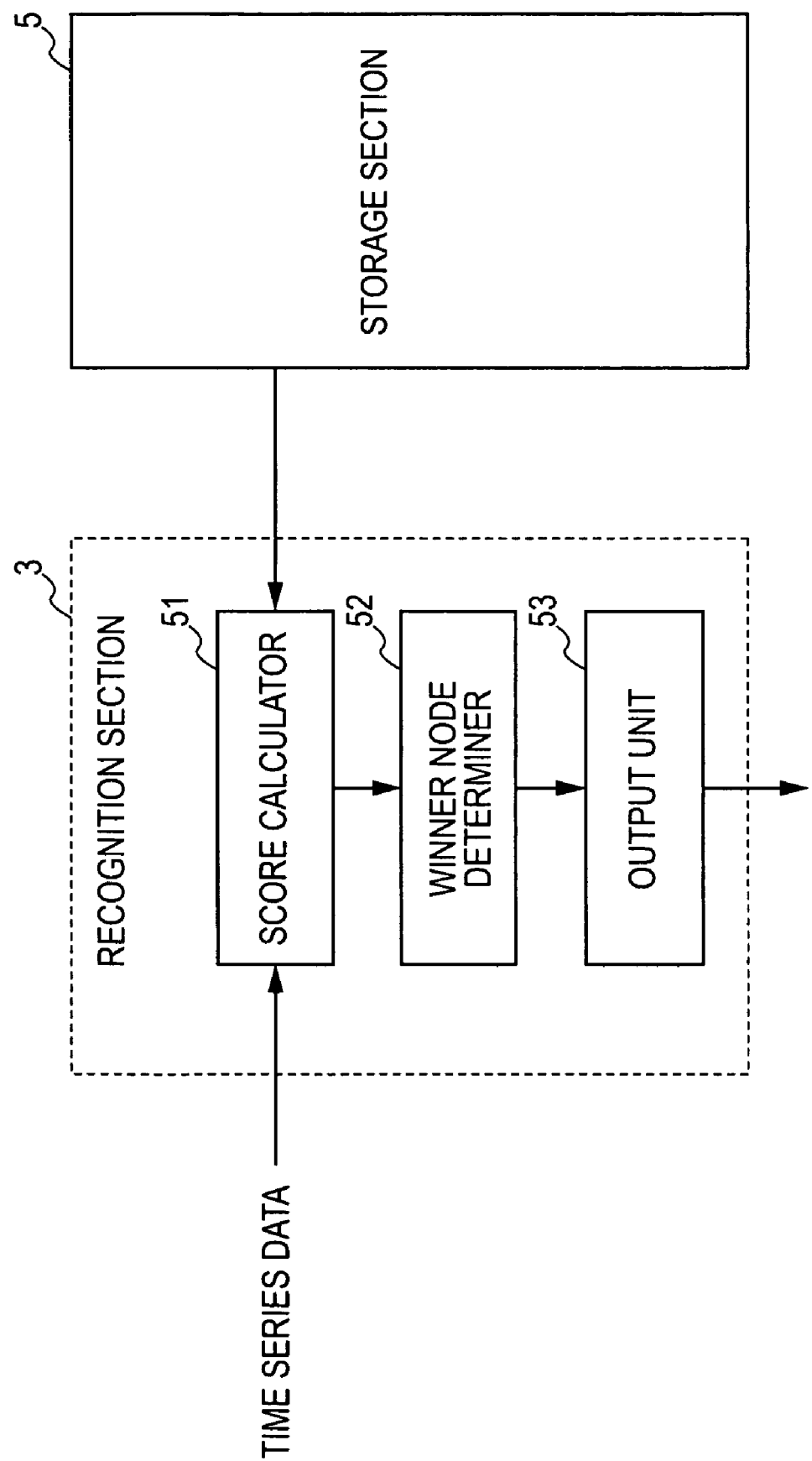
FIG. 13 is a block diagram of a recognition section.

FIG. 13 illustrates the structure of the recognition section 3 of FIG. 2.

As previously discussed with reference to FIG. 2, the feature extractor 2 supplies one piece of time series data to the recognition section 3. The time series data is supplied to a score calculator 51.

As the score calculator 41 in the learning processor 32 (FIG. 4), the score calculator 51 determines a score representing the degree of match of each node of the time series pattern storage network stored in the storage section 5, with the observed value of the time series data from the feature extractor 2, and supplies a score to the winner node determiner 52. If the time series pattern model 21 of the node is HMM as shown in FIG. 4, the score calculator 51 determines a logarithmic likelihood at which the time series data from the feature extractor 2 is observed, from the time series pattern model 21 of the node as HMM, and supplies the determined logarithmic likelihood as the score of the node to the winner node determiner 52.

As the winner node determiner 42 in the learning processor 32 (FIG. 8), the winner node determiner 52 determines the node most appropriately matching the time series data from the feature extractor 2 in the time series pattern storage network stored in the storage section 5, and determines that node as a winner node.

More specifically, the winner node determiner 52 determines, as a winner node, the node having the highest score from the score calculator 51, from among the nodes forming the time series pattern storage network stored in the storage section 5. The winner node determiner 52 outputs information representing the winner node to an output unit 53.

The output unit 53 outputs the node label from the winner node determiner 52 as the time series data of the feature from the feature extractor 2, thus as the recognition results of the data input to the signal input section 1 responsive to the feature.

The score calculator 51 in the recognition section 3 can serve as the score calculator 41 in the learning processor 32 (FIG. 8) with the score calculator 41 eliminated entirely, or the score calculator 41 can serve as the score calculator 51 with the score calculator 51 eliminated entirely. The same is true of the winner node determiner 52 in the recognition section 3 and the winner node determiner 42 in the learning processor 32 (FIG. 8).

A recognition process of the data processing apparatus of FIG. 2 for recognizing the time series data is described below with reference to a flowchart of FIG. 14.

In step S21, one piece of data to be process, namely, voice data of one audio period (time series data) is input to the signal input section 1. The signal input section 1 supplies the input data to the feature extractor 2. The feature extractor 2 extracts a feature from the time series data as the data to be processed, and supplies the time series data of feature to the recognition section 3.

In step S22, the score calculator 51 in the recognition section 3 (FIG. 13) determines a score representing the degree of match of each node of the time series pattern storage network stored in the storage section 5 to the time series data from the feature extractor 2.

More specifically, if the time series pattern model 21 (FIG. 4) of the node is HMM, a logarithmic likelihood at which the time series data from the feature extractor 2 is observed is determined from HMM using the Viterbi algorithm. The score calculator 51 calculates the scores of all nodes contained in the time series pattern storage network in response to the time series data from the feature extractor 2, and supplies the score of each node to the winner node determiner 52.

In step S23, the winner node determiner 52 determines the node having the highest score from the score calculator 51, from among the nodes forming the time series pattern storage network, and determines that node as a winner node. The winner node determiner 52 outputs a node label representing the winner node to the output unit 53.

The output unit 53 outputs the node label from the winner node determiner 52 as the recognition result of the feature extractor 2 responsive to the time series data (the data to be processed input to the signal input section 1). Processing thus ends.

The node label output from the output unit 53 (node label of the winner node) can be supplied to the generator 6 as control data.

In the recognition process using the time series pattern storage network, the recognition result having a fineness responsive to the number of nodes of the time series pattern storage network is thus obtained.

For example, the learning of the time series pattern storage network is now performed using voice data resulting from pronunciation of three categories "A", "B", and "C".

If the voice data of the three categories "A", "B", and "C" used in the learning of the time series pattern storage network contains pronunciations of a large number of speakers, even the voice data of the category "A" includes a variety of voice data different in pronunciation speed, intonation, sex and age of speaker, etc.

In the supervised learning, the learning of the voice data of the categories "A", "B", and "C" is performed using only the voice data of "A", the voice data of "B", or the voice data of "C". Variations due to difference in the pronunciation speed do not take place in the learning results of each category.

In the learning of the time series pattern storage network, the voice data of the categories "A", "B", and "C" is used without distinction. As previously discussed, the time series patterns of the number equal to the number of nodes contained in the time series pattern storage network are learned.

For example, if the number of nodes of the time series pattern storage network is larger than 3, a time series pattern of one variation of the voice data of the category "A" is learned in one node while a time series pattern of another variation is learned in another node.

A variety of time series patterns of the voice data of the category "A" are learned in a plurality of nodes in this way. If the voice data of the category "A" is input in the recognition process, the node most appropriately matching the data to be processed is determined as a winner node from among the plurality of nodes leaned from the voice data of the category "A", and the node label of the winner node is output as the recognition result.

In the recognition process of using the time series pattern storage network, it is not determined which voice data of categories "A", "B", and "C" the data to be processed falls within. It is determined which of the time series patterns of the number equal to the number of nodes is most appropriate as a result of the learning of the time series pattern storage network.

In the learning of the time series pattern storage network, the time series patterns are acquired at fineness depending on the number of nodes contained in the time series pattern storage network. In the recognition process using the time series pattern storage network, the time series data is classified at fineness depending on the number of nodes contained in the time series pattern storage network.

Each node of the time series pattern storage network sufficiently learned can be appropriately tagged with a correct-answer label of the categories "A", "B", and "C" in accordance with the time series pattern acquired by that node, and if so, it is determined in the recognition process of the time series pattern storage network which voice data of the categories "A", "B", and "C" the time series data (the data to be processed) falls within.

Figure 15:
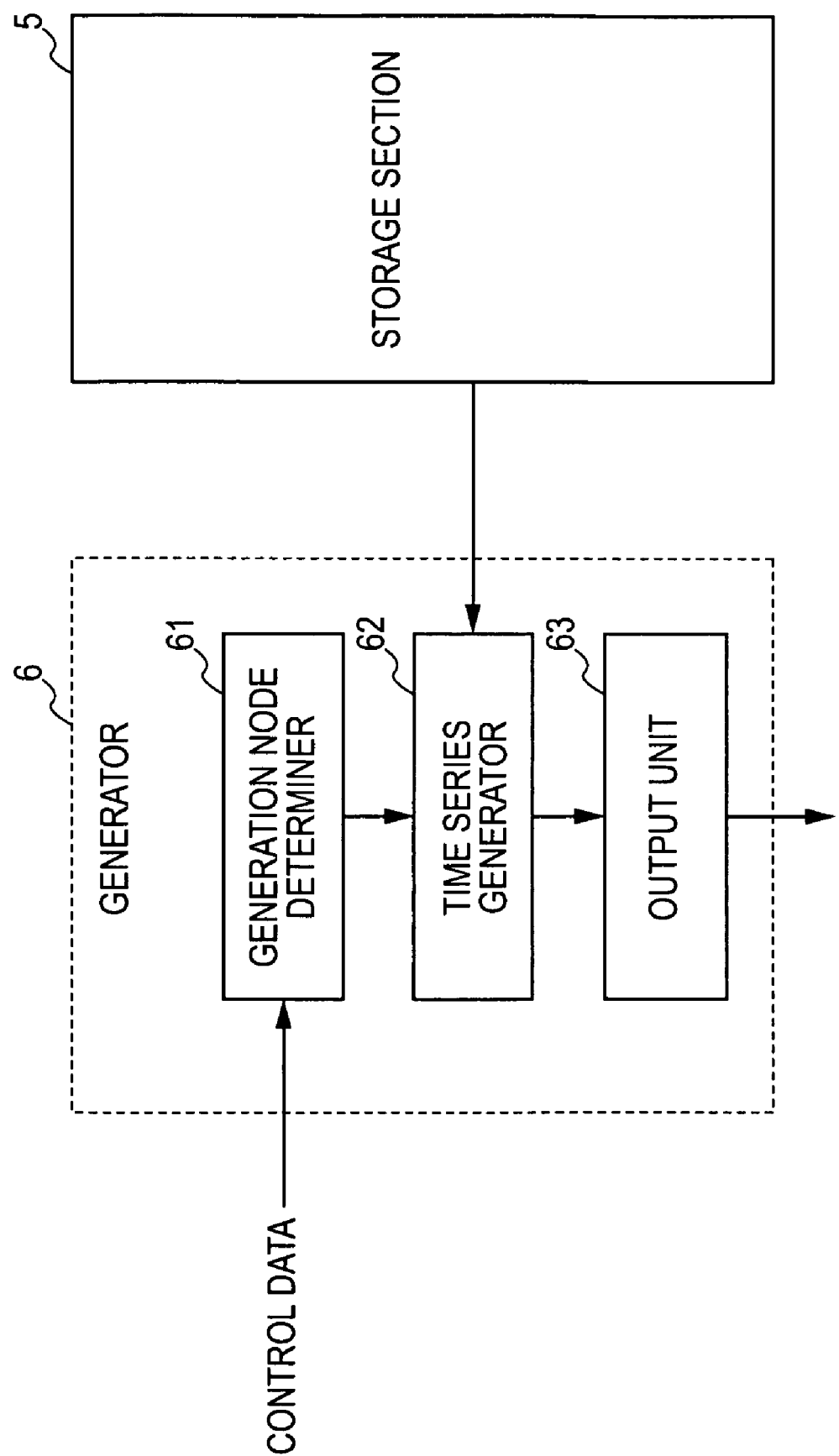
FIG. 15 is a block diagram illustrating a generator.

FIG. 15 illustrates the structure of the generator 6 of FIG. 2.

As previously discussed with reference to FIG. 2, the generator 6 receives the control data. The control data supplied to the generator 6 represents one of the time series patterns stored in the time series pattern storage network of the storage section 5 and any node forming the time series pattern storage network. The control data is a node label, for example.

The control data input to the generator 6 is supplied to a generation node determiner 61. The generation node determiner 61 determines, as a node for use in generating the time series data (hereinafter referred to as a generation node), a node represented by the control data supplied thereto, in the time series pattern storage network stored in the storage section 5. The generation node determiner 61 then supplies the determination result to a time series generator 62.

More specifically, the generation node determiner 61 determines, as the generation node, the node represented by the node label as the control data supplied thereto, and supplies the determination result to the time series generator 62.

In accordance with the determination result of the generation node determiner 61, the time series generator 62 generates the time series data based on the time series pattern model 21 (FIG. 4) of the generation node, and outputs the generated time series data to the output unit 63.

For example, if the time series pattern model 21 is HMM, the time series generator 62 generates the time series data that maximizes the output probability representing the likelihood at which the time series data of HMM as the time series pattern model 21 is observed. A method of generating time series data that mildly changes using a dynamic feature is available as the method of generating the time series data using HMM. The time series generator 62 generates the time series data using such a method for example, the method of generating the time series data is described by K. Tokuda, T. Yoshimura, T. Masuki, T. Kobayashi, and T. Kitamura in the paper entitled "SPEECH PARAMETER GENERATION ALGORITHMS FORM HMM-BASED SPEECH SYNTHESIS", Proc. of ICASSP 2000, vol. 3, pp. 1315-1318, June 2000.

Other methods have been also proposed. For example, in one proposed method, time series data is repeatedly generated based on probabilistic trials using HMM parameters. This method is described by T. Inamura, H. Tanie, and Y. Nakamura in the paper entitled "Key Frame Extraction and Decompression for Time Series Data Based on Continuous Hidden Markov Models" Proceedings of Japan Society of Mechanical Engineers Robotics and Mechatronics Conference 2P1-3F-C6, 2003.

The output unit 63 converts the time series data from the time series generator 62 into time series data corresponding to the data to be processed, and then outputs the resulting time series data. More specifically, the time series data generated in the time series generator 62 is the time series data of the feature used in the learning of the time series pattern model 21 of the node. The output unit 63 converts the time series data of feature into the time series data of the data to be processed.

More specifically, the data to be processed is voice data. It is assumed that the time series pattern model 21 is HMM. The feature extractor 2 extracts cepstrum from the voice data as a feature. Since the time series data of cepstrum is learned by the time series pattern model 21 (FIG. 4), the time series data generated by the time series generator 62 is the time series data of cepstrum. The output unit 63 converts the time series data of cepstrum generated by the time series generator 62 into voice data as the time series data to be processed.

A filtering method is available to convert the time series data of cepstrum into the voice data (audio in time domain). In this method, the time series data of cepstrum is filtered by a synthesis filter called MLSA (Mel log spectrum approximation) filter. For example, the MLSA filter is described in detail by S. Imai, K. Sumita, and C. Furuichi in the paper entitled "Mel Log Spectral Approximation (MLSA) Filter for Speech Synthesis", Transactions of the Institute of Electronics, Information, and Communication Engineers (IECE), J66-A, 2, pp. 122-129, and by K. Tokuda, T. Kobayashi, H. Saitoh, T. Fukada, and S. Imai in the paper entitled "Speech Spectral Estimation Using Mel Cepstrum As Parameters", Transactions (A) of the IECE, J74-A, 8, pp. 1240-1248, 1991.

The generation process of the data processing apparatus of FIG. 2 for generating time series data (data to be processed) is described below with reference to a flowchart of FIG. 16.

In step S31, the control data is input to the generator 6. The control data input to the generator 6 is fed to the generation node determiner 61. In step S32, the generation node determiner 61 determines, as the generation node, the node represented by the node label as the control data, from among the nodes forming the time series pattern storage network stored in the storage section 5. The generation node determiner 61 supplies the determination result to the time series generator 62.

In step S33, in response to the determination result of the generation node determiner 61, the time series generator 62 generates time series data based on the parameters of the time series pattern model 21 of the generation node from among the nodes forming the time series pattern storage network stored in the storage section 5, and supplies the generated time series data to the output unit 63. In step S34, the output unit 63 converts the time series data from the time series generator 62 into time series data corresponding to the data to be processed.

In the generation process using the time series pattern storage network, the time series data of the time series patterns of the number corresponding to the number of nodes forming the time series pattern storage network is generated.

As previously discussed in connection with the recognition process, the learning of the time series pattern storage network is now performed using the voice data of each pronunciation of three categories "A", "B", and "C".

If the voice data of the three categories "A", "B", and "C" used in the learning of the time series pattern storage network contains pronunciations of a large number of speakers, a large number of variations of voice data is present even in the category "A" because of difference in pronunciation speed, intonation, sex and age of speaker, etc. In the voice data of the category "A" a time series pattern of one variation may be learned in one node while a time series pattern of another variation may be learned in another node.

A variety of time series patterns of the voice data of the category "A" are learned in a plurality of nodes in this way. A node label representing one of the plurality of nodes is provided as the control data. The voice data of the category "A" of the variation learned in the node represented by the node label is output. Even in the voice data of the same category, a large number of variations of voice data is thus output.

The time series pattern storage network formed of the plurality of nodes having the time series pattern models 21 is updated in a self-organizing manner based on the time series data. The unsupervised learning is thus easily performed on not only time series data having a constant length but also time series data having a variable length. In other words, autonomous learning is easily performed on the time series data.

Since each node of the time series pattern storage network has a time series pattern model 21, the updating of each node in the learning of the time series pattern storage network does not affect the other nodes forming the time series pattern storage network. If one node is added in the time series pattern storage network, the amount of computation required to learn the time series pattern storage network is simply increased by an amount of calculation for the updating of one node. Even if the scale of the time series pattern storage network is enlarged, in other words, the number of nodes forming the time series pattern storage network increases, the amount of computation required to learn the time series pattern storage network is not dramatically increased. Even a large-scale time series pattern storage network can be learned in a self-organizing manner.

Since each node stores a time series pattern representing statistic characteristics of the time series data in the learning of the time series pattern storage network, the recognition and generation of the time series data are easily performed using the time series pattern. In accordance with the time series pattern storage network, classification and analysis of the time series data are easily performed.

The learning process, the recognition process, and the generation process are performed on any time series data, such as voice data, image data, a signal driving a motor, etc. For example, the data processing apparatus of FIG. 2 can be applied to an autonomous system such as an autonomous robot. The time series data can include signals output by sensors corresponding to visual sense, auditory sense, and tactile sense of the robot, signals for controlling actuators driving the limbs of the robot, and signals supplied to a device synthesizing voice, and an light-emitting diode (LED) corresponding to the eyes of the robot. These signals can be applied as the time series data to be processed in the learning process, the recognition process, and the generation process.

Test results of the learning and recognition of the time series pattern storage network are described below with reference to FIGS. 17 through 20.

In the test, each of the eight persons, namely, four males, and four females, pronounced five types (categories) of time series data "a", "i", "u", "e", and "o" for use in learning, and voice data of 400 pronunciations was thus prepared. Mel cepstrum was adopted as the feature of the voice data. The time series data of the vectors of the Mel cepstrum acquired from the voice data of 400 pronunciations was used in learning in a random order fashion.

In the test, the time series pattern storage network was composed of 30 nodes, and HMM was adopted as the time series pattern model 21 of each node (FIG. 4). HMM as the time series pattern model 21 was left-to-right 10-state HMM. The output probability density function at each state of HMM was a Gauss distribution with a mixture number of 1. As shown in FIG. 6, the time series pattern storage network had an unlinked spatial arrangement structure of FIG. 6. The inter-pattern distance d determining the updating weight α was obtained by subtracting from the match order by 1, more specifically, the inter-pattern distances d of the nodes are 0, 1, 2, . . . in the order from high to low scores to the new time series data learned.

The number of pieces of time series data held in the learning data storage units 22 (FIG. 4) of the nodes of the time series pattern storage network was 100, and the learning data of the learning data storage unit 22 was updated so that the ratio of the new time series data to the old learning data became $\alpha$:(H−$\alpha$) in response to the updating weight α of the node. More specifically, the updating of the learning data of the learning data storage units 22 was performed by deleting α pieces of old learning data from H pieces of old learning data in an oldest first manner, and by copying the new time series data by α times, and adding α pieces of new time series data to remaining (H−α) pieces of old learning data. The updating weight α for use in updating the learning data was rounded up to the nearest one for integer.

The updating weight a was determined in accordance with equation (1) with constant G=6 and attenuation coefficient $\gamma$=0.5. At the start of the learning process, variable Δ=1, and the learning process was in progress (the number of updates of the time series pattern storage network increased), the variable Δ approached zero bit by bit to adjust the updating weight α.

The learning of the time series pattern storage network was performed in online learning. In the test, a total of 14000 operations of online learning were conducted.

Baum-Welch technique was used in the learning of the parameters of HMM, and Viterbi algorithm was used to calculate the score.

To acquire the time series data in the recognition process in the test, each of the six persons, namely, three males and three females, different from the test subjects in the learning process, pronounced five types of categories "A", "I", "U", "E", and "O" by ten times. Voice data of 300 pronunciations was prepared as the time series data. To assess recognition, correct-answer labels representing the categories "A", "I", "U", "E", and "O" are respectively and tentatively attached to the nodes of the time series pattern storage network. If the node of the right correct-answer label right for the input of the voice data for recognition (correct-answer label representing the category of input voice data) becomes a winner node, "correctness" is counted. If the node of the wrong correct-answer label (correct-answer label not representing the category of input voice data) becomes a winner node, "incorrectness" is counted. In accordance with the following equation (2), the ratio of "correctness" to the total number of pieces of voice data for recognition is determined as a correct answer ratio representing achievement of correct recognition.

Correct answer ratio=(Count of correct answers/total number of pieces of voice data for recognition)×100%   (2)

The correct-answer labels "A", "I", "U", "E", and "O" are respectively attached to the nodes of the time series pattern storage network as below. The categories of the voice data stored as the learning data on the learning data storage unit 22 of each node of the time series pattern storage network are examined, and the correct-answer label representing the category having the highest ratio of the voice data stored in the learning data storage unit 22 is attached to that node.

Figure 17:
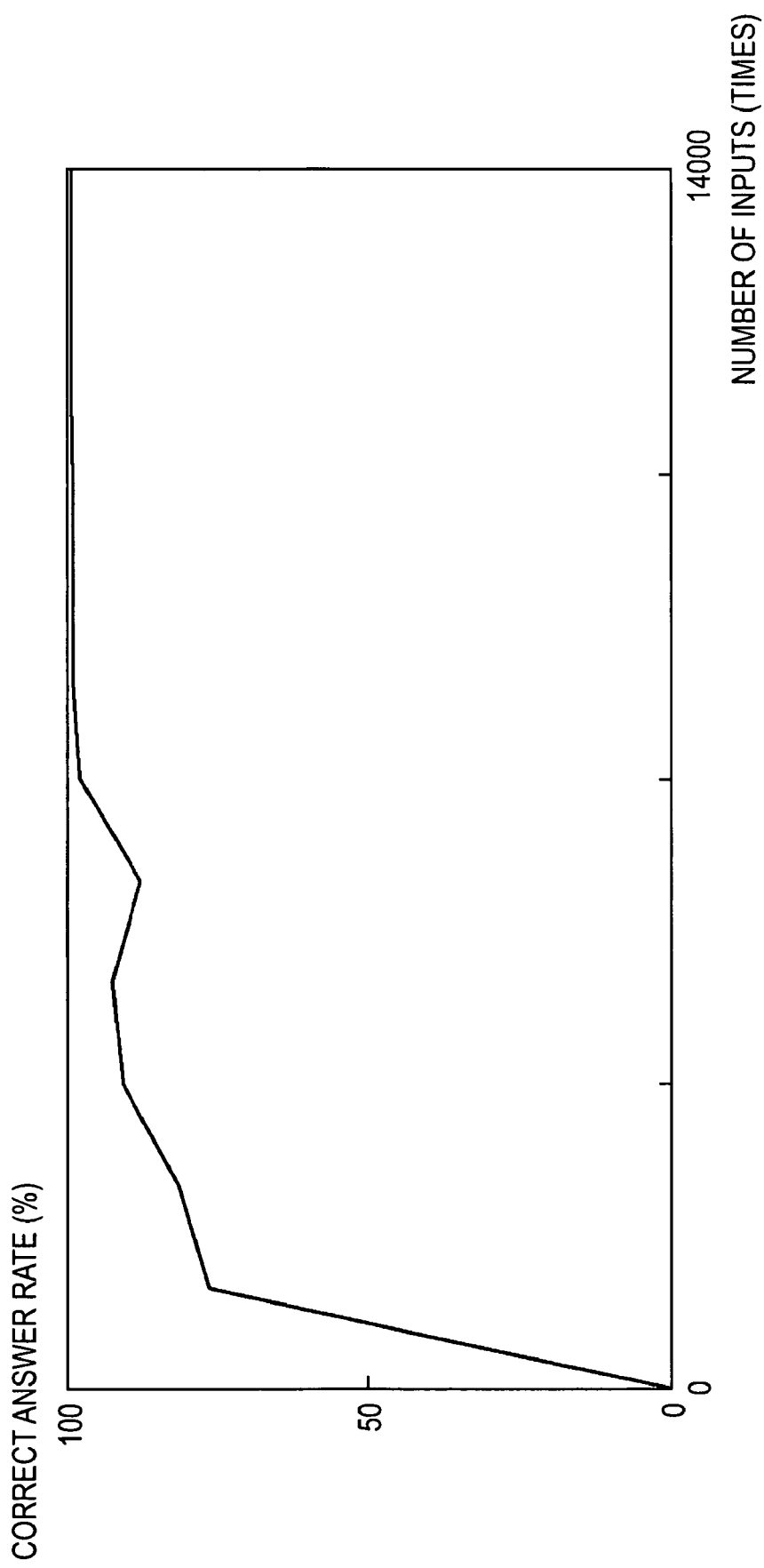
FIG. 17 illustrates the relationship of the number of learnings and a correct answer ratio.

FIG. 17 illustrates the relationship between the number of learning iterations (the number of updates of the time series pattern storage network) and the correct-answer ratio.

As shown in FIG. 17, the abscissa represents the number of learning iterations, namely, the number of inputs of the voice data for learning, and the ordinate represents the correct-answer ratio. As the learning process is in progress, the correction-answer ratio increases. At the end of 14000 online learning iterations, a correct-answer ratio close to 100% is achieved.

Figure 18:
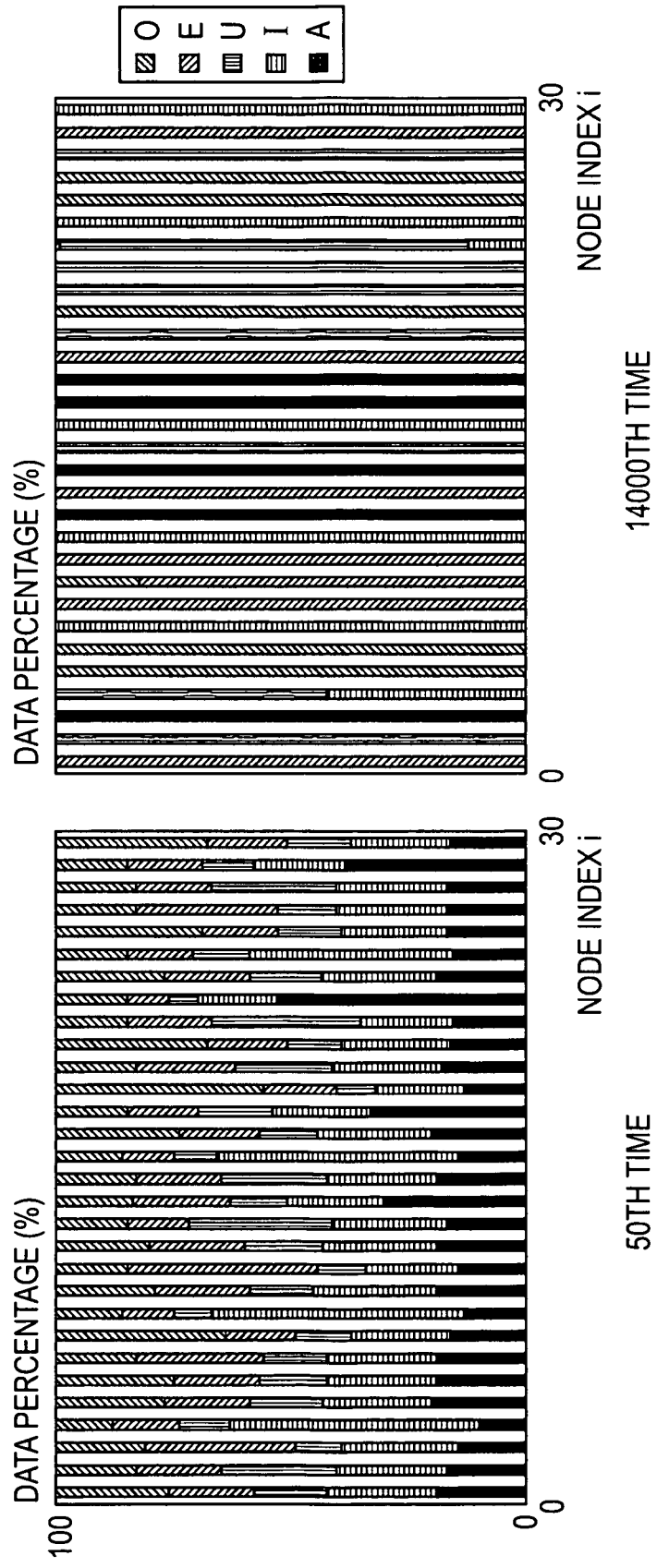
FIG. 18 illustrates the percentage of categories of the learning data stored in a learning data storage unit of each node.

FIG. 18 illustrates the ratio of each category of the learning data (voice data) stored in the learning data storage unit 22 of each node in the time series pattern storage network.

As shown in FIG. 18, the abscissa represents a node index i identifying a node $N_i$ forming the time series pattern storage network, while the ordinate represents the ratios of the categories "A", "I", "U", "E", and "O" of the learning data stored in the learning data storage unit 22 of the node $N_i$.

As shown in FIG. 18, a black portion of each vertical column represents the learning data of the category "A", and a horizontally hatched portion of the column represents the learning data of the category "I". A vertically hatched portion of the column represents the learning data of the category "U", and a diagonally left-up hatched portion of the column represents the learning data of the category "E", and a diagonally right-up hatched portion of the column represents the learning data of the category "O".

FIG. 18A illustrates the ratios of the categories "A", "I", "U", "E", and "O" in each node $N_i$ at the end of the 50 online learning iterations (of the learning data stored in the learning data storage unit 22). FIG. 18B illustrates the ratios of the categories "A", "I", "U", "E", and "O" in each node $N_i$ at the end of the 14000 online learning iterations (of the learning data stored in the learning data storage unit 22).

In the comparison of FIG. 18A with FIG. 18B, at the initial phase of learning, the learning data storage unit 22 of the node $N_i$ stores the voice data of various categories. With the learning process in progress, the voice data (learning data) stored in the learning data storage unit 22 of the node $N_i$ converges to particular categories.

Figure 19:
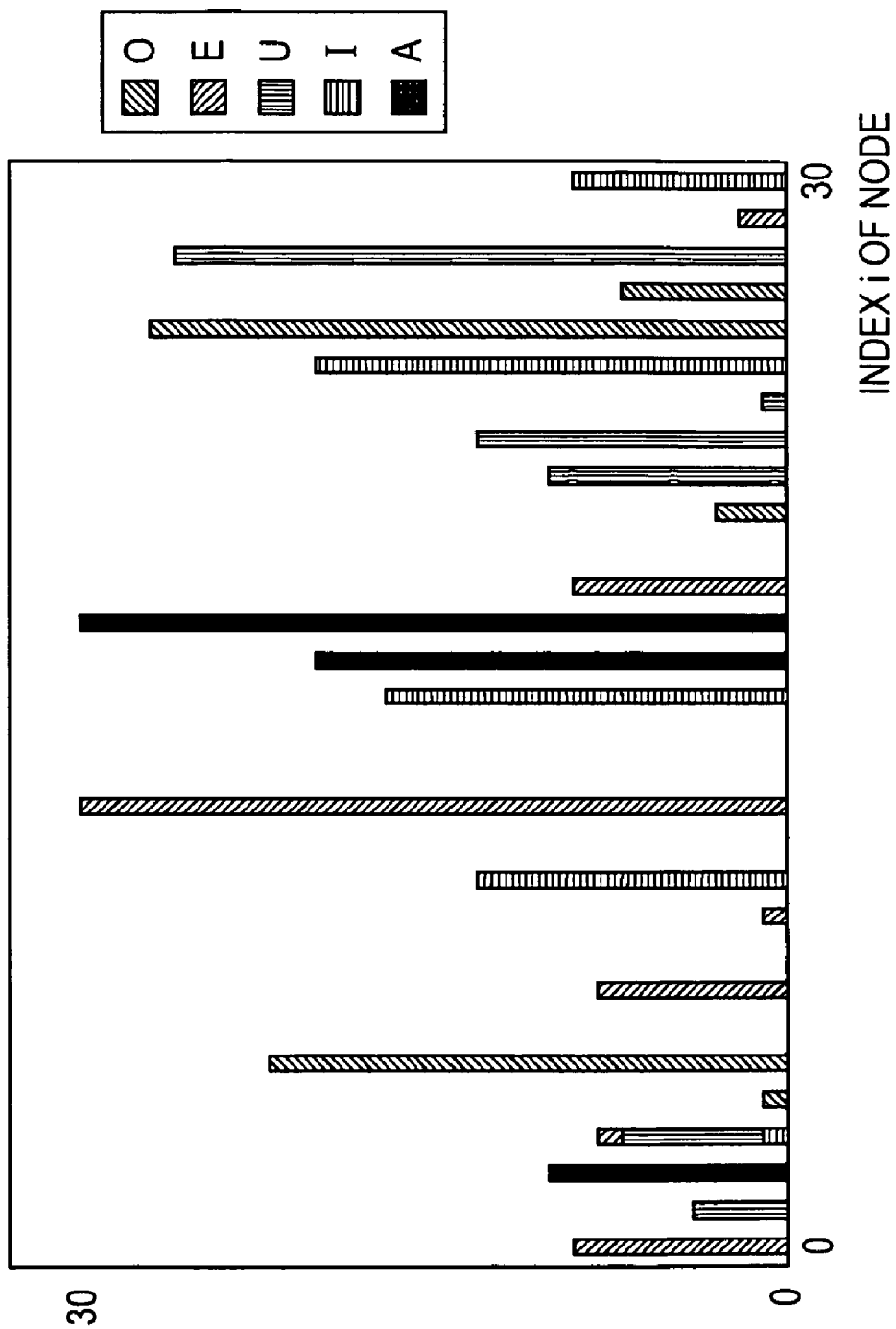
FIG. 19 illustrates the recognition results of voice data.

FIG. 19 illustrates the recognition results of the recognition process, in which the voice data of 300 pronunciations are recognized using the time series pattern storage network at the completion of 14000 online learning iterations.

Referring to FIG. 19, the abscissa represents the index i identifying the node $N_i$ in the same manner as shown in FIG. 18, and the ordinate represents the number of times at which the node $N_i$ becomes a winner node.

In FIG. 19, a black portion of each vertical column represents the number of times at which the node $N_i$ becomes a winner node in response to the inputting of the voice data of the category "A", and a horizontally hatched portion of the column represents the number of times at which the node $N_i$ becomes a winner node in response to the inputting of the voice data of the category "I". A vertically hatched portion of the column represents the number of times at which the node $N_i$ becomes a winner node in response to the inputting of the voice data of the category "U", a diagonally left-up hatched portion of the column represents the number of times at which the node $N_i$ becomes a winner node in response to the inputting of the voice data of the category "E", and a diagonally right-up hatched portion of the column represents the number of times at which the node $N_i$ becomes a winner node in response to the inputting of the voice data of the category "O".

FIG. 19 shows that almost all of the nodes become winner nodes in response to the voice data of a particular category. This means that the time series pattern of a particular category has been learned (acquired) in each node.

Figure 20:
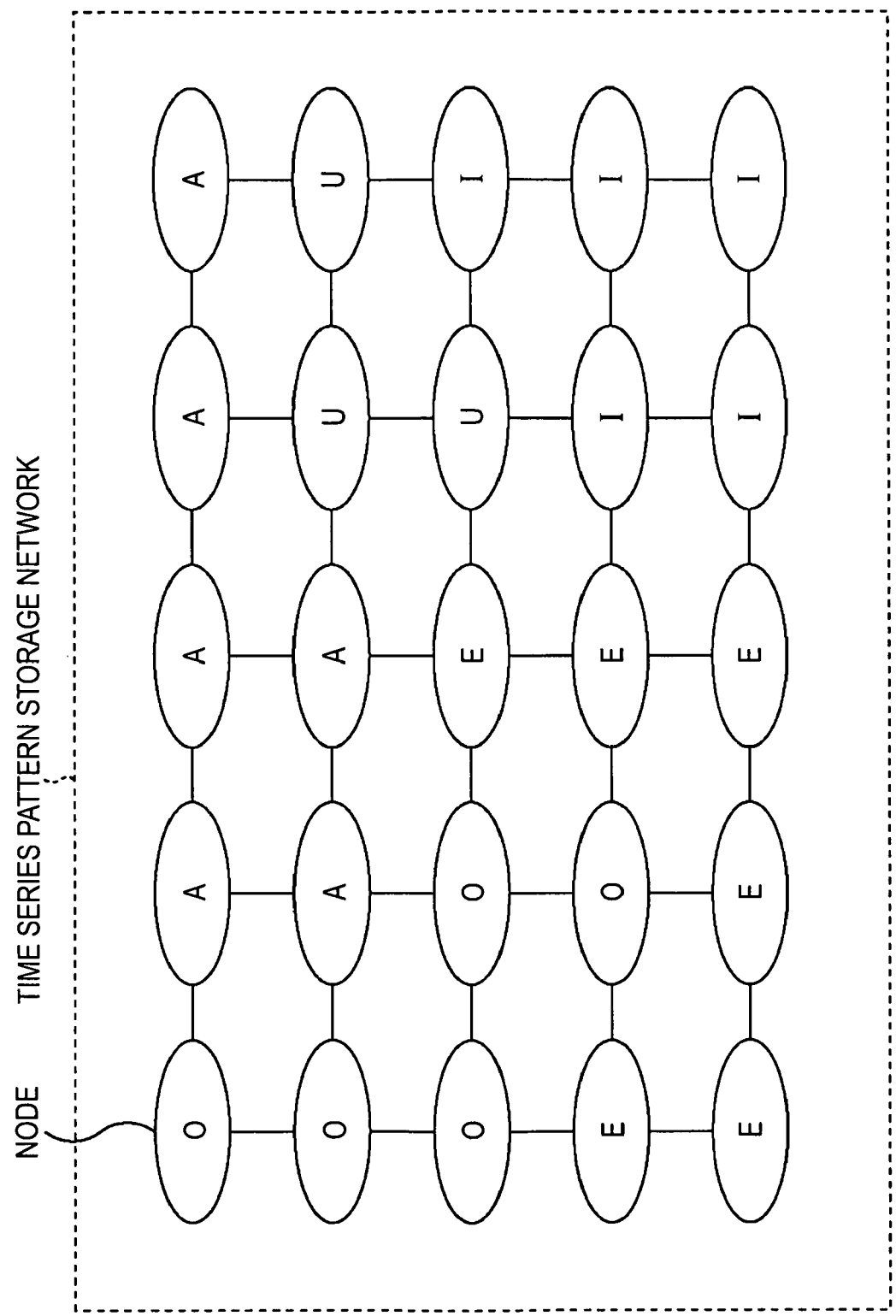
FIG. 20 illustrates learning results of a time series pattern storage network.

FIG. 20 illustrates the result of learning of the time series pattern storage network with the nodes having a two-dimensional arrangement structure as shown in FIG. 5.

As shown in FIG. 20, horizontally adjacent nodes are mutually linked and vertically adjacent nodes are mutually linked to form five rows by five columns of nodes. The time series pattern storage network is thus composed 25 nodes.

The other conditions of the test remain unchanged from those of FIGS. 17 through 19. However, since the time series pattern storage network is linked as shown in FIG. 20, the number of links passing before reaching the winner node is adopted as the inter-pattern distance d determining the updating weight α.

Online learning is performed using the voice data of 14000 pronunciations for learning. FIG. 20 diagrammatically illustrates the time series pattern storage network with the nodes thereof tagged with the correct-answer labels representing the categories "A", "I", "U", "E", and "O".

FIG. 20 illustrates that the same category, namely, the nodes acquiring similar time series patterns aggregate in space in the learned time series pattern storage network.

From the above described test results, the learning of the time series data with no correct-answer label attached thereto (unsupervised learning) functions properly in the time series pattern storage network. In other words, a particular time series pattern (statistic characteristics) is acquired in each node.

In the above tests, the correct-answer labels representing which categories "A", "I", "U", "E" and "O" the voice data (learning data) for learning and the voice data for recognition indicate were used. However, the correct-answer label was used only to assess the learning results and the recognition results. The correct-answer label was used neither in the learning process nor in the recognition process.

In the above discussion, HMM as one of the state transition probability models is used for the time series pattern model 21 (FIG. 4) of the node of the time series pattern storage network. Another state transition probability model may be used for the time series pattern model 21.

For example, Bayesian network is available as the time series pattern model 21.

In the Bayesian network, dependency relationship between variables is expressed by a graph structure, and is modeled by assigning conditional probability to each node. By constructing a state transition model along time axis, time series data can be modeled.

The determination of the graph structure is performed by selecting a model reflecting the likelihood of the learning data and the complexity of the graph structure. The conditional probability is estimated using maximum likelihood estimation or expectation maximization (EM) algorithm.

Even if the Bayesian network as one of the state transition probability models is used for the time series pattern model 21 for each node of the time series pattern storage network, unsupervised learning of the time series data can be carried out in the same way as when HMM is used.

The Bayesian network is described in detail by Y. Kimura in the paper entitled "Information Representation for Uncertainty Modeling: Bayesian Network", Bayesian Net Tutorial, 2001.

In addition to the state transition probability model, such as HMM and the Bayesian network, a function approximating model can be used for the time series pattern model 21 (FIG. 4).

In the function approximating model, a time series pattern is represented by one of a differential equation $\{x(t)\}'=f(x(t))$ and a difference equation $x(t+1)=f(x(t))$ using function $f(\ )$. The function $f(\ )$ is characteristic of the time series pattern. Herein, t represents time (sampling point), $x(t)$ represents a sample value of the time series data at time t, or the time series data observed from time 0 to time t, and $\{x(t)\}'$ represents a first derivative of the time series data $x(t)$ at time t.

Determining, from the learning data (time series data), the function $f(\ )$ representing a given time series pattern is referred to as function approximation. In the function approximation, the function $f(\ )$ is expressed using a polynomial, and coefficients of the polynomial are determined from the learning data in one method. In another method, a function $f(\ )$ is expressed using a neural network, and a parameter of the neural network is determined from the learning data.

In the function approximation of the function f( ) expressed in a polynomial, the coefficients of the polynomial are determined (estimated) using steepest descent method. In the function approximation of the function f ( ) expressed in a neural network, the parameter of the neural network is determined using back propagation algorithm. In the back propagation algorithm, data input to and output from a neural network are provided, and the parameter of the neural network is learned to satisfy the relationship of the input data and the output data.

Figure 21:
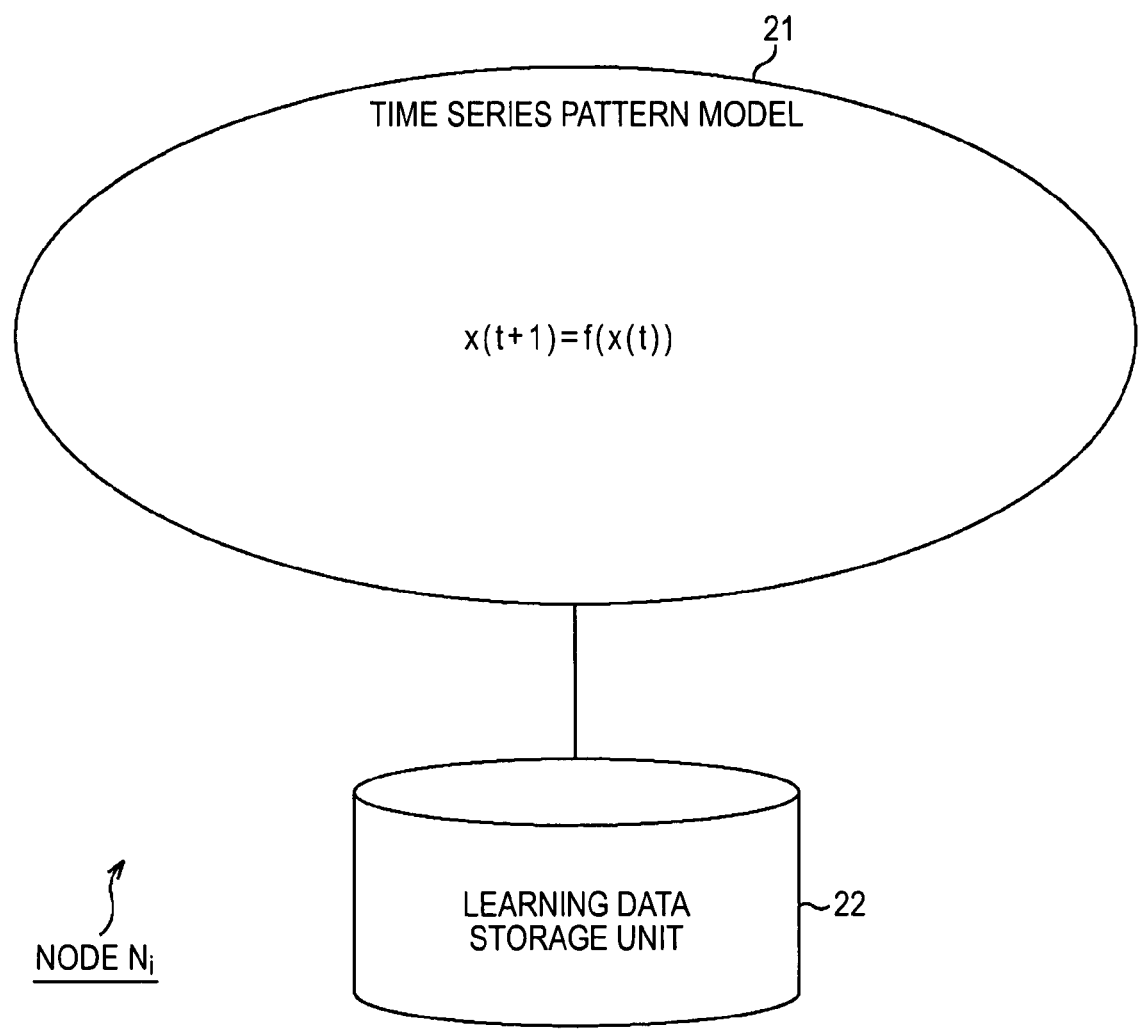
FIG. 21 illustrates the structure of another node.

FIG. 21 diagrammatically illustrates a node $N_i$ with a function approximating model being as the time series pattern model 21 of the node $N_i$ of the time series pattern storage network. Elements identical to those described with reference to FIG. 4 are designated with the same reference numerals.

As shown in FIG. 21, a function approximating model expressing time series data with a difference equation $x(t+1)=f(x(t))$ based on the function f ( ) is adopted as the time series pattern model 21.

Figure 22:
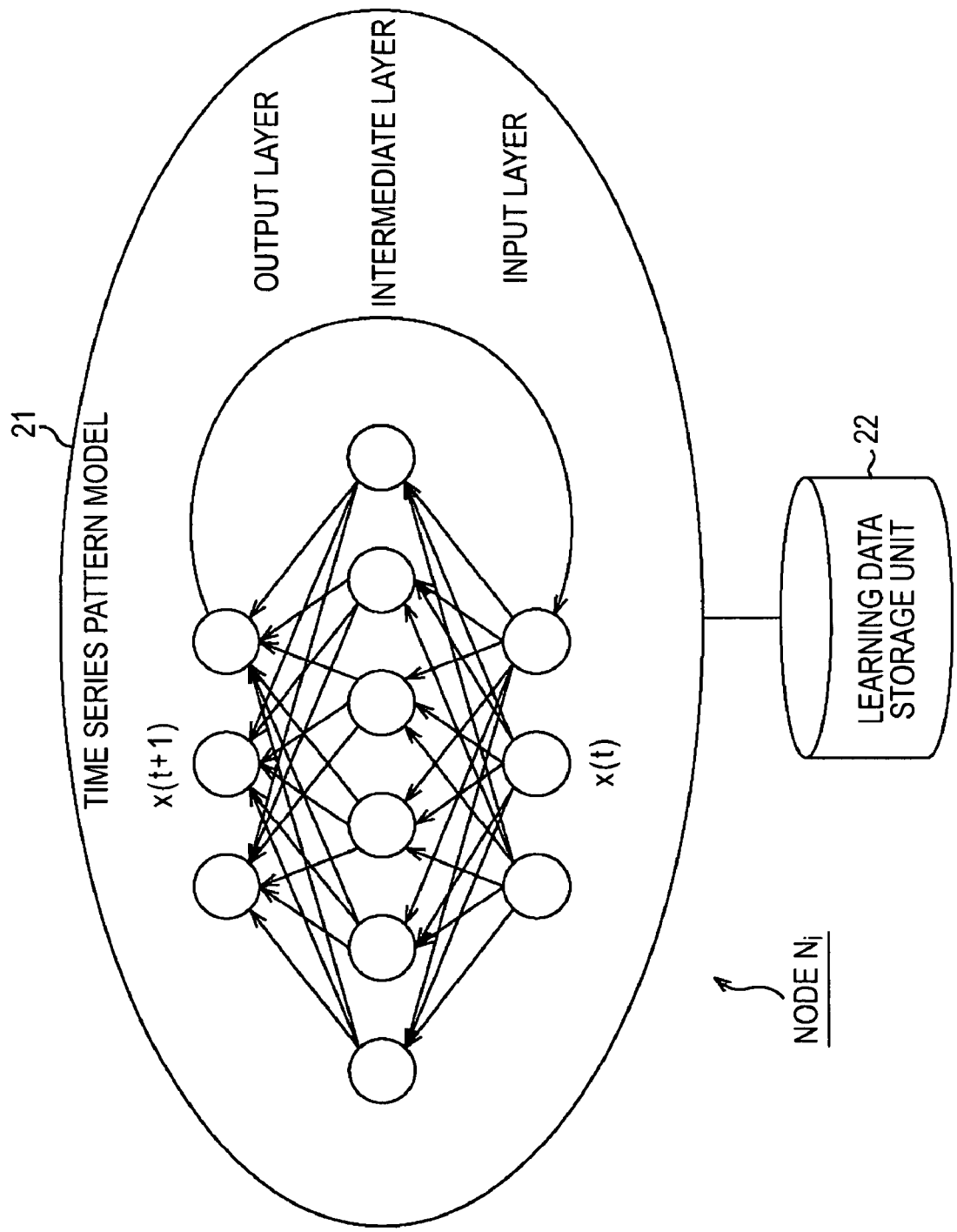
FIG. 22 illustrates the structure of a node $N_i$ with function $f(\ )$ represented by a neural network.

FIG. 22 illustrates the structure of a node $N_i$ expressed by a function ( ) being a neural network in the function approximation model of FIG. 21.

As shown in FIG. 22, a recurrent neural network is used as a neural network. The recurrent neural network is composed of an input layer $x(t)$, an output layer $x(t+1)$, and an intermediate layer connecting the input layer $x(t)$ to the output layer $x(t+1)$.

As shown, a weight attached to an arrow-headed line connecting units, each represented by a circle, is a parameter of the neural network. The parameter is thus learned using the learning data (time series data) stored in the learning data storage unit 22. The learning of the parameter is performed using the back propagation algorithm with an initial value imparted thereto.

As shown in FIG. 22, a winner node needs to be determined in the learning (also the recognition) of the time series pattern storage network including the node $N_i$ having the time series pattern model 21 expressed in the neural network if HMM is adopted as the time series pattern model 21. To determine the winner node, the score of each node $N_i$ in the time series pattern storage network with respect to new time series data needs to be determined.

The score can be the sum of squares of differences, each difference between the observed value of the new time series data and a theoretical value of the new time series data determined from the time series pattern model 21 with the function ( ) expressed in the neural network. In this case, the node having the minimum score value is determined as the winner node most appropriately matching the new time series data.

The updating weight of each node is determined after the determination of the winner node. In the same way as in the time series pattern model 21 being HMM, the parameter of the neural network of each node $N_i$ is determined.

The unsupervised learning of the time series data is thus performed even if the function approximating model, instead of the state transition probability model, is used as the time series pattern model 21.

When the function approximating model is used as the time series pattern model 21, the score representing the degree of match of the function approximating model of each node $N_i$ to any time series data is the sum of squares of differences, each difference between the time series data and the theoretical value of the time series data determined from the function approximating model (function ( )) as previously discussed. The recognition process is thus performed in a way similar to the case in which the state transition probability model is used as the time series pattern model 21.

Given an initial value in the function approximating model provided by the differential equation $\{x(t)\}'=f(x(t))$ or the difference equation $x(t+1)=f(x(t))$, time series data is successively generated from the initial value. As in the state transition probability model, the time series data is also generated in the function approximating model. The initial value for generating the time series data with the function approximating model of the node $N_i$ can be the mean value of the initial values of the learning data stored in the learning data storage unit 22 of the node $N_i$.

There is a difference between the learning of a plurality of time series patterns in a known recurrent neural network and the learning of a plurality of time series patterns in a time series pattern storage network constructed of nodes, each having a recurrent neural network. The difference is described below with reference to FIGS. 23 through 25.

Figure 23:
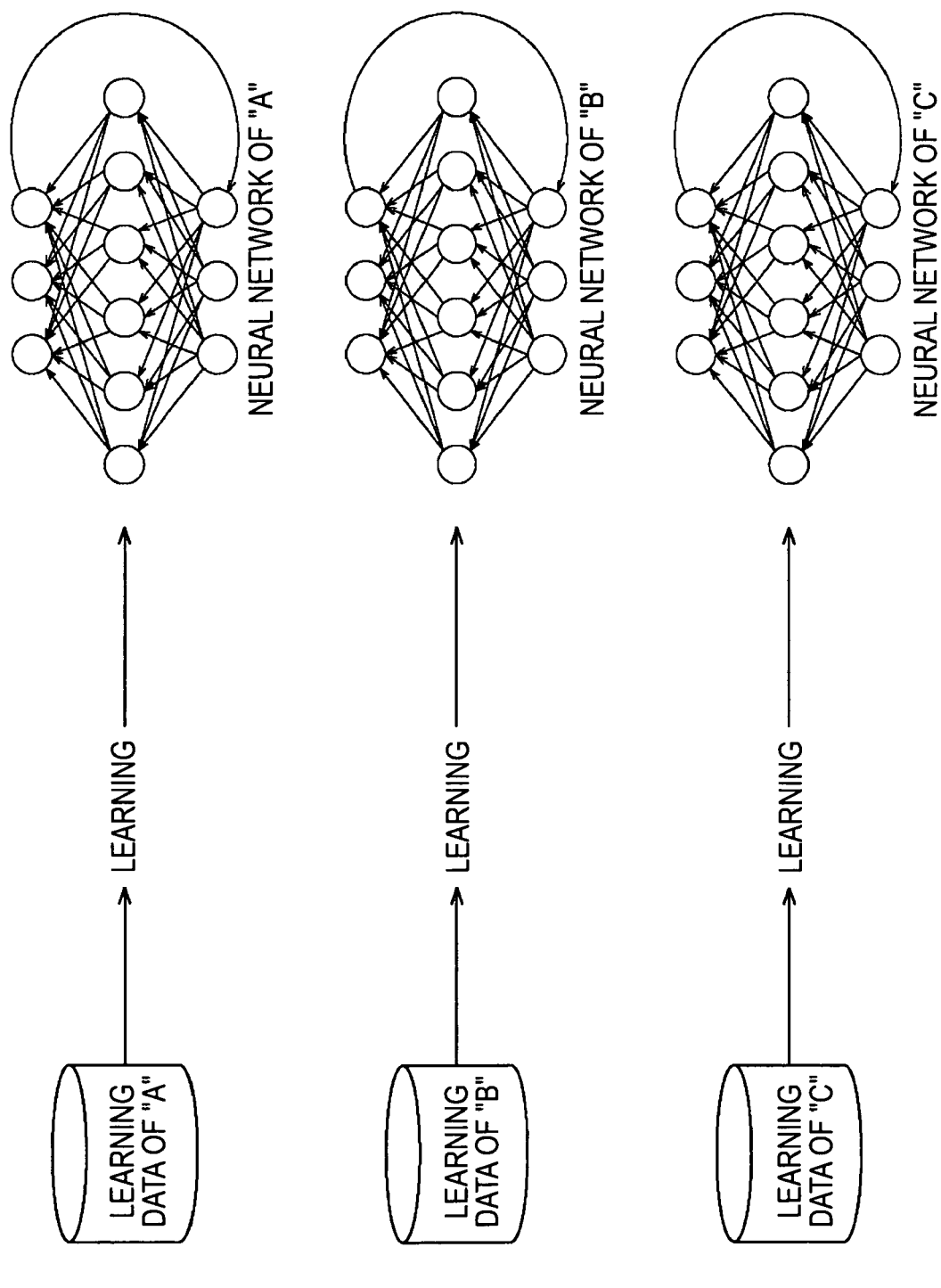
FIG. 23 illustrates the supervised learning of a recurrent neural network.

The learning method of the known recurrent neural network is supervised learning based on the back propagation algorithm as shown in FIG. 23. To learn voice data of a plurality of categories "A", "B", and "C", a large number of pieces of voice data is prepared for each of the categories "A", "B", and "C". Recurrent neural networks are respectively prepared for the categories "A", "B", and "C" to learn the voice data of the categories "A", "B", and "C". The learning of the recurrent neural network of each category is performed on the learning data of the respective category using the back propagation algorithm.

In the recurrent neural network of the category "A", the time series pattern of the category "A" is learned (acquired) using the learning data (voice data) of the category "A" only. Similarly, in the recurrent neural network of the category "B", the time series pattern of the category "B" is learned, and in the recurrent neural network of the category "C", the time series pattern of the category "C" is learned.

Since only one time series pattern is learned in one recurrent neural network, enlarging each recurrent neural network in a substantially large scale is not required. The amount of computation for learning through the back propagation algorithm is not so large, and time required for learning is not a problem.

In supervised learning, one time series pattern is learned in one recurrent neural network. In unsupervised learning, however, one time series pattern only cannot be learned in one recurrent neural network (except that time series data of only one category exists) because the time series pattern to be learned is not certain, in other words, because the number of categories of the learning data are not known, and because the category of the input learning data is not known.

Figure 24:
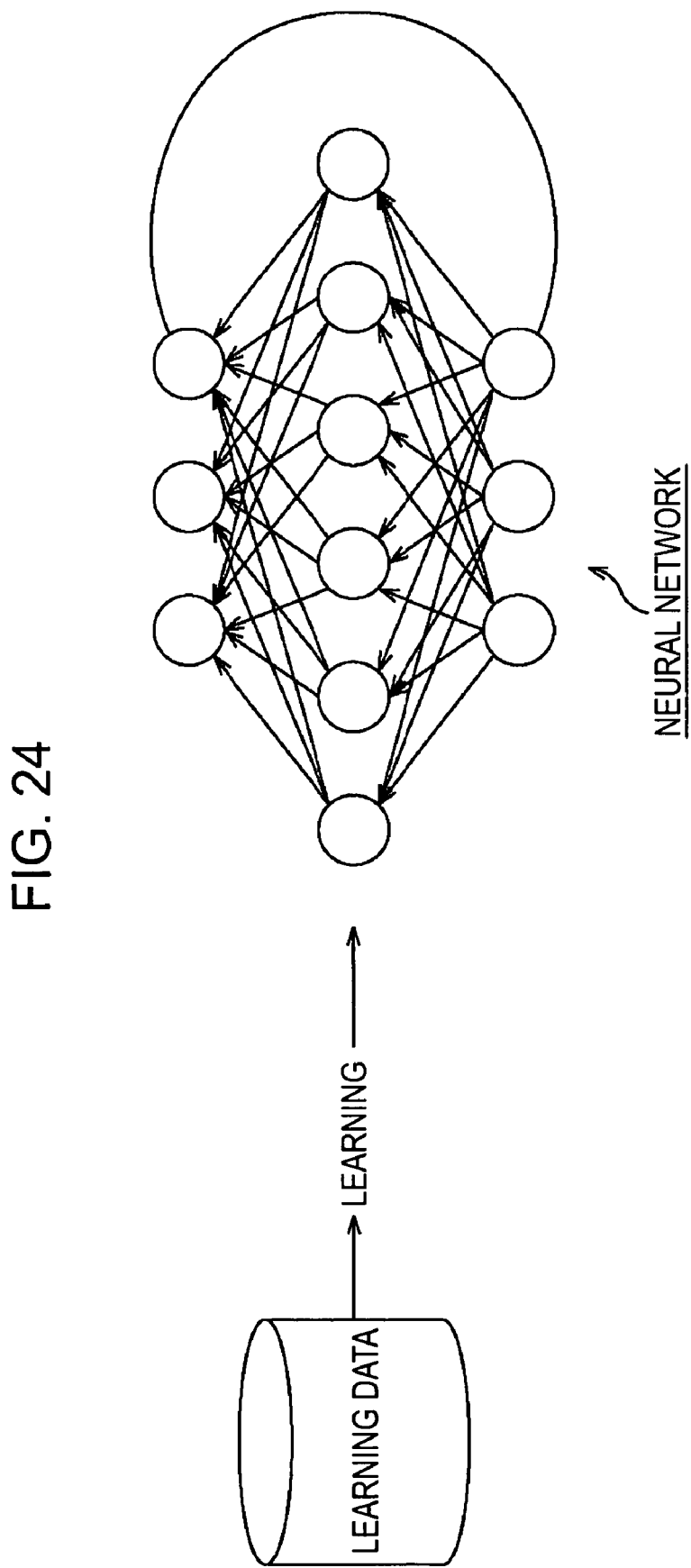
FIG. 24 illustrates unsupervised learning of a recurrent neural network.

To perform unsupervised learning in the known recurrent neural network, an uncertain number of time series patterns needs to be learned in one recurrent neural network as shown in FIG. 24.

A variety of patterns needs to be processed by each neuron in the neural network. Explicitly attaching a correct-answer label to the learning data is not necessary. It is thus possible to perform unsupervised learning on an uncertain number of time series patterns.

However, to learn a great deal of categories (time series patterns) such as voice data in one recurrent neural network, a large-scale neural network matching the large number of categories needs to be prepared. As previously discussed, the amount of computation dramatically increases in the back propagation algorithm for use in the learning of the parameter of the neural network as the scale of the neural network is enlarged. As a result, time required for learning is also substantially increased, becoming problematic in practice.

Figure 25:
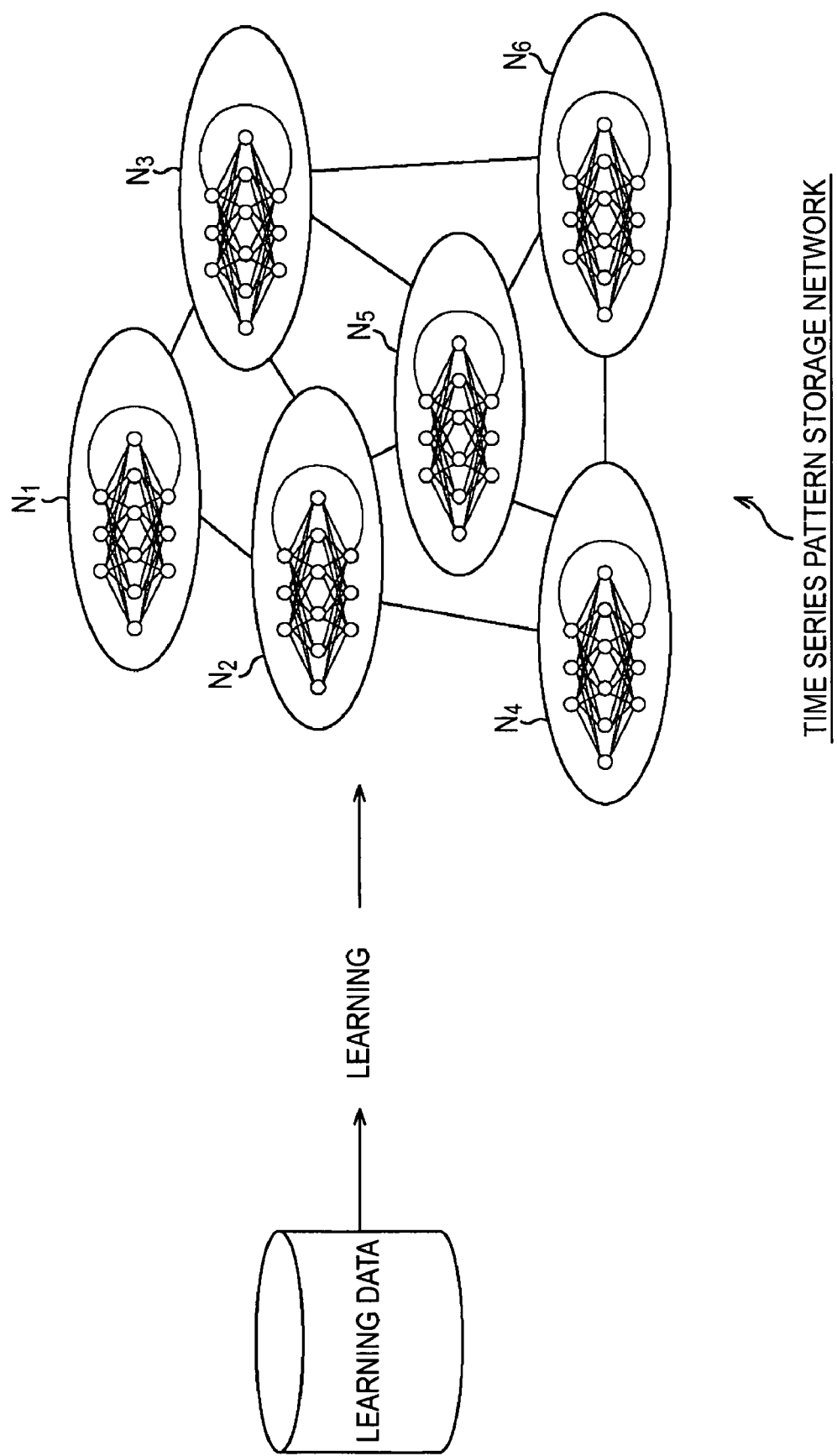
FIG. 25 illustrates the learning of the time series pattern storage network composed of nodes, each node having a recurrent neural network.

In contrast, the learning of the time series pattern storage network formed of the nodes, each having the recurrent neural network as shown in FIG. 25, one time series pattern is learned (acquired) in one node. More specifically, one time series pattern is learned in the recurrent neural network of one node. Enlarging the recurrent neural network of one node to a substantially large scale is not required. The amount of computation required for learning through the back propagation algorithm is substantially smaller than the case discussed with reference to FIG. 24, and time required for learning is not problematic.

Figure 26:
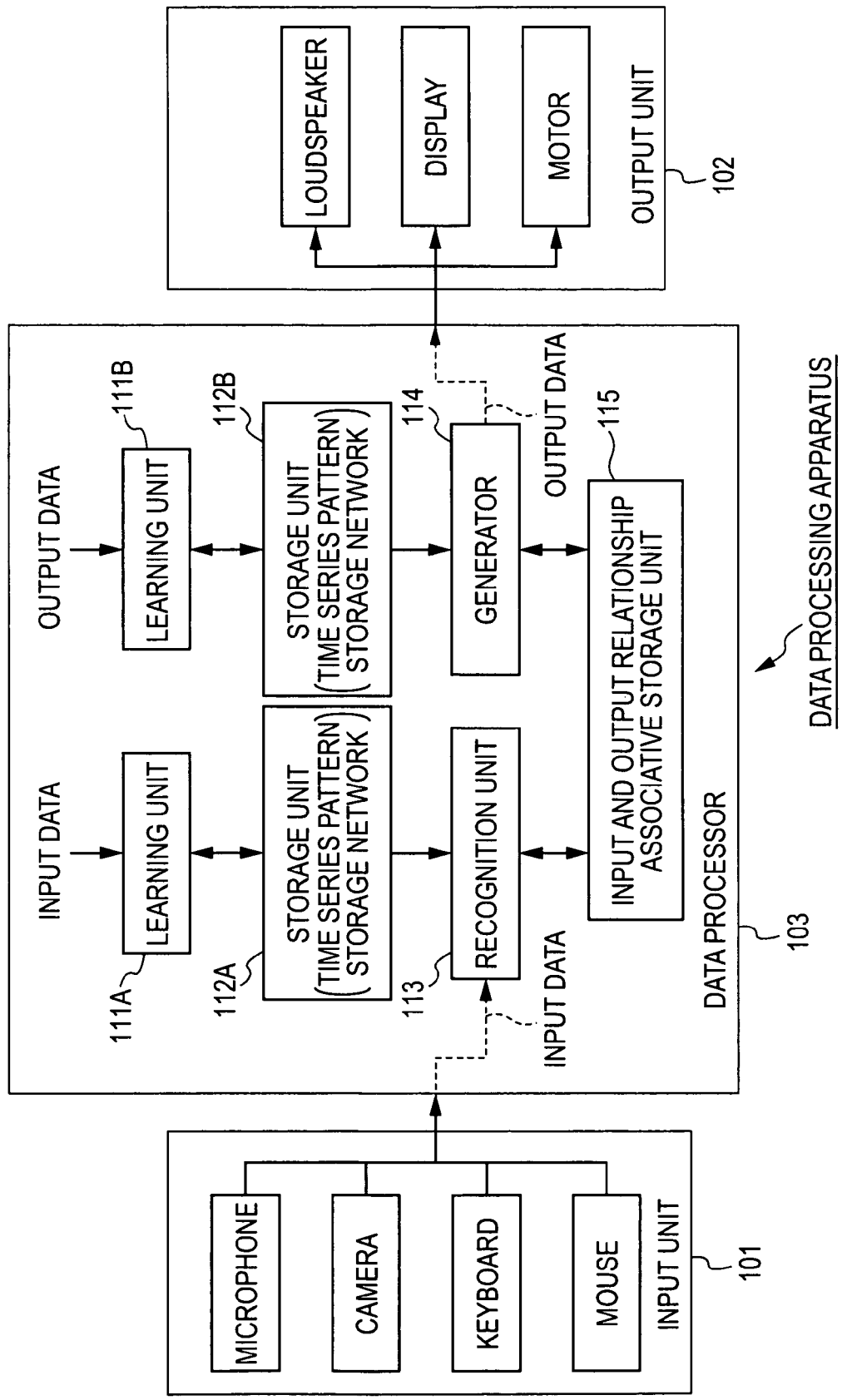
FIG. 26 is a block diagram of a data processing apparatus in accordance with a second embodiment of the present invention.

FIG. 26 is a block diagram illustrating a data processing apparatus in accordance with a second embodiment of the present invention.

The data processing apparatus of FIG. 26, applied to a biped robot or a four-legged robot, includes an input section 101, an output section 102, and a data processor 103.

The input section 101 includes input devices (sensors) receiving inputs to the robot, and supplies input data as time series data responsive to the inputs thereto to the data processor 103. The input devices of the input section 101 include a microphone as auditory sense (ears) of the robot, a camera as visual sense (eyes) of the robot, and a keyboard and a mouse operated by a user. The input devices of the input section 101 further include a pressure sensor corresponding to tactile sense of the robot.

The output section 102, including output devices outputting signals, actively work on the outside world in accordance with output time series data supplied from the data processor 103. The output devices of the output section 102 include a loudspeaker as the mouth of the robot, a motor (actuator) serving as a muscle force moving the limbs and other portions of the robot, and a display displaying information in image.

The data processor 103, having stored the time series pattern storage network, learns, in the learning process, the time series pattern storage network using the input data output from the input section 101, and the output data supplied to the output section 102. The data processor 103 further recognizes, in the recognition process, the input data from the input section 101 using the time series pattern storage network, and generates, in the generation process, the output data as the time series data in response to the recognition result using the time series pattern storage network. The data processor 103 then supplies the output data to the output section 102.

A learning unit 111A in the data processor 103 receives the input data as the time series data. The input data supplied to the learning unit 111A is the same input data as the data output by the input section 101. The input data includes voice data output from the microphone, image data output from the camera, data (operation signals) output from the keyboard and the mouse in response to the operation of the keyboard and the mouse.

The learning unit 111A, having the same structure as the learning section 4 of FIG. 2, learns the time series pattern storage network stored in a storage unit 112A to be discussed later, using the supplied input data.

A learning unit 111B receives the output data as the time series data. The output data supplied to the learning unit 111B is the same output data supplied to the output section 102, and includes voice data supplied to the loudspeaker for audio output, the image data supplied to the display for displaying, and data (drive signal) for driving the motor.

The learning unit 111B, also having the same structure as the learning section 4 of FIG. 2, learns the time series pattern storage network stored in a storage unit 112B to be discussed later, using the supplied output data.

Each of the storage unit 112A and the storage unit 112B stores the time series pattern storage network. The time series pattern storage network stored in the storage unit 112A is learned by the learning unit 111A using the input data, and is thus the input time series pattern storage network. The time series pattern storage network stored in the storage unit 112B is learned by the learning unit 111B using the output data, and is thus the output time series pattern storage network.

The input time series pattern storage network and the output time series pattern storage network may or may not have the same nodes and may or may not have the same links. The two time series pattern storage networks may have no links at all. The time series pattern models 21 of the nodes in the input time series pattern storage network and the output time series pattern storage network may or may not be the same model.

A recognition unit 113 is supplied with the input data by the input section 101. The recognition unit 113, having the same structure as the recognition section 3 of FIG. 2, recognizes the input data from the input section 101 using the input time series pattern storage network stored in the storage unit 112A (recognition process), and then supplies the node label of the winner node as a result of recognition to an input and output relationship associative storage unit 115.

A generator 114 is supplied with the node label as the control data for the generation process by the input and output relationship associative storage unit 115. The generator 114, having the same structure as the generator 6 of FIG. 2, determines, as a generation node, the node represented by the node label from the input and output relationship associative storage unit 115 in the time series pattern storage network stored in the storage unit 112B, and then generates output data as the time series data using the generation node (generation process). The generator 114 supplies the output section 102 with the output data generated using the generation node.

The input and output relationship associative storage unit 115 stores the node label of each node forming the input time series pattern storage network stored in the storage unit 112A (hereinafter referred to as input label as appropriate) and the node label of each node forming the output time series pattern storage network stored in the storage unit 112B (hereinafter referred to as output label as appropriate) with one node label associated with the other node label. The input and output relationship associative storage unit 115 supplies the generator 114 with the node label supplied from the recognition unit 113, namely, the output label associated with the input label.

The input label and the output label may be associated with each other on a one-to-one correspondence basis or on a one-to-multiple correspondence basis, or on a multiple-to-one correspondence basis in the input and output relationship associative storage unit 115.

When the input data is supplied as new time series data to the data processing apparatus thus constructed, the learning unit 111A performs online learning on the input time series pattern storage network stored in the storage unit 112A using the input data. Similarly, when the output data is supplied as new time series data, the learning unit 111B performs the learning process on the output time series pattern storage network stored in the storage unit 112B using the output data.

The supplying of the input data to the learning unit 111A and the supplying of the output data to the learning unit 111B are performed with the input data associated with the output data. For example, the supplying of the input data to the learning unit 111A is performed concurrently with the supplying of the output data to the learning unit 111B, or the supplying of the input data to the learning unit 111A is followed by the supplying of the output data to the learning unit 111B.

The input label of each node forming the input time series pattern storage network stored in the storage unit 112A is associated with the output label of each node forming the output time series pattern storage network stored in the storage unit 112B, and the input and output relationship associative storage unit 115 stores the association.

More specifically, the learning unit 111A determines the winner node responsive to the input data from the nodes of the input time series pattern storage network, and the learning unit 111B determines the winner node responsive to the output data from the nodes of the output time series pattern storage network.

The input and output relationship associative storage unit 115 recognizes, via the recognition unit 113, the node label of the winner node (input label) responsive to the input data in the input time series pattern storage network. The input and output relationship associative storage unit 115 recognizes, via the generator 114, the node label of the winner node (output label) responsive to the output data responsive to the input data in the output time series pattern storage network. The input and output relationship associative storage unit 115 stores the input label and the output label with one label associated with the other label.

For example, voice data output from a microphone in response to pronunciation of a user is supplied to the learning unit 111A as the input data. One of synthesized voice data of the robot responsive to the pronunciation, and a drive signal for the motor for the robot to take action, specified by a user, is supplied to the learning unit 111B as the output data. The input and output relationship associative storage unit 115 then stores the input label of the winner node responsive the input data (voice data) corresponding to the pronunciation of the user and the output label of the winner node responsive to the output data corresponding to the response of the robot in response to the pronunciation.

The user then makes a pronunciation, and input data as voice data responsive to the pronunciation is supplied from the input section 101 to the data processor 103. The data processor 103 supplies, to the output section 102, the output data specified by the user in response to the pronunciation. The robot responds to the output data, for example, outputs a synthesized sound, and takes action.

The user then makes the pronunciation, and the input data as voice data responsive to the pronunciation is supplied from the input section 101 to the data processor 103. The recognition unit 113 in the data processor 103 recognizes the input data from the input section 101 using the time series pattern storage network stored in the storage unit 112A, and supplies the input label of the winner node as the recognition result to the input and output relationship associative storage unit 115.

The input and output relationship associative storage unit 115 supplies, to the generator 114, the output label in association with the input label supplied from the recognition unit 113.

The generator 114 determines, as the generation node, the node represented by the output label from the input and output relationship associative storage unit 115 in the output time series pattern storage network stored in the storage unit 112B, generates the output data as the time series data using the generation node, and supplies the output section 102 with the output data.

The output section 102 outputs, from the loudspeaker, a synthesized sound corresponding to the output data from the data processor 103, or drives the motor for the robot to take action in response to the output data.

Any input data obtained from the input devices including the microphone, the camera, the keyboard, the mouse, etc., in the input section 101, is supplied to the learning unit 111A and any output data obtained from the output devices including the loudspeaker, the display, the motor, etc. in the output section 102 is supplied to the learning unit 111B. The supplying of the input data to the learning unit 111A is performed in association with the supplying of the output data to the learning unit 111B. The input and output relationship associative storage unit 115 thus stores the input label of the node of the input time series pattern storage network and the output label of the node of the output time series pattern storage network with the input label in association with the output label. In this way, the data processor 103 can supply a variety of output data to the output devices including the loudspeaker, the display, the motor, etc. in the output section 102 in response to the input data supplied from the microphone, the camera, the keyboard, the mouse, etc., in the input section 101.

The input and output relationship associative storage unit 115 can associate the input label with the output label using one of a 1-bit association flag and a connection weight. The association flag indicates whether the output label is associated with the input label. The connection weight indicates the degree of association between the input label and the output label.

The input and output relationship associative storage unit 115 can associate the input label with the output label by changing the association flag from 0, indicating no association, to 1, indicating the input label and the output label in an associated state. The association flag indicates the association between the input label of the node having become the winner node to the input data in the input time series pattern storage network and the output label of the node having become the winner node to the output data responsive to the input data in the output time series pattern storage network.

Alternatively, the input and output relationship associative storage unit 115 can associate the input label with the output label (reinforce the degree of link between the input label and the output label) by incrementing the connection weight. The connection weight indicates the degree of link between the input label of the node having become the winner node to the input data in the input time series pattern storage network and the output label of the node having become the winner node to the output data responsive to the input data in the output time series pattern storage network.

If the input and output relationship associative storage unit 115 uses the association flag, all output labels having an association flag of 1 to the input label from the recognition unit 113 are supplied to the generator 114. If the input and output relationship associative storage unit 115 uses the connection weight, the generator 114 receives the output label having the highest connection weight to the input label from the recognition unit 113 or a plurality of output labels in the order of high to low connection weight to the input label from the recognition unit 113. The generator 114 generates at least one piece of output data based on at least one node of the output time series pattern storage network represented by at least one output label from the input and output relationship associative storage unit 115. The generator 114 outputs the output data successively or in parallel to the output section 102.

The input time series pattern storage network and the output time series pattern storage network are online learned using the input data and the output data provided by the user. By associating the input label with the output label, the input data is recognized and then the output data responsive to the input data is generated in a variety of environments.

More specifically, the data processing apparatus incorporated robot is used in a variety of environments, for example, different in voice characteristic, speech speed, illumination conditions, etc. It is difficult to learn beforehand input data and output data taking into consideration such differences, and this difficulty is the largest drawback of the supervised learning.

In contrast, in the time series pattern storage network, the data processing apparatus can learn input data and output data in each of actual application environments.

Even if a time series pattern to be learned is uncertain in the time series pattern storage network, in other words, even if it is unknown whether the input data and the output data in some categories are actually supplied, the input data and the output data are autonomously classified. The data processing apparatus thus responds to the user in a fine-tuned manner.

The time series pattern storage network is applicable to a forward model and a backward model.

Figure 27:
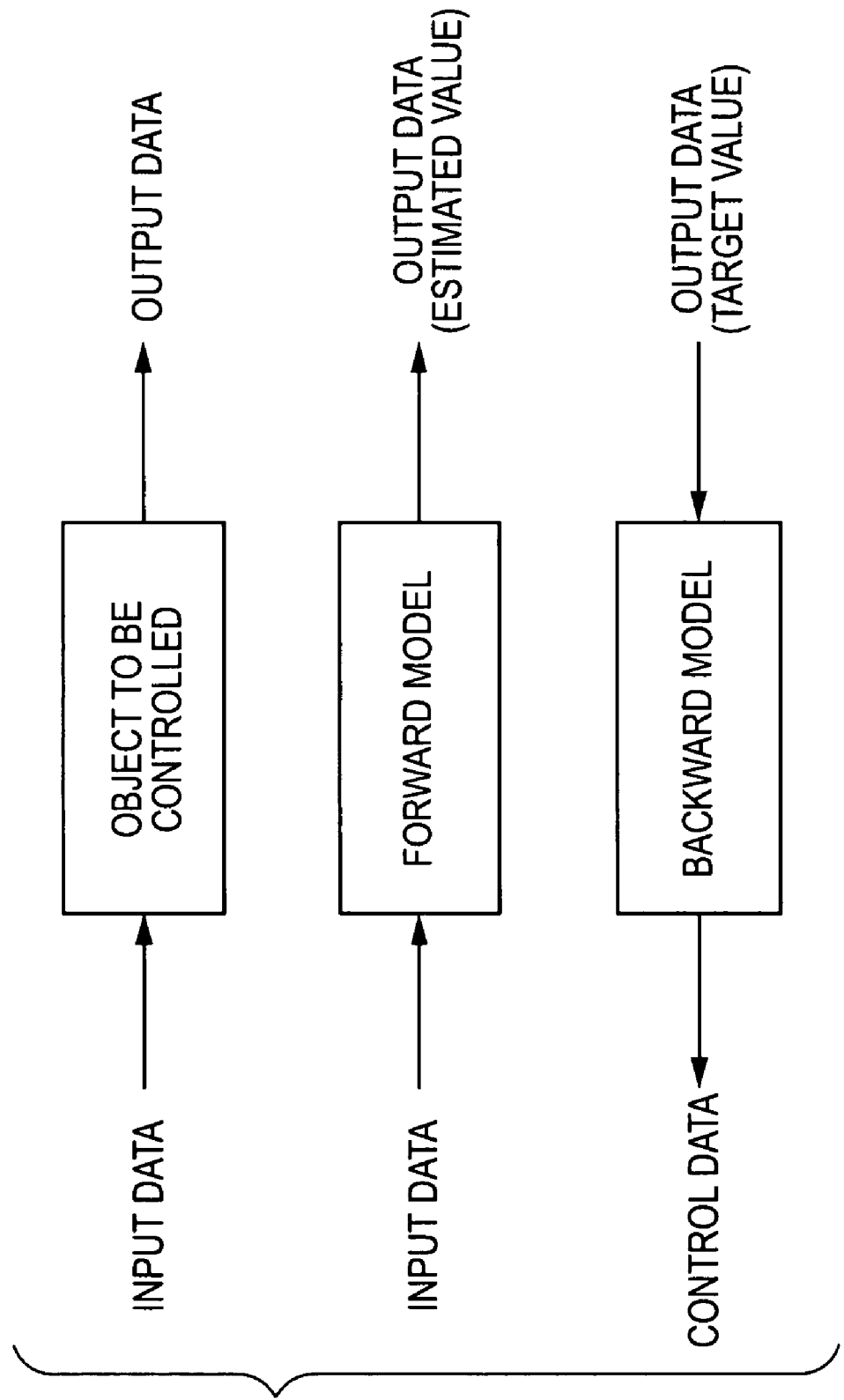
FIG. 27 illustrates an object to be controlled, a forward model, and a backward model.

FIG. 27 illustrates the concept of the forward model and the backward model.

In response to input data as time series pattern storage network, an object to be controlled outputs output data as time series pattern storage network. Detailed information concerning the object to be controlled (interior of the object) is unknown. The input data to the object and the output data output from the object are thus observed.

The input data supplied to the object to be controlled and the output data output by the object in response to the input data can be any physical quantities as long as the data can be observed. The object to be controlled can be any object as long as the object can receive the input data and outputs the output data responsive to the input data.

For example, the object can be a ball, a musical instrument, an automobile, a gas heater, etc. For example, if the object is a ball, a force is applied to the ball as the input data, the position and speed of the ball are obtained as the output data responsive to the input data. If the object is an automobile, operation of the steering wheel, the accelerator, the brake pedal, etc. functions as the input data to the automobile, and the position and speed of the automobile are obtained as the output data responsive to the input data. If the object to be controlled is a gas heater, adjustment of heating power functions as the input data, and the temperature of a room is the output data responsive to the input data.

The object to be controlled outputting the output data in response to the input data is the forward model.

In response to the input data, the forward model outputs an estimated value of the output data provided by the object to be controlled. In accordance with the forward model, the output data from the object to be controlled can be estimated without the need for actually applying the input data to the object.

In the backward model, a target value of the output data output from a object to be controlled is determined. To output the output data having the target value, the input data to be input is estimated. The forward model is considered as a mirror image of the backward model, and the backward model is a reverse model.

The input data supplied to the reverse model for the reverse model to give the output data having a target value is referred to as control data, as appropriate.

In each of the forward model and the backward model, the observed input data and the observed output data responsive to the input data are used (estimated).

However, object to be controlled in the real world are complex. If a forward model and a backward model are modeled as a simple linear system, estimation error in the output data and the input data become large. High-precision estimation cannot be performed.

The time series pattern storage network is extremely effective regardless of whether or not the object to be controlled is modeled as a high-precision forward model or backward model using a linear system.

More specifically, the time series pattern storage network is applicable to each of the forward model and the backward model. The forward model and the backward model with the time series pattern storage network applied thereto permit the output data and the control data to be accurately estimated.

FIG. 28 illustrates the structure of a connection storage network as a forward model and a backward model with the time series pattern storage network applied thereto.

The connection network is composed of two time series pattern storage network $net_{in}$ and $net_{out}$. One node $N_i$ (i=1, 2, . . . , total number of nodes) in the time series pattern storage network $net_{in}$ is connected to respective node $N'_j$ (j=1, 2, . . . , total number of nodes) in the time series pattern storage network $net_{out}$.

As shown in FIG. 28, an arrow-headed line between the node $N_i$ in the time series pattern storage network $net_{in}$ and the node $N'_j$ in the time series pattern storage network $net_{out}$ represents a connection established between the node $N_i$ and the node $N'_j$.

In the time series pattern storage networks $net_{in}$ and $net_{out}$, a link may be established on the same node, or between different nodes, or no link may be established at all. The time series pattern model 21 (FIG. 4) of the node $N_i$ in the time series pattern storage network $net_{in}$ and the time series pattern model 21 of the node $N'_j$ in the time series pattern storage network $net_{out}$ may or may not be the same model.

Figure 29:
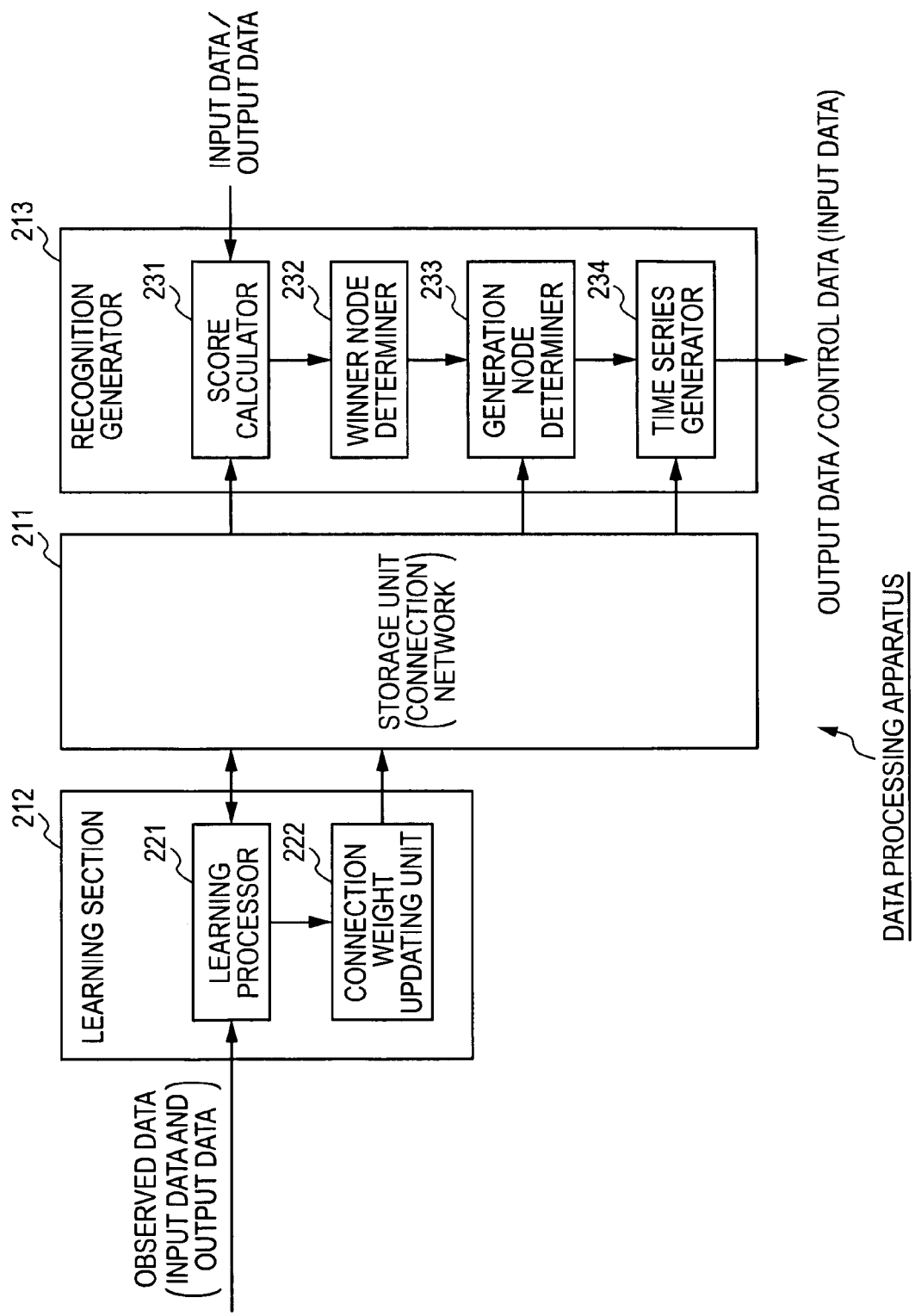
FIG. 29 is a block diagram illustrating a data processing apparatus in accordance with a third embodiment of the present invention.

FIG. 29 is a block diagram of a data processing apparatus handling the connection network of FIG. 28 in accordance with a third embodiment of the present invention.

The data processing apparatus of FIG. 29 models an object to be controlled as a forward model and a backward model using the connection network of FIG. 28. The data processing apparatus further estimates the output data from the object to be controlled and the control data (input data) to be input to the object using the connection network as one of the forward model and the backward model.

As shown in FIG. 29, the data processing apparatus includes a storage section 211, a learning section 212, and a recognition generator 213.

The storage section 211 stores the connection network of FIG. 28.

The learning section 212 is supplied with a set of observed data including the input data given to the object to be modeled, and the output data output from the object in response to the input data. The observed data is the set of the input data as time series data of a predetermined period (time series data throughout a predetermined period of time), and the output data as time series data of a predetermined period output from the object in response to the input data.

The learning section 212 models the object into the forward model and the backward model through the connection network using the supplied observed data.

The learning section 212 is composed of a learning processor 221 and a connection weight updating unit 222.

The learning processor 221 has the same structure as the learning processor 32 of FIG. 8. As in the data processing apparatus of FIG. 2, the learning processor 221 updates, in a self-organizing manner, the time series pattern storage network netin of the connection network (FIG. 28), stored in the storage section 211, in response to the input data of the observed data supplied to the learning section 212. As in the data processing apparatus of FIG. 2, the learning processor 221 updates, in a self-organizing manner, the time series pattern storage network $net_{out}$ of the connection network (FIG. 28), stored in the storage section 211, in response to the output data of the observed data supplied to the learning section 212 (the output data paired with the input data in the observed data).

The learning processor 221 supplies, to the connection weight updating unit 222, a label set of a node label of the node $N_i$ of the time series pattern storage network $net_{in}$ (also referred to as an input label as appropriate), the node $N_i$ having become a winner node when the time series pattern storage network $net_{in}$ is updated, and a node label of the node $N'_j$ of the time series pattern storage network $net_{out}$ (also referred to as an output label as appropriate), the node $N'_j$ having become an winner node when the time series pattern storage network $net_{out}$ is updated.

In response to the label set supplied from the learning processor 221, the connection weight updating unit 222 updates the connection relation between the node $N_i$ of the time series pattern storage network $net_{in}$ and the node $N'_j$ of the time series pattern storage network $net_{out}$ in the connection network (FIG. 28) stored in the storage section 211.

The label set supplied from the learning processor 221 to the connection weight updating unit 222 is a set of the input label and the output label. The input label is the node label of the node $N_i$ of the time series pattern storage network $net_{in}$. The node $N_i$ becomes the winner node when the time series pattern storage network $net_{in}$ is updated in response to the input data of the observed data. The input label thus most appropriately matches the input data in the time series pattern storage network $net_{in}$.

Similarly, the input label is the node label of the node $N'_j$ of the time series pattern storage network $net_{out}$. The node $N'_j$ becomes the winner node when the time series pattern storage network $net_{out}$ is updated in response to the output data of the observed data. The output label thus most appropriately matches the output data in the time series pattern storage network $net_{out}$.

The connection weight updating unit 222 updates the connection relation between the winner node $N_i$ most appropriately matching the input data of the observed data, from among the nodes of the time series pattern storage network $net_{in}$, and the winner node $N'_j$ most appropriately matching the output data of the observed data, from among the nodes of the time series pattern storage network $net_{out}$.

A connection weight representing the degree of connection is defined for the connection relation between the node $N_i$ of the time series pattern storage network $net_{in}$ and the node $N'_j$ of the time series pattern storage network $net_{out}$. The connection weight is updated to reinforce the degree of connection between the node $N_i$ and the node $N'_j$. More specifically, the connection weight representing the degree of connection between the node $N_i$ and the node $N'_j$ is incremented by one.

The recognition generator 213 receives the input data for use in estimating the output data obtained from the object to be controlled, or the output data for use in estimating the input data (control data) to be supplied to the object so that the output data from the object is obtained as a target value.

In response to the input data, the recognition generator 213 determines the winner node $N_i$ most appropriately matching the input data in the time series pattern storage network $net_i$ of the connection network stored in the storage section 211. The recognition generator 213 determines, as a generation node $N'_j$ for generating the time series data as an estimated value of the output data responsive to the input data, the node of the time series pattern storage network $net_{out}$ having the highest connection weight with the winner node $N_i$. The recognition generator 213 generates an estimated value of the output data based on the time series pattern model 21 (FIG. 4) of the generation node $N'_j$.

In response to the output data, the recognition generator 213 determines the winner node $N'_j$ most appropriately matching the output data in the time series pattern storage network $net_{out}$ of the connection network stored in the storage section 211. The recognition generator 213 determines the node of the time series pattern storage network $net_{in}$ having the highest connection weight with the winner node $N'_j$, as a generation node $N_i$ for use in generating the time series data as an estimated value of the control data (input data) that is supplied to the control model when the output is obtained. The recognition generator 213 generates an estimated value of the control data in accordance with the time series pattern model 21 (FIG. 4) of the generation node $N_i$.

The recognition generator 213 includes a score calculator 231, a winner node determiner 232, a generation node determiner 233, and a time series generator 234.

The score calculator 231, the winner node determiner 232, the generation node determiner 233, and the time series generator 234 are designed to recognize whether the data supplied to the recognition generator 213 is the input data or the output data. The recognition generator 213 receives, together with or separately from the supplied data, information that identifies whether the supplied data is the input data or the output data. In this way, each of the score calculator 231, the winner node determiner 232, the generation node determiner 233, and the time series generator 234 recognizes whether the data supplied to the recognition generator 213 is the input data or the output data.

In response to the data supplied to the recognition generator 213, the score calculator 231 calculates the score the degree of match of each node $N_i$ of the time series pattern storage network $net_{in}$ or the degree of match of each node $N'_j$ of the time series pattern storage network $net_{out}$ of the connection network stored in the storage section 211, in the same way as the score calculator 231 of FIG. 13. The score calculator 231 outputs the score to the winner node determiner 232.

If the data supplied to the recognition generator 213 is the input data, the score calculator 231 calculates, in response to the input data, the score of each node $N_i$ of the time series pattern storage network $net_{in}$ forming the connection network stored in the storage section 211, and supplies the score to the winner node determiner 232. If the data supplied to the recognition generator 213 is the output data, the score calculator 231 calculates, in response to the output data, the scores of each node $N'_j$ of the time series pattern storage network $net_{out}$ of the connection network stored in the storage section 211, and outputs the score to the winner node determiner 232.

As the winner node determiner 52 in the recognition section 3 of FIG. 13, the winner node determiner 232 determines, as a winner node, the node having the highest score supplied from the score calculator 231, and supplies the node label representing the winner node to the generation node determiner 233.

If the data supplied to the recognition generator 213 is the input data, the winner node determiner 232 determines, as the winner node $N_i$, the node having the highest score to the input data, supplied from the score calculator 231, from among the nodes of the time series pattern storage network $net_{in}$ forming the connection network stored in the storage section 211, and supplies the input label representing the winner node $N_i$ to the generation node determiner 233. If the data supplied to the recognition generator 213 is the output data, the winner node determiner 232 determines, as the winner node $N'_j$, the node having the highest score to the output data, supplied from the score calculator 231, from among the nodes of the time series pattern storage network $net_{out}$ forming the connection network stored in the storage section 211, and supplies the output label representing the winner node $N'_j$ to the generation node determiner 233.

If the input label from the winner node determiner 232 is supplied, the generation node determiner 233 receives the input label from the winner node determiner 232. The generation node determiner 233 then determines, as the generation node, the node $N'_j$ having the highest connection weight with the node $N_i$ represented by the input label from the winner node determiner 232, from among the nodes of the time series pattern storage network $net_{out}$ forming the connection network stored in the storage section 211, and supplies the output label representing the generation node $N'_j$ to the time series generator 234. If the data supplied to the recognition generator 213 is the output data, the generation node determiner 233 receives the output label from the winner node determiner 232. The generation node determiner 233 then determines, as the generation node, the node $N_i$ having the highest connection weight with the node $N'_j$ represented by the output label from the winner node determiner 232, from among the nodes of the time series pattern storage network $net_{in}$ forming the connection network stored in the storage section 211.

If the data supplied to the recognition generator 213 is the input data, the time series generator 234 receives the output label from the generation node determiner 233. As the time series generator 62 in the generator 6 of FIG. 15, the time series generator 234 then generates time series data as an estimated value of the output data responsive to the input data supplied to the recognition generator 213, based on the time series pattern model 21 (FIG. 4) of the node $N'_j$, represented by the output label from the generation node determiner 233, from among the nodes of the time series pattern storage network $net_{out}$ forming the connection network stored in the storage section 211.

If the data supplied to the recognition generator 213 is the output data, the time series generator 234 receives the input label from the generation node determiner 233. As the time series generator 62 in the generator 6 of FIG. 15, the time series generator 234 then generates time series data as an estimated value of the control data (input data) responsive to the output data supplied to the recognition generator 213, based on the time series pattern model 21 of the node $N_i$, represented by the input label from the generation node determiner 233, from among the nodes of the time series pattern storage network $net_{in}$ forming the connection network stored in the storage section 211.

FIG. 30 is a flowchart of the learning of the connection network performed by the data processing apparatus of FIG. 29. In the learning process, the data processing apparatus models the object to be controlled through the connection network.

In step S101, the observed data, namely, the set of the input data and the output data, is input to the data processing apparatus of FIG. 26. The observed data is then fed to the learning section 212.

In step S102, the learning processor 221 updates in a self-organizing manner the time series pattern storage network $net_{in}$ of the connection network (FIG. 28) stored in the storage section 211 in response to the input data of the observed data. In step S103, the learning processor 221 updates in a self-organizing manner the time series pattern storage network $net_{out}$ of the connection network stored in the storage section 211 in response to the output data of the observed data.

The learning processor 221 supplies, to the connection weight updating unit 222, the label set of the input label of the node $N_i$ of the time series pattern storage network $net_{in}$, the node $N_i$ having become the winner node when the time series pattern storage network $net_{in}$ is updated, and the output label of the node $N'_j$ of the time series pattern storage network $net_{out}$, the node $N'_j$ having become an winner node when the time series pattern storage network $net_{out}$ is updated.

In step S104, the connection weight updating unit 222 reinforces the connection weight between the node $N_i$ of the time series pattern storage network $net_{in}$ and the node $N'_j$ of the time series pattern storage network $net_{out}$ in response to the label set supplied from the learning processor 221.

The connection weights are all set to zero at the start of learning. In step S104, the connection weight updating unit 222 increments, by one, the connection weight between the node $N_i$ represented by the input label and the node $N'_j$ represented by the output label, supplied from the learning processor 221.

Processing returns from step S104 to S101 to wait for the inputting of next observed data, and then iterates the same process.

As steps S101 through S104 are iterated with a large number of pieces of observed data input, the connection network stored in the storage section 211 becomes each of the forward model and the backward model corresponding to the object to be controlled.

FIG. 31 is a flowchart of an estimation process, in which the output data responsive to the input data, and the control data (input data) corresponding to the output data are estimated using the connection network as one of the forward model and the backward model.

The data processing apparatus of FIG. 29 now estimates the output data responsive to the input data. In step S111, the input data is supplied to the data processing apparatus of FIG. 29.

The input data supplied to the data processing apparatus is fed to the score calculator 231 in the recognition generator 213.

In step S112, the score calculator 231 calculates the score of each node $N_i$ of the time series pattern storage network $net_{in}$ forming the connection network stored in the storage section 211 in response to the supplied input data, and supplies the calculated score to the winner node determiner 232.

In step S113, the winner node determiner 232 determines, as the winner node $N_i$, the node having the highest score supplied from the score calculator 231, from among the nodes of the time series pattern storage network $net_{in}$ forming the connection network stored in the storage section 211, and supplies the input label representing the winner node $N_i$ to the generation node determiner 233.

In step S114, the generation node determiner 233 determines, as the generation node, the node $N'_j$ having the highest connection weight with the node $N_i$ represented by the input label from the winner node determiner 232, from among the nodes of the time series pattern storage network $net_{out}$ forming the connection network stored in the storage section 211, and supplies the output label representing the generation node $N'_j$ to the time series generator 234.

In step S115, the time series generator 234 generates the time series data as the estimated value of the output data responsive to the input data supplied to the recognition generator 213, based on the time series pattern model 21 (FIG. 4) of the node $N'_j$ represented by the output label from the generation node determiner 233, from among the nodes of the time series pattern storage network $net_{out}$ forming the connection network stored in the storage section 211. Processing proceeds to step S116 to output the time series data.

If the data processing apparatus of FIG. 29 estimates the control data (input data) corresponding to the output data, the output data is input to the data processing apparatus of FIG. 29 in step S111.

The output data supplied to the data processing apparatus is fed to the score calculator 231 in the recognition generator 213.

In step S112, the score calculator 231 calculates, in response to the supplied output data, the score of each node $N'_j$ of the time series pattern storage network $net_{out}$ forming the connection network stored in the storage section 211, and supplies the calculated score to the winner node determiner 232.

In step S113, the winner node determiner 232 determines, as the winner node $N'_j$, the node having the highest score from the score calculator 231, from among the nodes of the time series pattern storage network $net_{out}$ forming the connection network stored in the storage section 211, and supplies the output label representing the node $N'_j$ to the generation node determiner 233.

In step S114, the generation node determiner 233 determines, as the generation node, the node $N_i$ having the highest connection weight with the node $N'_j$ represented by the output label from the winner node determiner 232, from among the nodes of the time series pattern storage network $net_{in}$ forming the connection network stored in the storage section 211, and supplies the input label representing the generation node $N_i$ to the time series generator 234.

In step S115, the time series generator 234 generates the time series data as the estimated value of the control data (input data) corresponding to the output data supplied to the recognition generator 213, based on the time series pattern model 21 of the node $N_i$ represented by the input label from the generation node determiner 233, from among the nodes of the time series pattern storage network $net_{in}$ forming the connection network stored in the storage section 211. Processing proceeds to step S116 to output the time series data.

Using the input data and the output data, the connection network is learned, and the object to be controlled is modeled as the forward model and the backward model. The object to be controlled is accurately expressed, and the output data and the control data (input data) are thus estimated at high precision.

The series of above-referenced process steps can be executed in hardware or software. If the series of process steps is executed in software, a computer program forming software is installed on a general-purpose computer.

FIG. 32 illustrates a computer, having the computer program for performing the series of process steps installed thereon, in accordance with one embodiment of the present invention.

The computer program is pre-stored in a hard disk 305 or a read-only memory (ROM) 303, each included in the computer as a recording medium.

The computer program may be temporarily or permanently stored in a removable recording medium 311, such as a flexible disk, a compact-disk read-only memory (CD-ROM), a magneto-optical disk (MO), a digital versatile disk (DVD), a magnetic disk, or a semiconductor memory. The removable disk 311 is supplied in a so-called package medium.

The computer program may be installed from the above-described removable recording medium 311 to the computer. Furthermore, the computer program may be transmitted, to the computer, in a wireless fashion from a download site to the computer via a digital broadcasting satellite, or in a wired fashion via a network, such as local area network (LAN) or the Internet. Such a transmitted computer program is received at a communication unit 308, and then installed on the hard disk 305.

The computer includes a central processing unit (CPU) 302. An input and output interface 310 is connected to the CPU 302 via a bus 301. When a user operates an input unit 307, including a keyboard, a mouse, a microphone, etc., to input a command, the CPU 302 receives the command via the input and output interface 310, and executes the computer program stored in the ROM 303 in response to the command. The CPU 302 loads, to a random-access memory (RAM) 304, one of a program stored in the hard disk 305, a program transmitted via a digital broadcasting satellite or a network, received via the communication unit 308, and then installed onto the hard disk 305, and a computer program read from the removable recording medium 311 loaded in a drive 309, and then installed onto the hard disk 305, and then executes the program. The CPU 302 performs the process in accordance with the previously discussed flowcharts and the previously discussed block diagrams. The CPU 302 outputs, via the input and output interface 310, the process result to an output unit 306, such as a liquid-crystal display (LCD) and a loudspeaker for outputting, to the communication unit 308 for transmission, and to the hard disk 305 for recording.

The process steps discussed in this specification are sequentially performed in the time series order as stated. Alternatively, the steps may be performed in parallel or separately. For example, the steps may be performed in parallel process or object process.

The computer program may be executed by a single computer, or by a plurality of computers in distributed processing. The computer program may be transmitted to a remote computer for execution.

It should be understood by those skilled in the art that various modifications, combinations, sub-combinations and alterations may occur depending on design requirements and other factors insofar as they are within the scope of the appended claims or the equivalents thereof.

What is claimed is:

1. A learning apparatus for learning time series data, the learning apparatus comprising:

learning means for updating, in a self-organizing manner based on an observed value of the time series data, a time series pattern storage network including a plurality of nodes, each node having a time series pattern model representing a time series pattern of the time series data;

wherein the learning means further comprises:

a weight determining unit for determining a weight of the node, the weight representing the degree of influence of an observed value of the time series data on the time series pattern model when the time series pattern model of the node is updated, a winner node determining unit for determining, as a winner node, the node most appropriately matching the observed value of the time series data, from among the plurality of nodes forming the time series pattern storage network; and model updating means for updating the time series pattern model of the winner node in accordance with the observed value of the time series data, wherein the model updating means updates the time series pattern model of the winner node and the time series pattern model of the node other than the winner node, based on the observed value of the time series data and the weight, wherein the weight determining unit determines the weight of the node in response to the relationship of the weight and the distance where the weight decreases as the distance increases, and wherein the relationship of the weight and the distance is that a rate of change of the weight increases as the number of updates of the time series pattern model increases.

2. The learning apparatus according to claim 1, wherein the time series pattern models comprise one of a state transition probability model having a state transition and a function approximating model for approximating a function.

3. The learning apparatus according to claim 1, wherein the time series pattern models comprise a hidden Markov model.

4. The learning apparatus according to claim 1, wherein the weight determining unit determines the weight of the node in response to a distance from the winner node.

5. The learning apparatus according to claim 4, wherein the weight determining unit determines the weight of the node in response to the distance determined by a connection relationship with the winner node.

6. The learning apparatus according to claim 4, wherein the weight determining unit determines the weight of the node in response to the distance determined based on the degree of match of the node to the observed value of the time series data.

7. The learning apparatus according claim 1, further comprising:

learning data storage means for storing learning data for use in learning the time series pattern model of the node, wherein the learning means includes:

a learning data updating unit for mixing the learning data already stored in the learning data storage means with the observed value of the time series data and updating the storage content of the learning data storage means with the mixing results as new learning data, and wherein the model updating unit updates the time series pattern model by learning the time series pattern model of the node based on the new learning data.

8. The learning apparatus according to claim 7, wherein wherein the learning data updating unit mixes the learning data of the node, already stored in the learning data storage means, with the observed value of the time series data in accordance with the weight of the node, and updates the storage content of the learning data storage means with the mixing results as new learning data.

9. A learning method of learning time series data, the learning method comprising the steps of:

updating, in a self-organizing manner based on an observed value of the time series data, a time series pattern storage network including a plurality of nodes, each node having a time series pattern model representing a time series pattern of the time series data;

determining a weight of the node, the weight representing the degree of influence of the observed value of the time series data on the time series pattern model when the time series pattern model of the node is updated;

determining, as a winner node, the node most appropriately matching the observed value of the time series data, from among the plurality of nodes forming the time series pattern storage network;

updating the time series pattern model of the winner node in accordance with the observed value of the time series data, wherein the updating step updates the time series pattern model of the winner node and the time series pattern model of the node other than the winner node, based on the observed value of the time series data and the weight;

determining the weight of the node in response to the relationship of the weight and the distance where the weight decreases as the distance increases; and wherein the relationship of the weight and the distance is that a rate of change of the weight increases as the number of updates of the time series pattern model increases.

10. A recognition apparatus for recognizing an observed value of time series data, the recognition apparatus comprising:

winner node determining means for determining, as a winner node, the node most appropriately matching the observed value of the time series data, in a time series pattern storage network composed of a plurality of nodes, each node having a time series pattern model representing a time series pattern of the time series data;

a weight determining unit that determines the weight of the node in response to the relationship of the weight and the distance where the weight decreases as the distance increases;

model updating means for updating the time series pattern model of the winner node in accordance with the observed value of the time series data, wherein the model updating means updates the time series pattern model of the winner node and the time series pattern model of the node other than the winner node, based on the observed value of the time series data and the weight, and wherein the relationship of the weight and the distance is that a rate of change of the weight increases as the number of updates of the time series pattern model increases; and output means for outputting information representing the winner node as a result of recognition of the observed value of the time series data.

11. The recognition apparatus according to claim 10, wherein the time series pattern models comprise one of a state transition probability model having a state transition and a function approximating model for approximating a function.

12. The recognition apparatus according to claim 10, wherein the time series pattern models comprise a hidden Markov model.

13. A recognition method of recognizing an observed value of time series data, the recognition method comprising steps of:
- determining, as a winner node, the node most appropriately matching the observed value of the time series data, in a time series pattern storage network composed of a plurality of nodes, each node having a time series pattern model representing a time series pattern of the time series data;
- updating the time series pattern model of the winner node in accordance with the observed value of the time series data;
- determining the weight of the node in response to the relationship of the weight and the distance where the weight decreases as the distance increases;
- updating the time series pattern model of the winner node and the time series pattern model of the node other than the winner node, based on the observed value of the time series data and the weight, and
- wherein the relationship of the weight and the distance is that a rate of change of the weight increases as the number of updates of the time series pattern model increases; and
- outputting information representing the winner node as a result of recognition of the observed value of the time series data.

14. A generating apparatus for generating time series data, the generating apparatus comprising:
- node determining means for determining a node represented by a signal input from the outside world, in a time series pattern storage network composed of a plurality of nodes, each node having a time series pattern model representing a time series pattern of the time series data;
- generating means for generating the time series data based on the time series pattern model of the node determined by the node determining means;
- a weight determining unit that determines the weight of the node in response to the relationship of the weight and the distance where the weight decreases as the distance increases;
- model updating means for updating the time series pattern model of the winner node in accordance with the observed value of the time series data,
  - wherein the model updating means updates the time series pattern model of the winner node and the time series pattern model of the node other than the winner node, based on the observed value of the time series data and the weight,
- wherein the relationship of the weight and the distance is that a rate of change of the weight increases as the number of updates of the time series pattern model increases.

15. The generating apparatus according to claim 14, wherein the time series pattern models comprise one of a state transition probability model having a state transition and a function approximating model for approximating a function.

16. The generating apparatus according to claim 14, wherein the time series pattern models comprise a hidden Markov model.

17. A method of generating time series data, the method comprising the steps of:
- determining a node represented by a signal input from the outside world, in a time series pattern storage network composed of a plurality of nodes, each node having a time series pattern model representing a time series pattern of the time series data;
- determining the weight of the node in response to the relationship of the weight and the distance where the weight decreases as the distance increases;
- updating the time series pattern model of the winner node in accordance with the observed value of the time series data,
  - wherein the updating step updates the time series pattern model of the winner node and the time series pattern model of the node other than the winner node, based on the observed value of the time series data and the weight, and
- wherein the relationship of the weight and the distance is that a rate of change of the weight increases as the number of updates of the time series pattern model increases; and
- generating the time series data based on the time series pattern model of the node determined in the node determining step.

18. A learning apparatus for learning time series data, the learning apparatus comprising:
- a learning unit updating, in a self-organizing manner based on an observed value of the time series data, a time series pattern storage network including a plurality of nodes, each node having a time series pattern model representing a time series pattern of the time series data
- a weight determining unit that determines the weight of the node in response to the relationship of the weight and the distance where the weight decreases as the distance increases;
- model updating means for updating the time series pattern model of the winner node in accordance with the observed value of the time series data,
  - wherein the model updating means updates the time series pattern model of the winner node and the time series pattern model of the node other than the winner node, based on the observed value of the time series data and the weight,
- wherein the relationship of the weight and the distance is that a rate of change of the weight increases as the number of updates of the time series pattern model increases.

* * * * *